US011847923B2

(12) United States Patent
Maloney et al.

(10) Patent No.: US 11,847,923 B2
(45) Date of Patent: Dec. 19, 2023

(54) ROBUST TECHNIQUES FOR THE COLLECTION AND MANAGEMENT OF DATA FROM DATA SOURCES IN AN UNMANNED AIRCRAFT SYSTEMS (UAS) OPERATIONS ENVIRONMENT

(71) Applicant: The United States of America, as represented by the Administrator of the Federal Aviation Administration, Atlantic City International Airport, NJ (US)

(72) Inventors: Philip Maloney, Mays Landing, NJ (US); Andrew A. Tasso, Vineland, NJ (US)

(73) Assignee: The United States of America, as represented by the Administrator of the Federal Aviation Administration, Washington, DC (US)

( * ) Notice: Subject to any disclaimer, the term of this patent is extended or adjusted under 35 U.S.C. 154(b) by 299 days.

(21) Appl. No.: 17/464,879

(22) Filed: Sep. 2, 2021

(65) Prior Publication Data
US 2022/0101736 A1 Mar. 31, 2022

Related U.S. Application Data

(60) Provisional application No. 63/083,160, filed on Sep. 25, 2020.

(51) Int. Cl.
*G06F 16/00* (2019.01)
*G08G 5/00* (2006.01)
(Continued)

(52) U.S. Cl.
CPC ......... *G08G 5/0043* (2013.01); *G06Q 30/018* (2013.01); *G07C 5/008* (2013.01);
(Continued)

(58) Field of Classification Search
CPC .................................................. G06F 16/2474
See application file for complete search history.

(56) References Cited

U.S. PATENT DOCUMENTS 10,757,596 B2 * 8/2020 Akdeniz ................. G05D 1/104
2021/0092604 A1 * 3/2021 Fox ....................... B64C 39/024

* cited by examiner

*Primary Examiner* — Baoquoc N To
(74) *Attorney, Agent, or Firm* — Lise A. Rode

(57) ABSTRACT

Robust techniques for the collection, storage, and processing of data from disparate UAS data sources in an unmanned aircraft systems (UAS) operations environment. A data-agnostic platform hosts a plurality of clients and client services. Baseline configurations and customizations are input to configure the platform for collection, retention, and/or processing of the data, and the client services are automatically configured based in part on those baseline configurations and customizations. Client services are logically arranged within each device memory as a plurality of operational groupings with a predetermined sequence order and a predetermined priority and executed according to the predetermined sequence order and predetermined priority. Data from the data sources is translated into customized data based at least, in part, on the configuration information, and validated for storage. Validated data may be analyzed according to prescribed functions and formulas and/or reported out according to a preferred format, based on the configuration information.

24 Claims, 44 Drawing Sheets

(51) Int. Cl.
*G07C 5/00* (2006.01)
*G06Q 30/018* (2023.01)
*G07C 5/08* (2006.01)
(52) U.S. Cl.
CPC ......... *G07C 5/0808* (2013.01); *G08G 5/0013* (2013.01); *G08G 5/0069* (2013.01)

1310

← → ↘ ← | 🖼 | << UDC Client > Access Service > Logbook Service > Logbook Generator

FLIGHT LOGBOOK

Pre-Flight Log

- Flight ID: _enter text_ (#)
- Mission ID: _enter text_ (#)
- Operator ID: _enter text_ (#)
- Date: _enter text_ (mm/dd/yyyy)
- Aircraft Takeoff Location: _enter text_ (Lat/Long)
- Aircraft Takeoff Time: _enter text_ (UTC)
- Aircraft Fuel Weight: _enter text_ (lbs)
- Aircraft Takeoff Weight: _enter text_ (lbs)
- Planned Flight Route: _enter text_ (Lat/Long)

✛ Add Another Waypoint

Aircraft Log

- Aircraft Make: _enter text_ (text)
- Aircraft Model: _enter text_ (text)
- Aircraft ID: _enter text_ (#)
- FAA Registration #: _enter text_ (#)
- Aircraft Life: _enter text_ (Flight Hours)
- Last Inspection: _enter text_ (mm/dd/yyyy)

ROBUST TECHNIQUES FOR THE COLLECTION AND MANAGEMENT OF DATA FROM DATA SOURCES IN AN UNMANNED AIRCRAFT SYSTEMS (UAS) OPERATIONS ENVIRONMENT

CROSS-REFERENCE TO RELATED APPLICATIONS

This application claims priority to U.S. Provisional Patent Application No. 63/083,160, filed on Sep. 25, 2020 and entitled "Collection and Management of Uniform and Reliable Data from Data Sources in an Unmanned Aircraft Systems (UAS) Operations Environment," and which is expressly incorporated by reference herein in its entirety.

TECHNICAL FIELD

The disclosed embodiments relate to the field of data collection and management. More specifically, the embodiments relate to the collection and management of data generated from/by disparate UAS systems and operations.

BACKGROUND

The Federal Aviation Administration (FAA) has committed to integrating Unmanned Aircraft Systems (UAS) into the National Airspace System (NAS). This commitment is in response to the current trend of UAS use in commercial, public, and private sectors as well as the forecasted tremendous demand for comprehensive UAS utilization across all domains within the NAS.

As the FAA recently acknowledged in its report entitled "*Integration of Civil Unmanned Aircraft Systems (UAS) in the National Airspace System (NAS) Roadmap*" (3rd Ed.) (2020)("2020 FAA UAS Integration Roadmap"):

Unmanned aircraft systems (UAS) are fundamentally changing not only aviation, but also the way we live and do business. Drones are reinventing industries and creating new ones every day. The promise of full integration of drones means a future where better health care, safer working conditions, faster commercial delivery, and so much more will be available to millions of Americans.

The 2020 FAA UAS Integration Roadmap outlines a number of expected operational capabilities in the next several years, including Operations over People (OOvP) (i.e., small UAS operations over persons not directly participating in the operation); Beyond Visual Line of Sight (BVLOS) operations (i.e., expanding OOvP operations over people to include BVLOS operations such as infrastructure or agriculture inspection, swarms, and on-airport operations); Small UAS Package Delivery Operations (i.e., small UAS fleet operators conducting external operations that involve multiple launches and landings for delivering or retrieving packages or material); Integrated Operations (i.e., UAS operations co-existing, with some restrictions, in controlled airspace with manned aircraft, including UAS operations with large UAS at varying altitudes and on instrument flight rules (IFR) flight plans and further including interstate delivery and small cargo operations); Routine/Scheduled Operations (i.e., regularly scheduled UAS arrivals and departures at Class B, C, and D airports and optionally piloted aircraft for large cargo operations; air traffic control (ATC) services available to UAS operators filing IFR flight plans; routine or scheduled operations occur as the equipment and automation on the UAS and in the ATC infrastructure can accommodate them); Large Carrier Cargo Operations (i.e., remotely-piloted UAS transport of cargo in U.S. domestic airspace and arrivals of remotely piloted cargo flights); and, Passenger Transport Operations (remotely-piloted UAS air taxi services that are based on vehicle performance requirements and type certification of the aircraft, its equipment, and the automation technology that replaces pilot functions on board the aircraft).

But, as further acknowledged in its 2020 FAA UAS Integration Roadmap report:

[T]he safe integration of unmanned aircraft into the National Airspace System (NAS) is a significant challenge. The Federal Aviation Administration (FAA) has made great strides in developing the technical and regulatory standards, policy guidance, and operational procedures on which successful UAS integration depends.

Each of the aforementioned operational capabilities carries with it significant challenges and numerous critical areas that need to be addressed before the operational capability and UAS integration can be fully achieved.

The FAA's current approach to effecting these UAS operational capabilities consists of: Identifying the current gaps in aviation policies and regulations (i.e., policies and regulations that are unable to facilitate the operation of UAS in the NAS); conducting research to identify safety shortfalls and complementary solutions; collaborating with industry and academia to establish advisory committees and test centers for testing UAS current and future technologies; instituting experimental and trial programs to explore prospective applications of UAS; instituting new policy and regulation on an incremental basis; and, creating plans and preparations for further governance that will provide greater access to the NAS. It is anticipated that regulatory rulemaking will continue to be the primary mechanism by which this integration will be achieved.

Simultaneously, the FAA is conducting UAS research in a "building block" approach for operational capabilities. Research is essential to the FAA's decision-making, as it is strategically designed to produce results that address safety concerns, gaps in policy and regulation, and deficiencies in NAS infrastructure. The FAA's research methods include empirical data collection and analysis, operational forecasting, concept development, fast-time modeling & simulation, integrated assessment modeling, and concept validation & demonstration. This comprehensive approach to applied research allows the FAA to incrementally address each of the operational capabilities, enabling increasingly more complex UAS operations over time and progressively permitting UAS operations on the pathway to full NAS integration.

However, it will be appreciated that regulatory rulemaking, and the research that informs it, is a laborious and time-consuming process that has, thus far, struggled to keep up with the rapidly evolving UAS community. Until a more extensive regulatory infrastructure is in place, the FAA is currently implementing an "operations first" approach to authorize UAS operations using existing regulations. This approach includes exemption and waiver processes that allow for regulatory relief from certain current regulations that restrict the use of UAS. Under these processes, UAS operators may be excepted from specific statutes and/or regulations and/or they may seek an exemption or waiver of the application of specific statutes and/or regulations, the applicable exceptions, exemptions, and waivers being dependent, in part, upon the nature of any one or more of: The nature of the UAS operator and the proposed UAS operations, the training/certification of the UAS pilot, and/or the weight of the Unmanned Aircraft (UA) (also commonly referred to as Unmanned Aerial Vehicle (UAV) or "drone").

Under the exemptions and waivers process, a UAS operator seeking an exemption or waiver must submit an application for one of the following, as applicable to the UAS operator and proposed UAS operation(s)): A Certificate of Waiver or Authorization (COA); a Special Authority for Certain Unmanned Systems Section Waiver (aka 44807 Waiver (formerly Section 333 Waiver)); or, a 14 CFR Part 107 Waiver. Once an application for exemption or waiver under any of the above provisions is submitted, the FAA will generally consider whether the proposed UAS operation results in a new change or potentially introduces a new hazard into the NAS. In those cases in which the proposed operations may introduce new unidentified hazards, the FAA mandates that prescribed Safety Risk Management (SRM) and Safety Assurance (SA) processes (currently set forth in FAA Order 8040.4B—Safety Risk Management Policy, FAA Order 8040.6—Unmanned Aircraft Systems Safety Risk Management Policy, and the FAA Air Traffic Organization's Safety Management System Manual) be applied to evaluate the application and to determine whether the operator has demonstrated a sufficient capacity for safely operating their UAS in the NAS.

The FAA SRM process incorporates a system analysis, identification of hazards, and the assessment of risk so that safety risk controls may be developed and, upon validation, employed operationally. SA processes are then used to ensure that the safety risk controls that have been employed are achieving their intended risk mitigation objectives. If the controls are not adequately mitigating risk, they are modified and/or additional controls are developed using the SRM process.

Importantly, where the proposed operations include safety risks that have been previously assessed and do not include any changes and do not introduce new unidentified hazards into the NAS, the FAA may not perform SRM on behalf of the UAS operator-applicant seeking a waiver. Rather, the UAS operator-applicant is expected to conduct its own SRM. In this instance, the FAA SRM process would be conducted as an optional independent assessment to validate the operator-applicant's assessment or, simply, to have an independent view of a particular issue/concern. The FAA may also need to conduct its own SRM in those instances where the operator-applicant is unable or unwilling to do so. Thus, a UAS operator-applicant is responsible for providing the FAA with a safety case that is built on the principles of SRM, while the FAA is responsible for reviewing that case using FAA SRM and SA processes and policies to either approve (with conditions) or deny requested access to the NAS.

It will thus be appreciated from the foregoing that the FAA's approach to enabling UAS operations in the NAS currently consists of constructing new regulations through thorough research, testing, and consultation, while providing SRM-based waiver mechanisms in the interim. The commonality to either approach is the need for substantial data; more specifically, for data that is readable, reliable, and tailored to inform specific measures that will assist in the direction of the FAA's regulatory and decision-making processes. This becomes more critical as the pace of UAS innovation increases and new technologies and adopters emerge, and the number of proposals for operation and risk assessments received and reviewed by the FAA correspondingly increases.

BRIEF DESCRIPTION OF THE DRAWINGS

In order that features of the present disclosure can be understood in detail, a more particular description may be had by reference to aspects and features, some of which are illustrated in the appended drawings. It is to be noted, however, that the drawings illustrate only certain typical aspects and features of this disclosure and are therefore not to be considered limiting of its scope, and that the description may allow for other equally effective aspects and features. The same reference numbers in different drawings may identify the same or similar elements.

FIG. 13 is a diagram illustrating an exemplary embodiment of a Logbook Module for the UDC Logbook Service in accordance with various aspects of the present disclosure;

Figure 1:
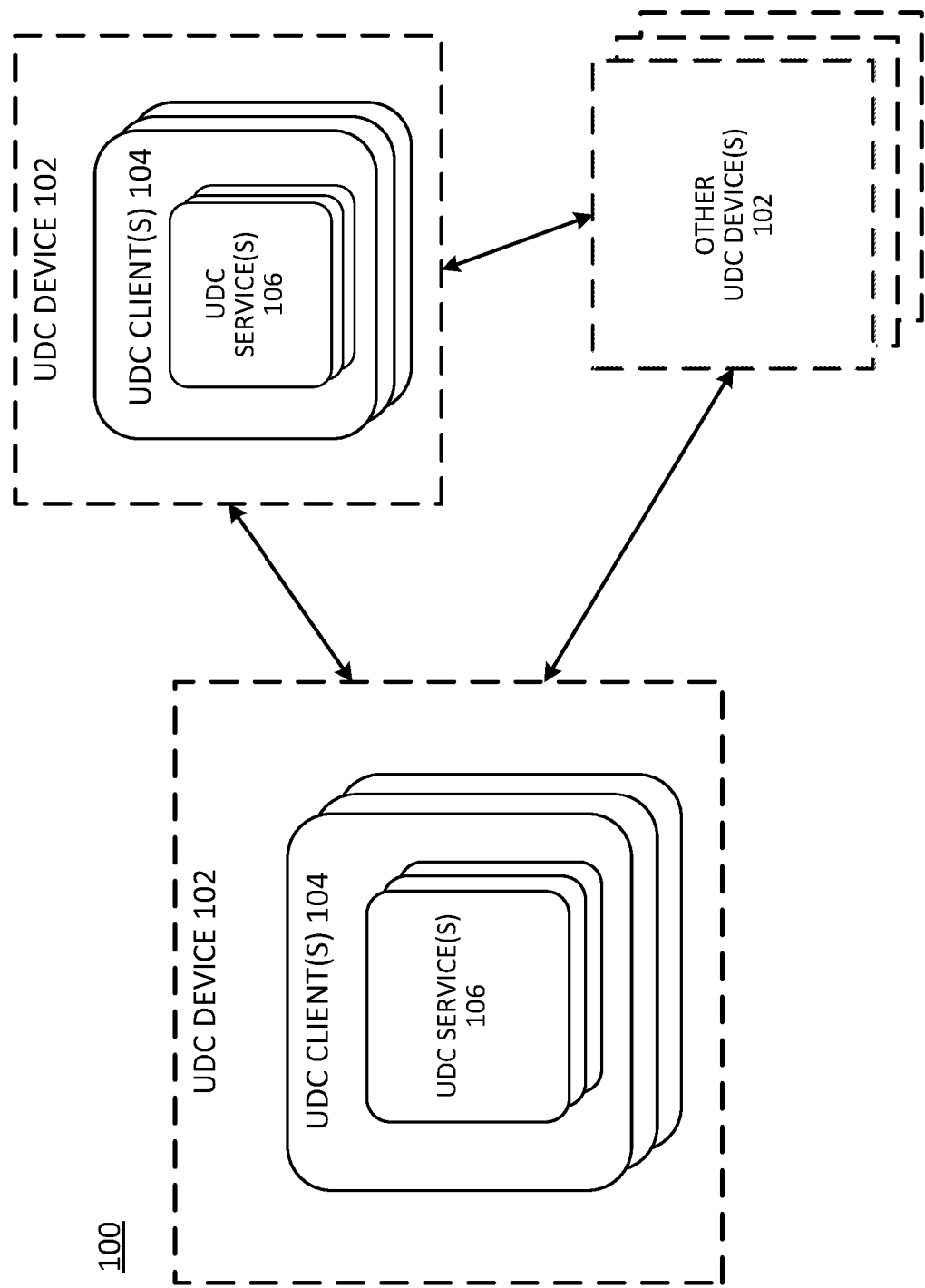
FIG. 1 is a block diagram illustrating the general architecture of the UDC System, including UDC Device(s), UDC Client(s), and UDC Service(s) in accordance with various aspects of the present disclosure.

No language in the specification should be construed as indicating any non-claimed element as essential to the practice of the techniques of this disclosure. The terms "a" and "an" are used interchangeably above, and are equivalent to the phrase "one or more" as utilized in the present application. The terms "comprising," "having," "including," and "containing" are to be construed as open-ended terms (i.e., meaning "including, but not limited to,") unless otherwise noted above. The recitation of any ranges of values herein is merely intended to serve as a shorthand technique of referring individually to each separate value falling within the range, unless otherwise indicated herein, and each separate value is incorporated into the specification as if it were individually recited. The use of any and all examples, or example language (e.g., "such as"), provided herein is intended merely to better illuminate the disclosure and does not impose a limitation on the scope of the disclosure unless otherwise claimed. Finally, any papers and publications cited herein are hereby incorporated by reference in their entirety.

Certain exemplary embodiments will now be described to provide an overall understanding of the principles of the structure, function, manufacture, and use of the systems and techniques disclosed herein. Those skilled in the art will understand that the exemplary embodiments specifically described herein and illustrated in the accompanying drawings are non-limiting examples and any embodiment or feature described herein as "exemplary," "example," or "illustrative," is not necessarily to be construed as preferred or advantageous over other embodiments or features. Based on the teachings herein one skilled in the art should appreciate that the scope of the disclosure is intended to cover any aspect disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect or feature disclosed herein may be embodied by one or more elements of a claim.

DETAILED DESCRIPTION

As set forth previously, as the pace of UAS innovation increases and new technologies and adopters emerge, the need for acquiring data that is readable, reliable, and tailored to inform specific measures that will assist in the direction of the FAA's regulatory and decision-making processes becomes more critical.

Previous attempts have approached data collection in different ways. Most of these data collection efforts fall into one of five categories: Simple data collection; data collection for a specific operation; data collection using a pre-defined or preselected protocol; data collection for a specific use case; or data mining. However, none of these efforts envisions a comprehensive data collection and management method as set forth herein, which mitigates the fragmenting, formatting, and data management challenges inherent to the UAS community.

Most notably, none of the previous solutions are structured to support the technology and requirement changes that routinely occur for UAS operators and the FAA. This inability for a system to adaptably and flexibly respond to such changes may lead to, inter alia, Hazardously Misleading Information (HMI). HMI may be generally understood to be defined as an integrity event that occurs when acquired information that otherwise appears as reliable and accurate, misrepresents reality and misinforms the user with severe consequences. HMI is a dangerous occurrence, especially within the aviation sector. It can lead a UAS operator or the FAA to believe that a particular UAS flight operation is safe when it is in fact wholly unsafe and compromises the safety of other concurrent operations.

The inventors have realized that thorough, precise, and comprehensive SRM-based waiver analyses, processes, and mechanisms require the consumption and processing of uniform and reliable data, particularly such data procured from UAS flight operations. Such uniform and reliable data is not only necessary for the current UAS waiver/exemption processes but will also be fundamental to informing the appropriate regulatory infrastructure that will ultimately put into effect for UAS operations.

However, there are significant challenges in acquiring data uniformly and reliably across the entire UAS operations environment. The inventors have also realized that these challenges may be broadly grouped into four categories.

The first two categories of challenges may be considered to derive directly from UAS system and operator issues. A first occurs as a result of collecting data from dissimilar, or disparate, UAS systems. More specifically, UAS are a collective of subsystems assembled to work as one complete aircraft; however, these subsystems do not always communicate or synchronize with each other (e.g., the only link between UAS primary aircraft subsystems and the collision avoidance subsystem may be the human pilot, and thus not via any sort of electronic communications pathway). Further, not all UAS subsystems are connected to a data recorder and, in fact, some UAS have no data recorder at all. Even for those subsystems in which data collection and recording occurs, that collection and recording requires proper handling (i.e., effective data management) that, for operators, can be time- and resource-intensive. Moreover, the data collected from all subsystems must be consolidated into storage, which is equally susceptible to improper handling. Finally many UAS operators lack the experience, or have insufficient training and/or background in aviation safety, to effectively collect data from a plurality of disparate systems in the field.

A second challenge that arises in the acquisition of uniform and reliable data arises from the manner and method by which the aforementioned disparate systems handle data and the consequential issues that arise therefrom. This group of challenges may be collectively thought of as fragmented formatting issues. For example, each UAS subsystem will likely have a distinct set of parameters as well as a discrete format and frequency for dissemination of data. This can lead to poor synchronization among UAS subsystems and result in asymmetrical sets of data as well as discrepancies in the time-stamping of those data sets. In addition, some UAS have multiple devices managing the collection of data across their subsystems and, in those circumstances, the formatting of each recorder may be different from the others. Finally, management of data sets in the field is susceptible to disorganization, including improper classification (i.e., "naming-convention") and inconsistent file formatting (e.g., "csv", "txt", "xml," and binary encoded).

It will be appreciated that, given the multitude of different UAS operators and systems in the field, the challenges set forth in the first two categories will compound as they are effected across the entire UAS community. That is, the disparate systems and fragmented formatting issues that each operator faces are multiplied exponentially across a broad domain of UAS operators and UAS designs and implementations.

While these first two categories of challenges may be considered to derive from UAS system and operator issues, the other two categories of challenges to procuring uniform and reliable data across the entire UAS operations environment generally reside with the FAA. As with the first two categories of challenges, the following challenges compound as they are effected across the entire FAA and its many organizational needs.

The first of these challenges may be broadly categorized as dynamically-changing, or fluid, requirements.

Specifically, while the FAA has a robust and deep knowledge of piloted, civilian aviation, that knowledge does not fully extend or necessarily apply to UAS by nature of their unique and disparate designs and manner and scope of intended operations. Due to this incongruity, the agency can struggle with defining new data requirements outside of traditional aviation standards. Further, specific metrics must be defined in order to understand what data is needed. As the FAA has many operational and organizational needs, it thus has numerous and diverse sets of data requirements, making a determination of specific metrics challenging. Finally, as noted previously, as UAS innovation increases and new technologies and adopters emerge, the FAA's approach to UAS integration, along with the UAS community, is evolving rapidly All of the foregoing result in difficulty in establishing a firm set of data requirements difficult, and the potential for indeterminate, diverse, and/or fluctuating data requirements leads to a state of fluid requirements. Such fluid requirements can lead to ambiguity—or even paralysis—in deciding the specific data that should be collected. Furthermore, these fluid requirements are difficult to communicate to UAS operators in the field, and may result in improper data collection, including UAS operators: Collecting large 'bulk' data collection (in hopes of finding something useful); collecting data under non-test conditions that can lead to HMI or other misleading data; collecting data that lapses in utility (i.e., data becomes largely irrelevant); and collecting data that is generally incomplete or inconsistent. In each case, data collected in response to fluid requirements runs a high risk of experiencing integrity issues.

In addition to imprecise criteria, the FAA grapples with assessing the utility of data and how it is degraded by inherent limitations; i.e., the reliability of the acquired data. It needs to understand the extent to which all previously-discussed issues occur as they will, in large part, dictate which limitations exist within each data set. Every set of data has a unique set of limitations that, if not properly identified and understood, may cause the data to be processed in a highly unreliable way. Without a consistent approach or mechanism to acquiring and transferring data from UAS operators in the field to the FAA, the integrity of any data received will be questionable. Furthermore, the extent to which the acquired data is accessible and appropriately stored will also have a strong impact on the data's utility and value.

It may be appreciated thus that all of the foregoing challenges are interdependent—i.e., issues experienced from one set of challenges impact all others. Data acquired from disparate systems leads to fragmented formatting, which when transferred and subsequently analyzed according to imprecise criteria, results in significant reliability issues.

Hence, the inventors have realized that there is a need to acquire data uniformly and reliably across an entire UAS operations environment composed of disparate systems and mutable data requirements. The acquired data must be consistently formatted, evenly stored, and wholly reliable. The embodiments of the UDC System, Device(s), Client(s), and Service(s) disclosed herein provide a robust solution and operate to overcome the foregoing challenges in a seamless manner.

Aspects of embodiments of the UDC System, Device(s), Client(s), and Service(s) are described in further technical detail in the following paragraphs and accompanying drawings. In general, the UDC System, Device(s), Client(s), and Service(s) perform a set of functions, through a defined physical architecture, according to a particular configuration, so that the entire system achieves the outcomes described herein. The UDC System, Device(s), Client(s), and Service(s) embodiments disclosed herein combine functional, physical and configurable attributes in a manner that work together to uniformly collect data from discrepant aviation systems, while still maintaining the flexibility to adapt to different UAS, flight operations and collection requirements. The following description sets out the functional, physical, and configurable elements that describe the baseline UDC System, Device(s), Client(s), and Service(s) and may understood with reference to the accompanying drawings.

UDC System

The UDC System is a system that performs a set of functions through a defined physical architecture and according to a particular configuration in order to effect desired utility, including the ability to uniformly collect data from discrepant aviation-systems, while still maintaining the flexibility to adapt to different UAS, flight operations, and data processing requirements. In some embodiments (FIG. 1), the UDC System 100 includes UDC Device(s) 102, UDC Client(s) 104, and UDC Services 106. A UDC Device 102 preferably implements at least one UDC Client 104 (and associated UDC Services 106) and facilitates connections to external systems and/or networks. The UDC Client 104 represents the processing platform that the UDC Services 106 reside upon and UDC Services 106 are sub-processes and interfaces through which the core UDC System 100 functionality is implemented. A UDC Device 102 may host multiple UDC Clients 104, and each UDC Client 104 on the UDC Device 102 may further host multiple UDC Services 106 preferably via a 'service-client-device' hierarchy. Each of these components will be discussed below.

UDC Device

The UDC Device is preferably implemented in hardware, including circuits, processors, interface buses, readable storage devices, memory and input/output adapters needed to enable the operation of a UDC Device and it services. However, it will be appreciated by those skilled in the art that the UDC Device may be alternatively implemented as a virtual machine(s), container(s), and/or in a cloud-based environment that provides similar functionalities via software-defined hardware abstractions. In some embodiments, a UDC Device may host a plurality of UDC Clients, with each UDC Client on the device further hosting a plurality of UDC Services in a service-client-device hierarchy. In other embodiments, a plurality of UDC Devices are able to work in concert and/or collaborate through an exchange of inter-device communication (e.g., data, data requests and/or system messaging).

Figure 2:
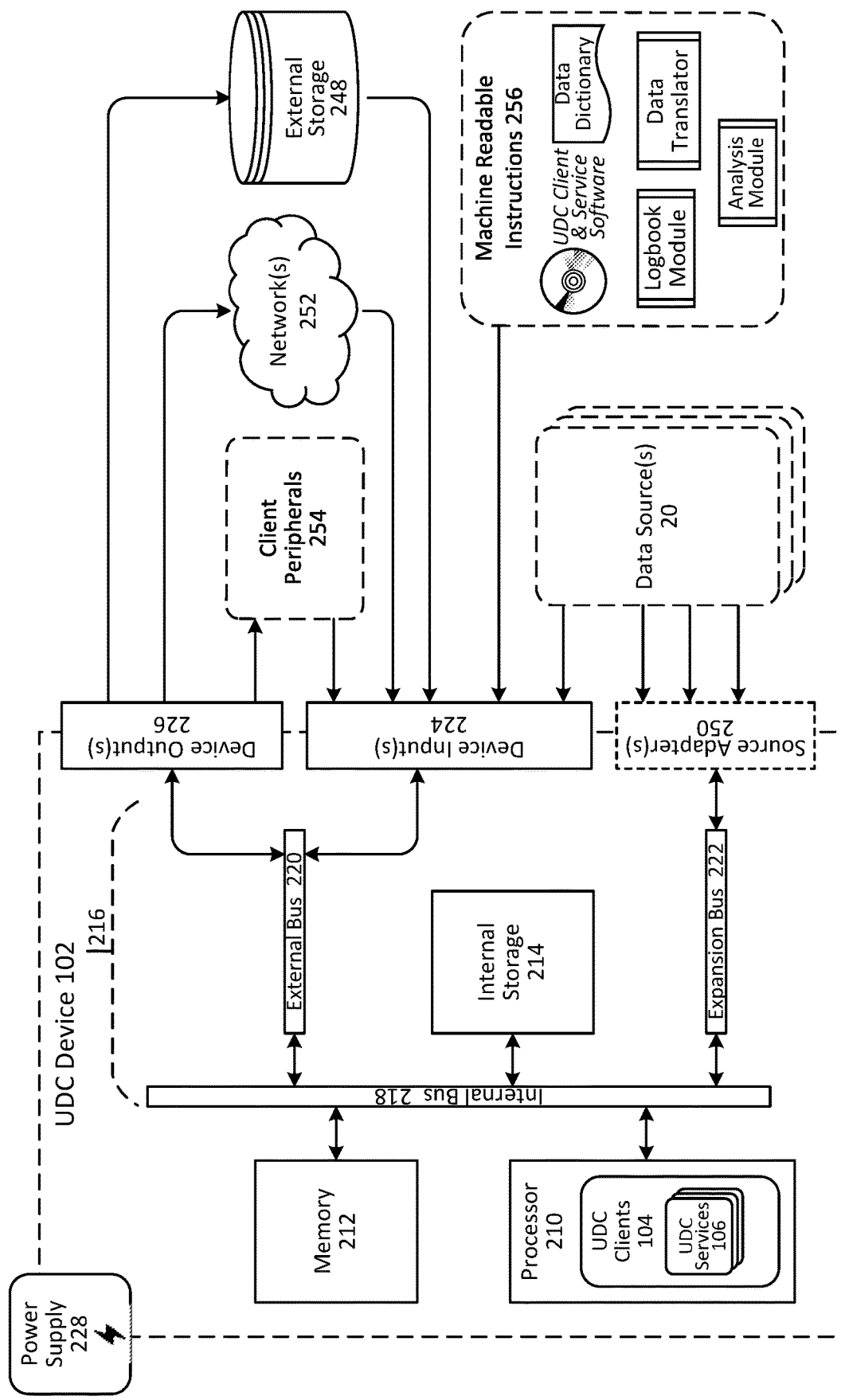
FIG. 2 is a block diagram illustrating an exemplary UDC Device processing platform and components in accordance with various aspects of the present disclosure.

FIG. 2 is a block diagram of an exemplary embodiment and components of the UDC Device. The UDC Device 102 includes a processor or processors 210, preferably implementing one or more UDC Clients 104 and executing the UDC Services 106 within each UDC Client 104. The processor may be a general-purpose microprocessor (e.g., a central processing unit (CPU), a graphics processing unit (GPU), a microcontroller, a microprocessor, a digital signal processor (DSP), an application specific integrated circuit (ASIC), a field programmable gate array (FPGA), a programmable logic device (PLD), a controller, a state machine, gated or transistor logic, discrete hardware components, or any other suitable entity or combinations thereof that can perform calculations, process instructions for execution, and/or other manipulations of information. In some implementations, the processor includes one or more plurality processors capable of being programmed to perform a function; for example, the processor may be programmed to receive data and information from and/or provide data and information to other devices. The processor may be implemented in hardware, firmware, or a combination of hardware and software. Processor 210 may also incorporate local memory (e.g., cache)(not shown) to facilitate certain processing operations.

UDC Device memory 212 is responsible for temporarily storing information that is used within the system to support UDC Device 102 and service operations. Memory 212 may include read only memory (ROM), cache, random access memory (RAM), and/or another type of dynamic or static storage (e.g., a flash memory, a magnetic memory, and/or an optical memory) that stores information and/or instructions for use by the processor (not shown). In one embodiment, the memory is configured to store programmable software.

UDC Device internal storage 214 is the hardware responsible for supplying secondary storage within the UDC Device 102. Internal storage 214 is preferably used, at minimum, to retain UDC Device 102 and service software executables, but may also be used to retain received and/or generated data (e.g., source data and UDC data) for future utility within the system. (Source data may be defined as 'raw data' (or sometimes referred to as 'primary data') collected from any source and that remains in an unaltered, original, and/or unprocessed, format. UDC data is all other data within the UDC system other than source data). UDC Device internal storage 214 may include a hard disk (e.g., a magnetic disk, an optical disk, a magneto-optic disk, and/or a solid state disk), non-volatile memory (e.g., flash memory, electrically erasable programmable read-only memory (EEPROM), ferroelectric RAM (FeRAM), programmable metallization cell (PBM), phase-change memory (PCM), and resistive random-access memory (RRAM)), a compact disc (CD), a digital versatile disc (DVD), a floppy disk, a cartridge, a magnetic tape, and/or another type of non-transitory computer-readable medium, along with a corresponding drive. UDC Device internal storage 214 may be used by the Storage Service (discussed below) to import and export UDC data via the Data Persistence and Storage Access Interfaces (also discussed below).

The UDC Device 102 includes bus architecture 216, which communicatively couples components of the UDC Device 102 to each other. The bus architecture 216 may include hardware, software, or both that and may include data buses, address buses, and control buses. As an example and not by way of limitation, bus architecture 216 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, Thunderbolt™ interface(s), a Video Electronics Standards Association local (VLB) bus, or another suitable bus or a combination thereof.

UDC Device internal bus 218 manages the communication between internal components (i.e., processor(s) 210, memory 212, internal storage 214, external bus 220, and (optionally) expansion bus 222) on the UDC Device 102. In one embodiment, internal bus 218 enables the metadata receiver on the Receiving Service (discussed below) as well as various other UDC Service interfaces, including Data Receiving Interfaces, Data Dispatching Interfaces, Batch Data Importer Interfaces, and Accessory Service Interfaces (each of which is discussed in detail below) for any UDC Services 106 requiring access to other hardware components (e.g., memory 212 and internal storage 214) on the UDC Device 102.

External bus 220 manages the communication between internal components and external inputs and outputs. In one embodiment, external bus 220 enables User Interfaces as well as other UDC Client interfaces, including Data Source Interfaces, Data Dissemination Interfaces, and Auxiliary Device Interfaces (each of which is also discussed in more detail below) on the UDC Client 104. Optional expansion bus 222 manages the communication between internal components and external (e.g., custom) inputs and preferably is an expansion slot (not shown) for attaching custom adapters/connectors to the UDC Device 102. The expansion bus 222 may enable one or more data stream interface on the UDC Client 104. As noted above, a UDC Device 102 may not include an expansion bus 222. For example, in some embodiments of the UDC Device 102 that are used to host only data retention and processing clients (discussed below), the UDC Device 102 may not include an expansion bus.

The UDC Device 102 also includes device input(s) 224 and device output(s) 226, which are configured to allow a user to provide input to, receive output from, and otherwise transfer data to and receive data from, the UDC Device 102. UDC Device input(s) 224 and device output(s) 226 are configured to establish connections with external components and devices (e.g., USB, SD Card slots, optical readers, Ethernet, Bluetooth, wireless, serial ports, audio ports, HDMI, DVI, and VGA) and facilitates the input of information/data (through UDC Device input(s) 224) and output (through UDC Device output(s) 226) from those components and devices. UDC Device input(s) 224 may include a mouse, a keypad or a keyboard, a touchscreen, a camera, an optical scanner, network interface, modem, other known input devices, or a combination of such input devices. UDC Device output(s) 226 may include one or more components for presenting output to a user, including, but not limited to, a graphics engine, a display (e.g., a display screen), one or more output drivers (e.g., display drivers), one or more audio speakers, and one or more audio drivers. In certain embodiments, the UDC Device output(s) 226 is configured to provide graphical data to a display for presentation to a user. The graphical data may be representative of one or more graphical user interfaces and/or any other graphical content as may serve a particular implementation.

Power supply 228 supplies power to all internal components on the UDC Device 102 and, in one embodiment, to possibly external components as well. Power supply 228 provides an electrical load to device components by converting electric current from an external source to a voltage, current, and frequency power-load suitable for the UDC Device 102.

The UDC Device 102 optionally includes source adapter(s) 250 for establishing connections with unique components and devices (e.g., proprietary UAS systems and other unique devices, such as Detect and Avoid systems, RF communication systems, avionics systems and weather sensing systems) 20 and facilitating the input of information/data from those unique components and devices. These connectors generally reside upon a custom adapter that may be or exchanged for another source adapter 250 and are configured to connect to the expansion bus 222 on the UDC Device 102. In one embodiment, the source adapter(s) 250 enable the Data Stream and Data File Interfaces on the UDC Client 104 (discussed below).

All machine-readable instructions 256 are preferably formatted as configuration files and deposited into internal storage 214 for later reference and application by the UDC Device 102. (As used herein, the term "configuration file" includes any kind of machine-readable (configuration) instructions that are developed externally and then read into the UDC Device(s)/Client(s)/Service(s); this may include, but is not limited to, machine executables, applets, plug-ins, software code, and/or structured files). Application of the UDC Client 104 and services on the UDC Device 102 preferably includes the processor 210 implementing the aforementioned executables from internal storage 214 and leveraging onboard memory 212 via the internal bus 218 to conduct the various UDC System 100 operations. For each operation, one or more UDC Services 106 may need to access/communicate with external components (e.g., data sources 20, external storage 248 and other UDC Device(s) 102 (not shown)) through the external and expansions buses (220 and 222, respectively) and their respective inputs, outputs and adapters. Once a UDC operation is complete, the byproducts of the operation (e.g., UDC data and UDC reports) are preferably provided through the UDC Device outputs 226 on the external bus 220. All UDC operations, using the UDC Client 104 and Services 106 on the UDC Device 102, are managed, monitored and controlled via the device peripherals 254 connected through the inputs/outputs of the external bus 222.

The UDC Device 102 may perform one or more processes described herein and may perform these processes based on processor executing software instructions stored by a non-transitory computer-readable medium, such as memory and/or storage described herein. Software instructions may be read into memory and/or storage from another computer-readable medium or from another device via the communication interface. When executed, software instructions stored in memory and/or storage may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are exemplary only. The UDC Device 102 may include additional components, fewer components, different components, or differently arranged components than those shown in FIG. 2. Additionally, or alternatively, a set of components of the UDC Device 102 may perform one or more functions described as being performed by another set of components of the UDC Device 102. Other embodiments of the UDC Device 102 may include any combination of hardware, software and or firmware to enable the descriptions, specification and requirements contained herein.

UDC Client

The UDC Client 104 represents the processing platform that the UDC Services 106 reside upon. The UDC Client includes hardware and software components that actualize service functions into a series of linked operations and qualifies how the system relates to internal and external influences (e.g., UAS data, human input, and system configuration). The UDC Client hosts the UDC Services, facilitates user accessibility, and enables connectivity with other systems, services and/or devices. The UDC Client 104 is preferably implemented via a client architecture, where client architecture is understood to mean a distributed application structure that partitions tasking between clients so that one client provides a service and another client consumes (or receives) that service. In such use, a client is generally defined as a group of processes working together to perform a single collective task.

Figure 3:
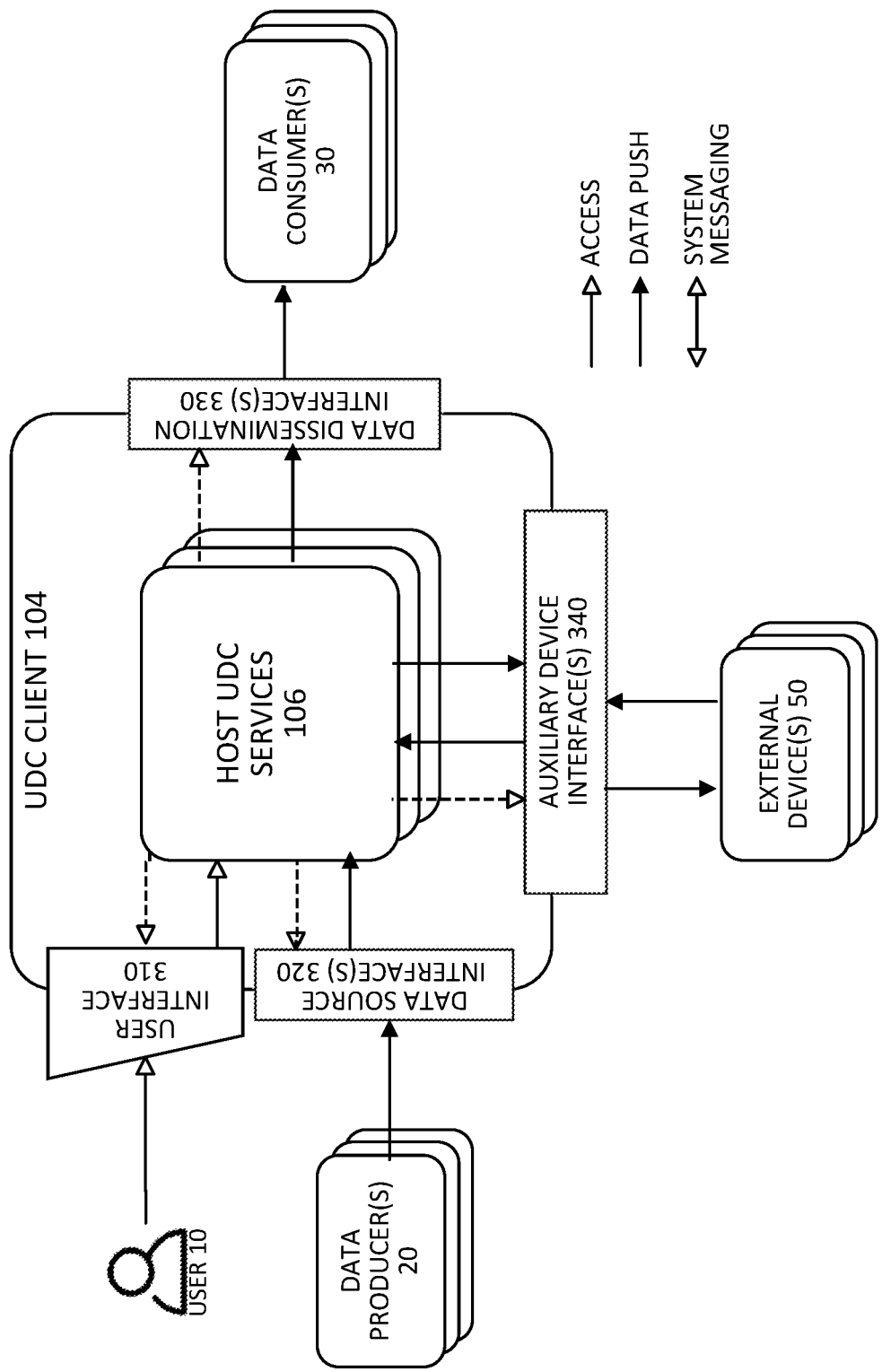
FIG. 3 is a block diagram illustrating core components of an exemplary UDC Client, including host UDC Service(s), user interface(s), data source interface(s), and data dissemination and auxiliary interface(s), in accordance with various aspects of the present disclosure.

In some embodiments (e.g., FIG. 3), the UDC Client 104 includes five core components that may be broadly grouped as follows: Host UDC Service(s) 106; User Interface 310; Data Source Interface(s) 320; Data Dissemination Interface(s) 330; and, Auxiliary Device Interface(s) 340.

User Interface 310 is a device interface (e.g., graphical user interface) by which a user 10 of the UDC Device 102 configures, manages, and utilizes the UDC Client 104 for operation. The User Interface 310 provides access to and overview of the services and interfaces residing upon the client, as well as facilitating configuration, control, and management of those elements. This interface 310 is expressed through a set of device peripherals, which may include both wired peripherals (e.g., wired keyboard, mouse, and/or monitor) and wireless peripherals (e.g., keyboard, mouse, smartphone, tablet, and/or monitor).

User Interface 310 is responsible for interpreting the status messaging generated by the UDC Services 106 and interfaces residing upon the client. In a preferred embodiment, all system messaging, to and from the User 10, is routed through the Access Service (discussed below); thus, the user interface simply interprets the information going into and out of that specific service. Preferably, an interface contract (e.g., Application Programming Interface (API)) is used to map the user interface to the device peripherals as well as offer the user flexibility in how that interface is presented. (It will be appreciated that interface contracts improve software quality through the definition and enforcement of expected behaviors at interface boundaries. They include criteria (or guidelines) for how a connecting system, component, or process meets the specifications, needs, or expectations of each interface boundary). According to one embodiment, a user (or user group) is able to customize the user interface to personal needs and preferences, as well as select device peripherals accordingly. Additional information on user interface mapping and customization will be discussed below.

Data Source Interface(s) 320 are used for data as it enters the UDC Client 104, where such data may be sourced from various data producing systems or sources, external systems (e.g., UAS), batched data files, or other UDC Clients 104 (i.e., in the case of a multi-client UDC 104 (discussed below)(collectively, Data Producers 20). Data Source Interface(s) 320 may include at least one or more of the following: Data stream interface(s) for data acquired from live systems; data file interface(s) for data acquired from batched data files; and/or client-to-client interface(s) for incoming data passed from one client to another client.

Data Dissemination Interface(s) 330 are interfaces for disseminating data as it leaves a UDC Client 104. Data Dissemination Interface(s) 330 may include external delivery interface(s) for delivering data to some external data consumer(s) 30 and client-to-client interface(s) for outgoings data passed from one client to another client. Data dissemination interfaces 330 are preferably enabled through UDC Device outputs and/or a set of device peripherals (e.g., keyboard, mouse, smartphone, tablet, and/or monitor).

Finally, Auxiliary Device Interface(s) (or External Device Interface(s)) 340 are optional interfaces to external devices and provide supplementary information or a support service to the UDC Client 104. External device interfaces may include auxiliary information interface(s) for the provision of supplemental information that aids the processing of sourced data, and accessory service interfaces for the provision of a service that the UDC Client 104 does not inherently offer (e.g., time source and databasing).

Stand-Alone UDC Client

In some embodiments (FIGS. 4A-D), the UDC Client is configured as a single, stand-alone client that operates independently and separate from any other client. The stand-alone UDC Client 404 is preferably a full-featured and self-contained implementation that provides complete access to all UDC Services 106, a common interface for total control and management of the UDC Device 102, a centralized hub for all external device/system connectivity (i.e., all connections are routed through this single stand-alone UDC Client 404), and easy portability for applications involving non-networked operations. This embodiment of the UDC Client 404 is preferably used in applications involving one stakeholder, where the request for, and the provision of, data come from the same party (e.g., one UAS Operator). The stand-alone UDC Client 404 is preferably implemented in one UDC Device 102.

In this embodiment, the aforementioned core components of the UDC Client 404 are preferably configured as follows: The user interface 410 is a client interface (e.g., graphical user interface) by which the user configures, manages, and utilizes the stand-alone UDC Client 404 for his/her/their respective needs. The user interface 410 is preferably enabled through a set of device peripherals 254 (e.g., keyboard, mouse, smartphone, tablet, and/or monitor).

Figure 4A:
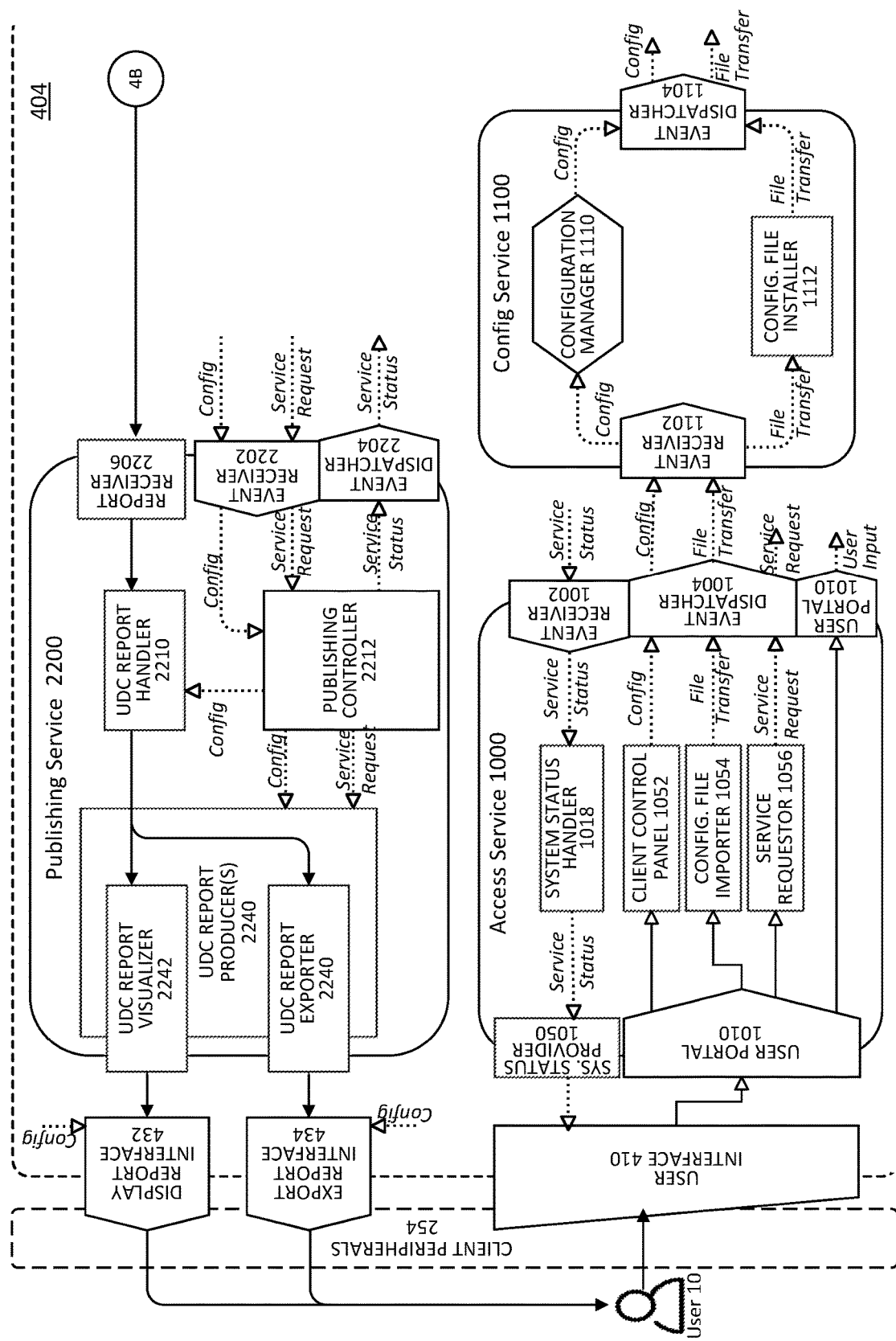
FIGS. 4A-4D are block diagrams illustrating partial views of an exemplary stand-alone UDC Client in accordance with various aspects of the present disclosure.
Figure 4B:
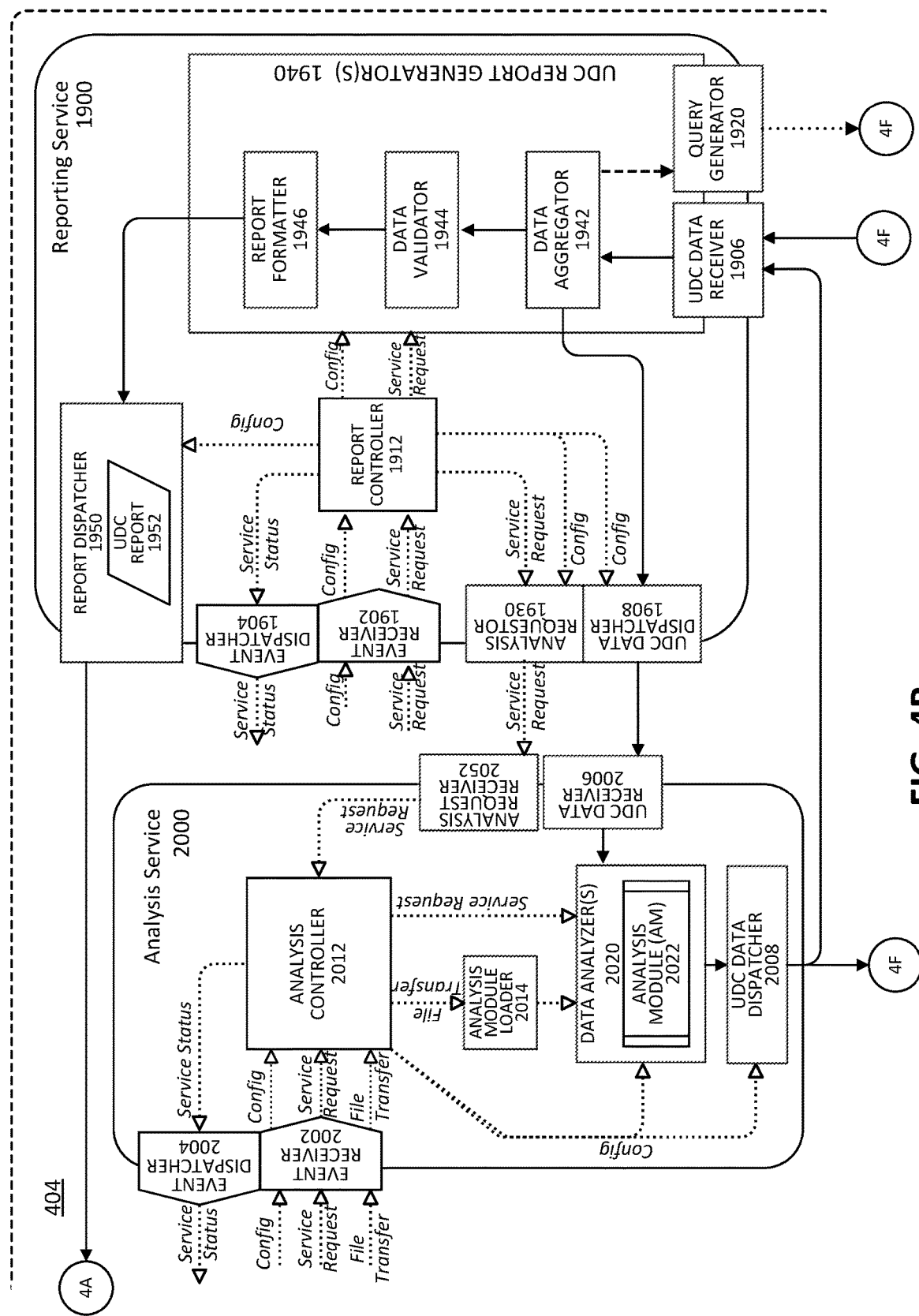
Figure 4C:
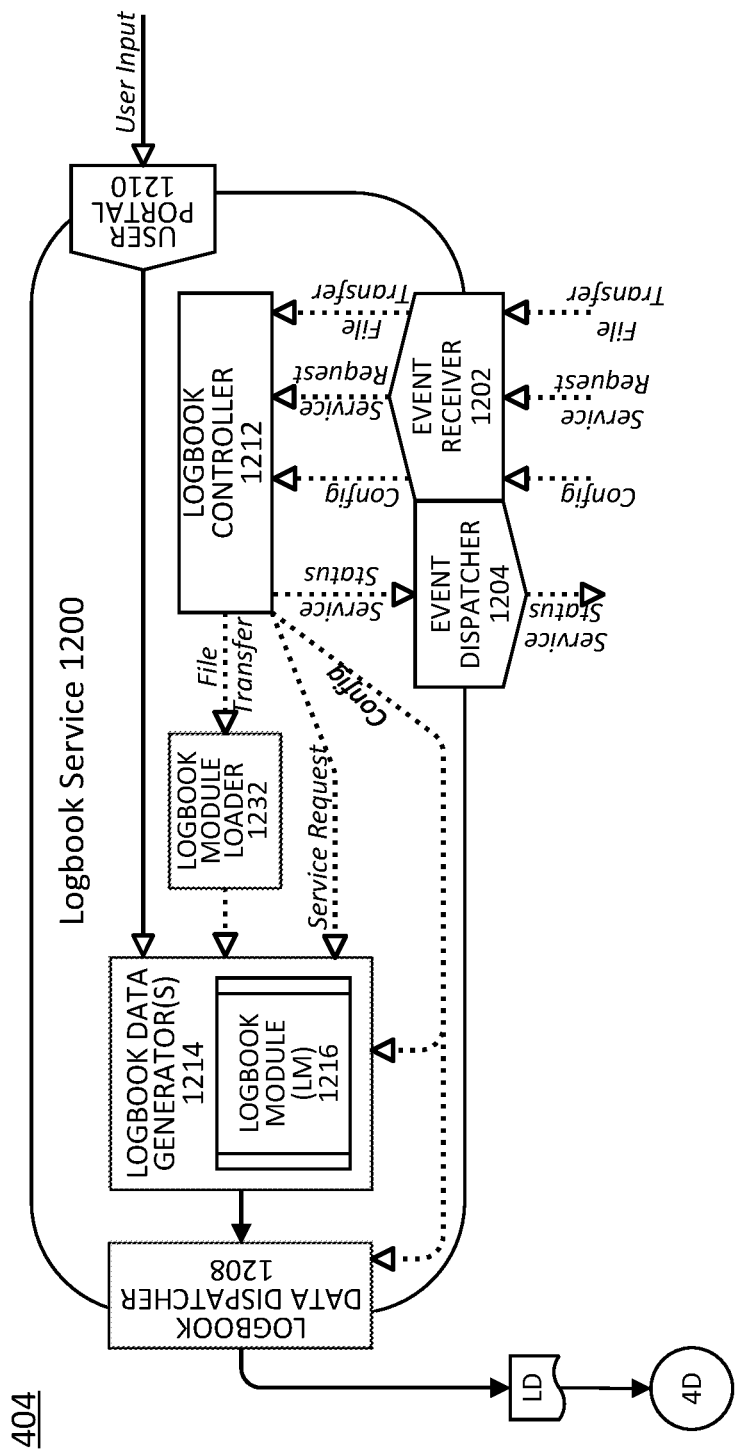

Data Source Interface(s) include a data stream interface 422 that is used to connect the UDC Device 102 to live data sources (e.g., UAS systems 420a, 420b . . . 420$_N$) for receiving operating data 22a, 22b . . . 22$_N$) and a data file interface 424 that is used to import files of previously recorded data 24 (FIG. 4C).

Data Dissemination Interface(s) of the stand-alone UDC Client 404 preferably includes a display report interface 432 for visualizing any report generated/published by the stand-alone UDC Client 404 and an export report interface 434 for exporting a file or files for any report generated/published by the stand-alone UDC Client 404 (FIG. 4A).

Figure 4D:
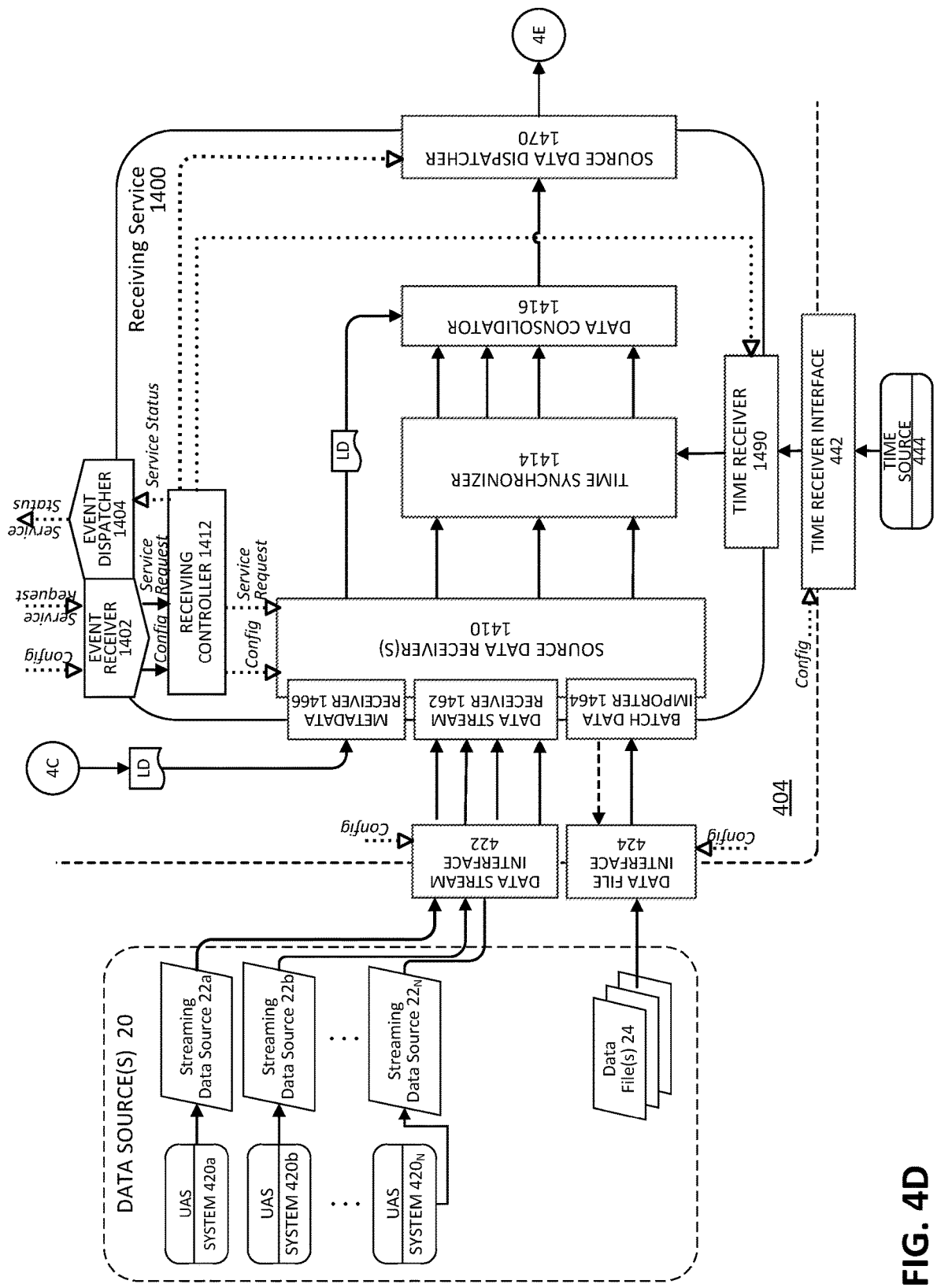
Figure 4E:
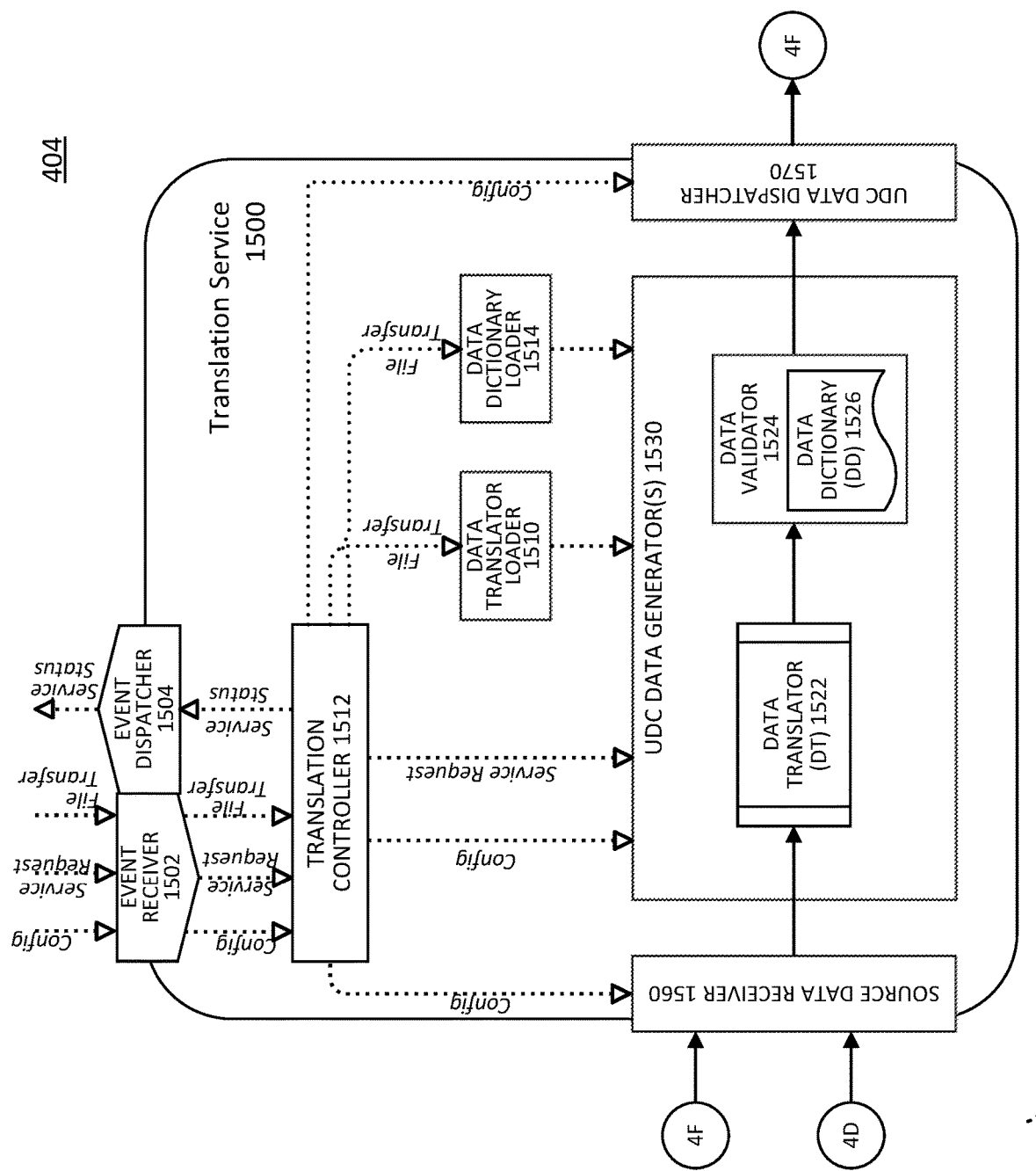
Figure 4F:
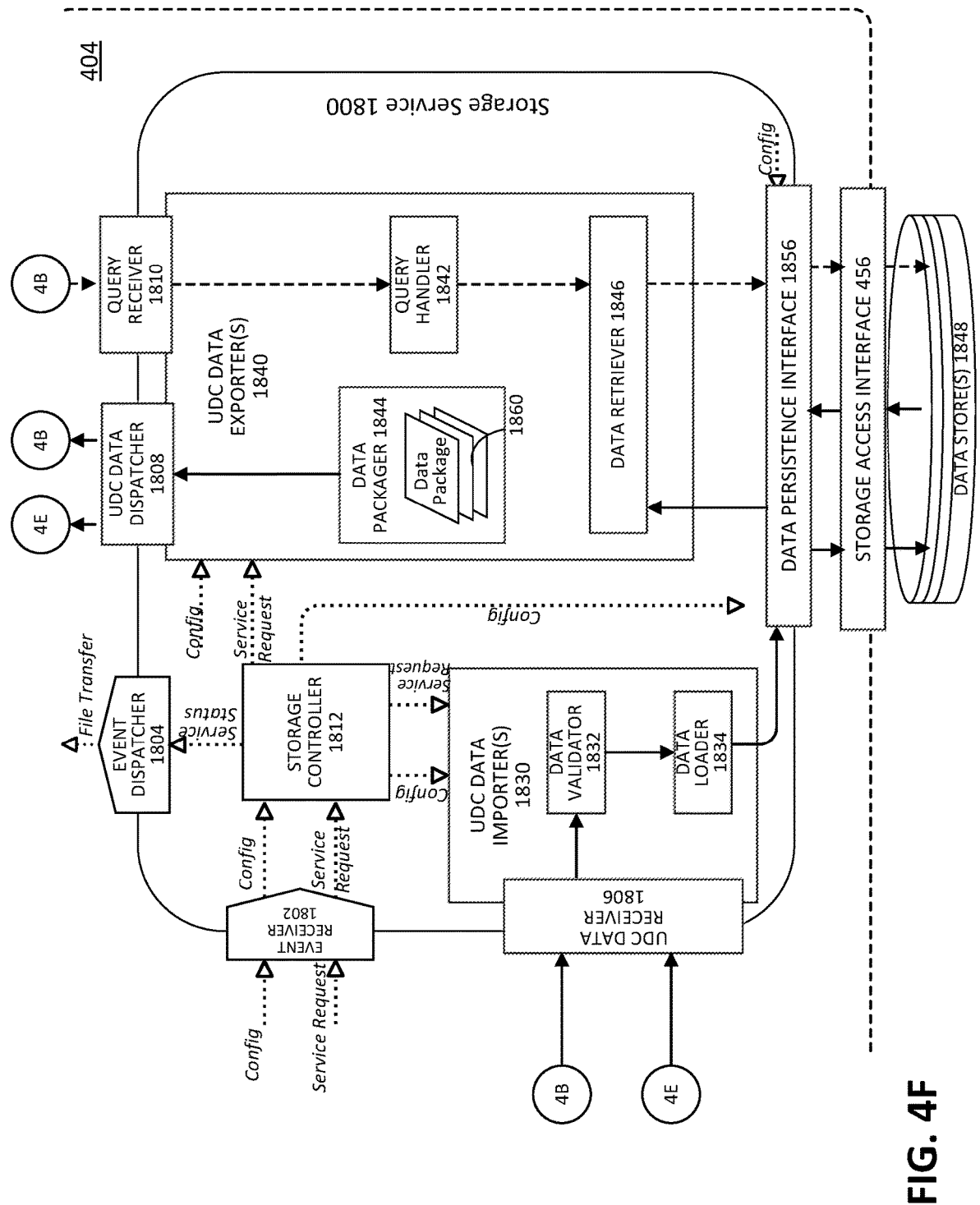

Finally, Auxiliary Device Interfaces of the stand-alone UDC Client 404 include a time receiver interface 442 for connecting and receiving information from a reliably accurate time source 444 (e.g., GPS or Network Time Protocol (NTP) server) and a storage access interface 456 for connecting and depositing or requesting data to/from an external storage device(s) 1848 (FIGS. 4C, 4D).

The stand-alone UDC Client 404 also hosts a number of UDC Client Services 106. In the embodiment of FIGS. 4A-D, the stand-alone UDC Client 404 hosts one or more of the following services: An Access Service 1000; a Configuration Service 1100; a Logbook Service 1200; a Receiving Service 1400; a Translation Service 1500; a Storage Service 1800; a Reporting Service 1900; an Analysis Service 2000; and, a Publishing Service 2200. Other services may be included as appropriate. A detailed discussion of the services on stand-alone UDC Client 404 shown in FIGS. 4A-D is set forth below. All services on the stand-alone UDC Client 404 preferably adhere to the client service sequencing and priority described below (see, FIG. 7).

In operation, a user accesses the stand-alone UDC Client 404 through the user interface 410 to input data and configures the host UDC Services 106 for the specific operations and context of use of the UDC System 100 and UDC Device 102 (e.g., collection of live and/or batched data, storage of and retrieval of stored data, analysis of data, reporting)(UDC System 100 and UDC Device 102 operating states and context of use are discussed in further detail below).

When the stand-alone UDC Client 404 is activated, data is transferred from data source(s) 20 to the stand-alone UDC Client 404 through the data source interface(s) 422, 424, where it is treated by the host UDC Services 106 according to the configuration established by the user(s). As needed, the stand-alone UDC Client 404 communicates and collaborates with external devices through the auxiliary device interface(s) 442, 456 to acquire or facilitate a service it UDC Client 404 does not inherently provide. Once the host UDC Services 106 have finished treating the data, the UDC Client 404 transfers the treated data to any data consumer(s) through the data dissemination interface(s).

Multi-Client UDC

The UDC Client 104 may also be configured as a plurality of clients that are connected through a distributed network by which the clients are able to communicate, collaborate, and exchange information with each other. This multi-client UDC is a distributed implementation of the UDC System 100 and preferably the more common implementation of the UDC Client 104. In general, this implementation lends itself to applications involving multiple stakeholders, where the request and provision of data does not originate from the same party.

As with the stand-alone UDC Client 404 of FIGS. 4A-D, multi-client UDC also hosts a number of services and, in one embodiment, each client of the multi-client UDC 504 hosts one or more of the following services: An Access Service 1000; a Configuration Service 1100; a Logbook Service 1200; a Receiving Service 1400; a Translation Service 1500; a Storage Service 1800; a Reporting Service 1900; an Analysis Service 2000. Other services may be included as appropriate.

The configuration of each client in the multi-client UDC 504 and the services hosted therein will vary depending upon context of use. These services will be dispersed across a plurality of the clients of the multi-client UDC 504 and processed according to the context of use; nevertheless, regardless of their distribution, as with the stand-alone UDC Client 404 embodiment, they will also preferably adhere to the sequencing and priority described below (see, FIG. 7). For example, data stream, data file, and time receiver interfaces preferably only reside on those clients hosting UDC data collection services, whereas a client-to-client interface is preferably included on all clients within a multi-client UDC. A storage access interface preferably only resides on clients hosting UDC data retention service, while preferably only those clients hosting UDC data processing services include display report and export report interfaces.

Figure 5:
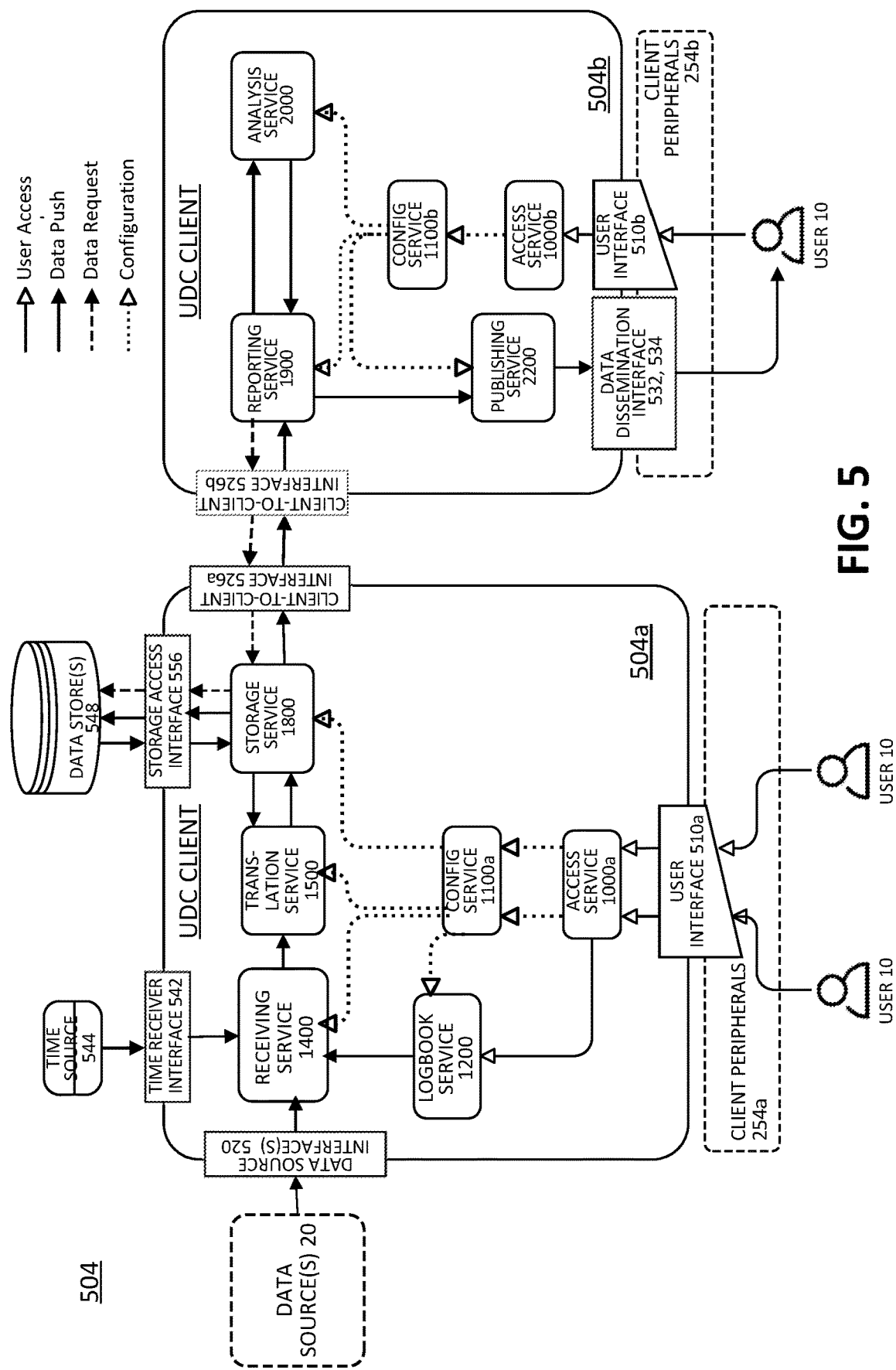
FIG. 5 is a block diagram illustrating an exemplary multi-client UDC in accordance with various aspects of the present disclosure.

An exemplary embodiment of the multi-client UDC 504 is shown in FIG. 5. It will be appreciated that that the configuration shown therein is simply one possible implementation and does not convey every possible configuration of the multi-client UDC 504.

Figure 14:
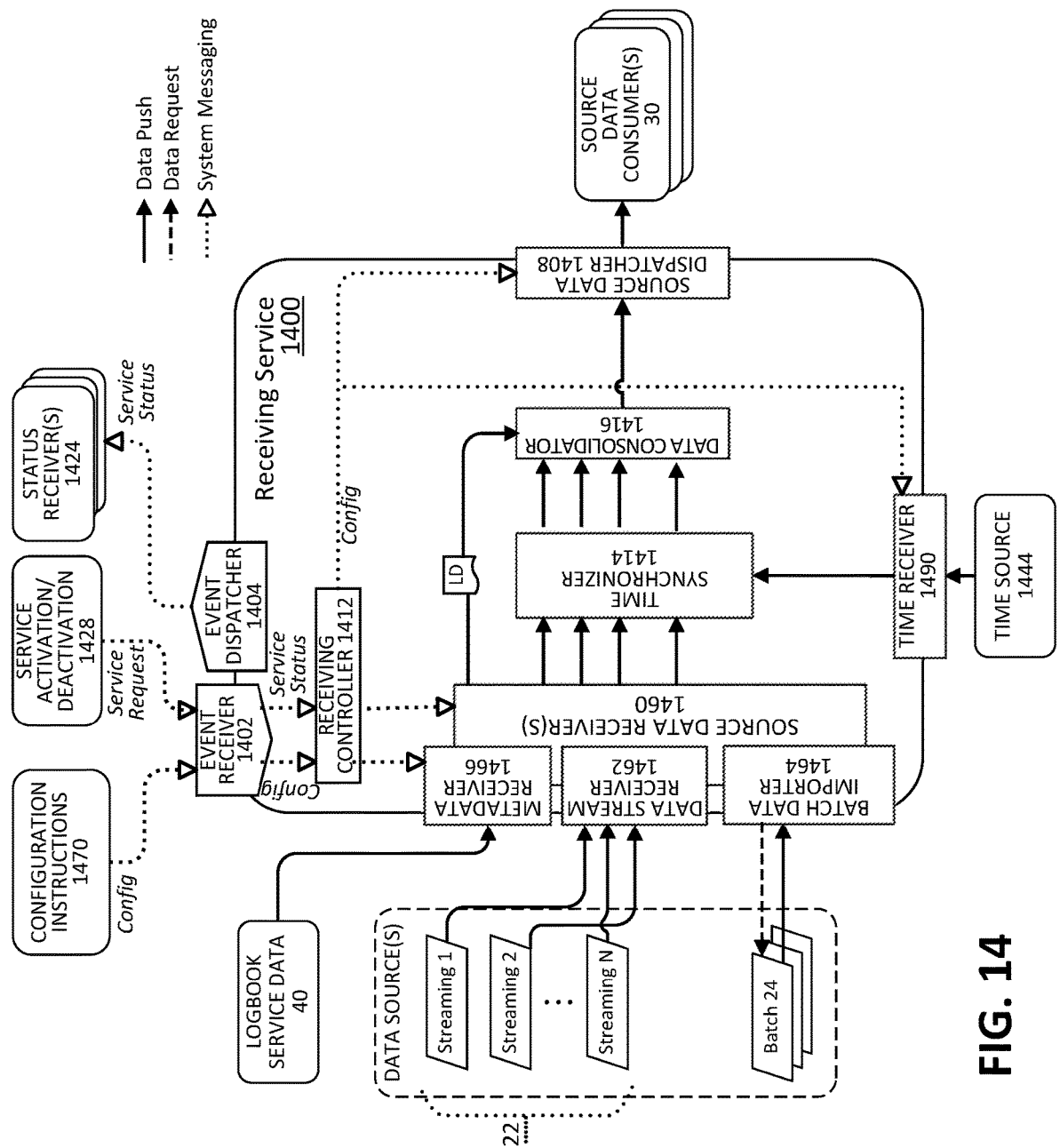
FIG. 14 is a block diagram illustrating an exemplary embodiment of a UDC Receiving Service and its components and data/messaging flows in accordance with various aspects of the present disclosure.
Figure 15:
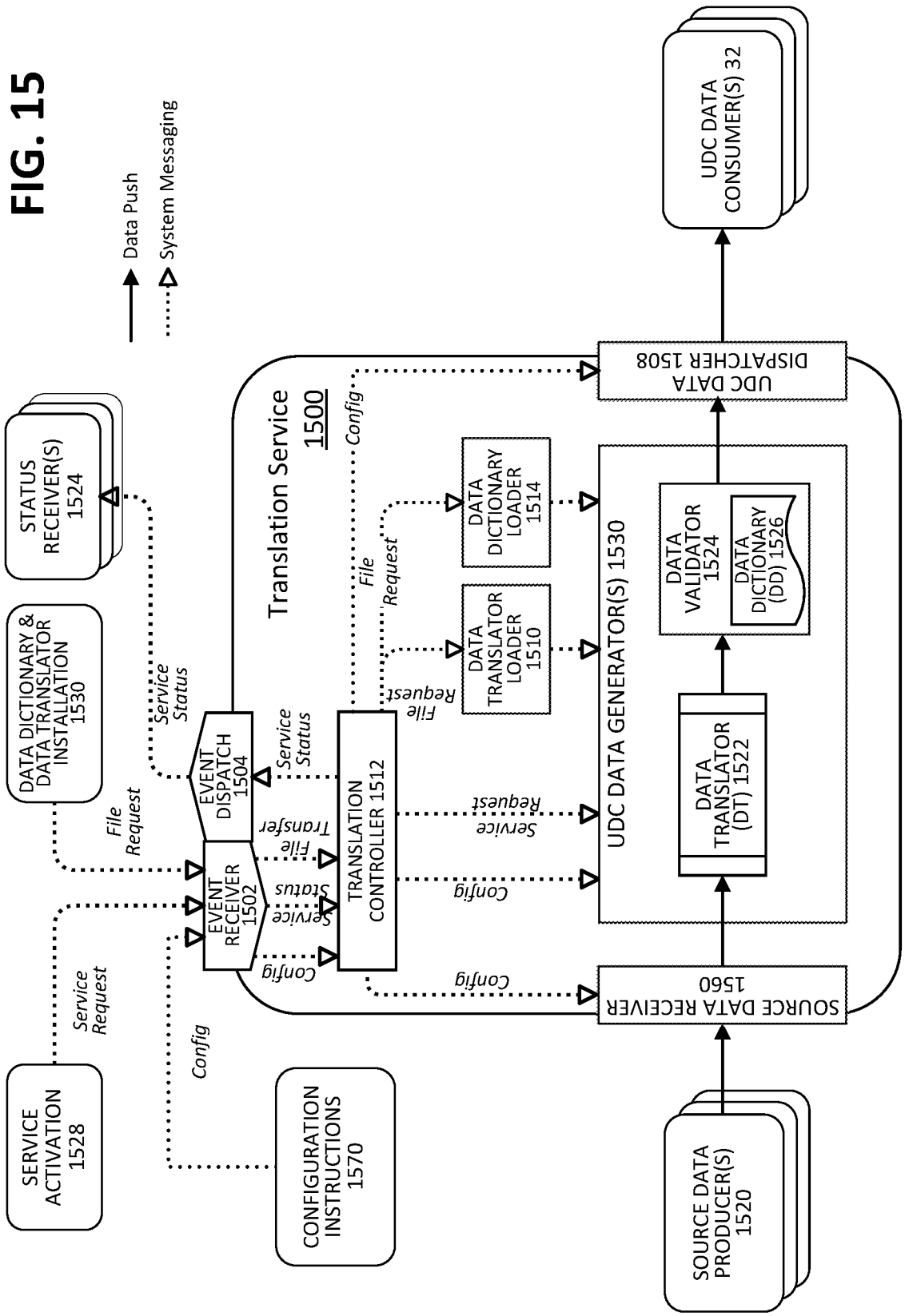
FIG. 15 is a block diagram illustrating an exemplary embodiment of a UDC Translation Service and its components and data/messaging/file flows in accordance with various aspects of the present disclosure.

In this embodiment, each client has a user interface 510a, 510b (e.g., graphical user interface) in order to allow the user to configure, manage, and utilize the client. The user interfaces 510a, 510b are preferably enabled through a set of device peripherals 254a, 254b (e.g., keyboard, mouse, smartphone, tablet, and/or monitor)(not shown). Alternatively, it will be appreciated that a user may remotely interact with multi-client UDC 504; for example, through a remote access mechanism such as a hosted webpage providing access to multi-client UDC 504 through a virtual private network (VPN) or platform hosting secure shell (SSH) software. A first client 504a of the multi-client UDC 504 in this embodiment also includes Data Source Interfaces 520 that, in a preferred embodiment, preferably comprises at least one of three separate data interfaces: A data stream interface that is used to connect the UDC to live data sources (e.g., UAS field operating data); a data file interface for importing files of previously-recorded data; and a client-to-client interface, which is used to receive data from a service in another client (e.g., 504b) of the multi-client UDC 504 (see, FIG. 14 (Receiving Service) for further detail).

The client 504a also includes a Data Dissemination Interface (client-to client interface 526a), which is used to transmit data to a service in another client (e.g., 504b) of the multi-client UDC 504, and two Auxiliary Device Interfaces: A time receiver interface 542 for connecting to and receiving information from a reliably accurate time source 544 (e.g., GPS); and a storage access interface 556 for connecting to, depositing to, and/or requesting data to/from an external storage device(s) 548.

A second client 504b of the multi-client UDC 504 of FIG. 5 includes three Data Dissemination Interfaces: A client-to-client interface 526b, which is used to transmit data to a service in another client (e.g., 504a) of the multi-client UDC 504; a display report interface 532 for visualizing any report generated/published by the multi-client UDC; and, an export report interface 534 for exporting a file for any report generated/published by the multi-client UDC. The Data Dissemination Interfaces 526b, 532, and 534 are preferably enabled through a set of device peripherals 254b (e.g., keyboard, mouse, smartphone, tablet, and/or monitor) (not shown) and/or UDC Device inputs 224 and/or UDC Device outputs 226.

As set forth above, the UDC Services 106 of multi-client UDC 504 will be dispersed across a plurality of the clients according to the context of use. In the embodiment of FIG.

5, client 504*a* hosts an Access Service 1000*a*, a Configuration (Config) Service 1100*a*, a Logbook Service 1200, a Receiving Service 1400, a Translation Service 1500, and, a Storage Service 1800. Client 504*b* hosts only an Access Service 1000*b*, a Configuration (Config) Service 1100*b*, a Reporting Service 1900, an Analysis Service 2000, and a Publishing Service 2200. (A more detailed discussion of the UDC Services 106 of multi-client UDC 504 is set forth below).

Each of the clients in the multi-client UDC 504 may be connected over a distributed network in order to enable the effective and shared utilization of the UDC. The distributed network may be considered any series of linked systems (i.e., nodes) using common/compatible communication protocols effected over digital interconnections for the purpose of sharing resources located on or provided by each network node. The interconnections between these network nodes may be formed from a broad spectrum of telecommunication network technologies, such as physically wired, optical, and wireless radio-frequency methods that may be arranged in a variety of network topologies. Such nodes may include UDC Devices 102, personal computers, servers, networking hardware (e.g., routers, hubs, and switches), or other specialized or general-purpose hosts. The network, in general, may be implemented locally (i.e., compact network confined to a relatively small area/domain) over a private telecommunications network (e.g., a long-distance fiber optic connection from field-flight operations to an operations center), and/or via the Internet.

Figure 6:
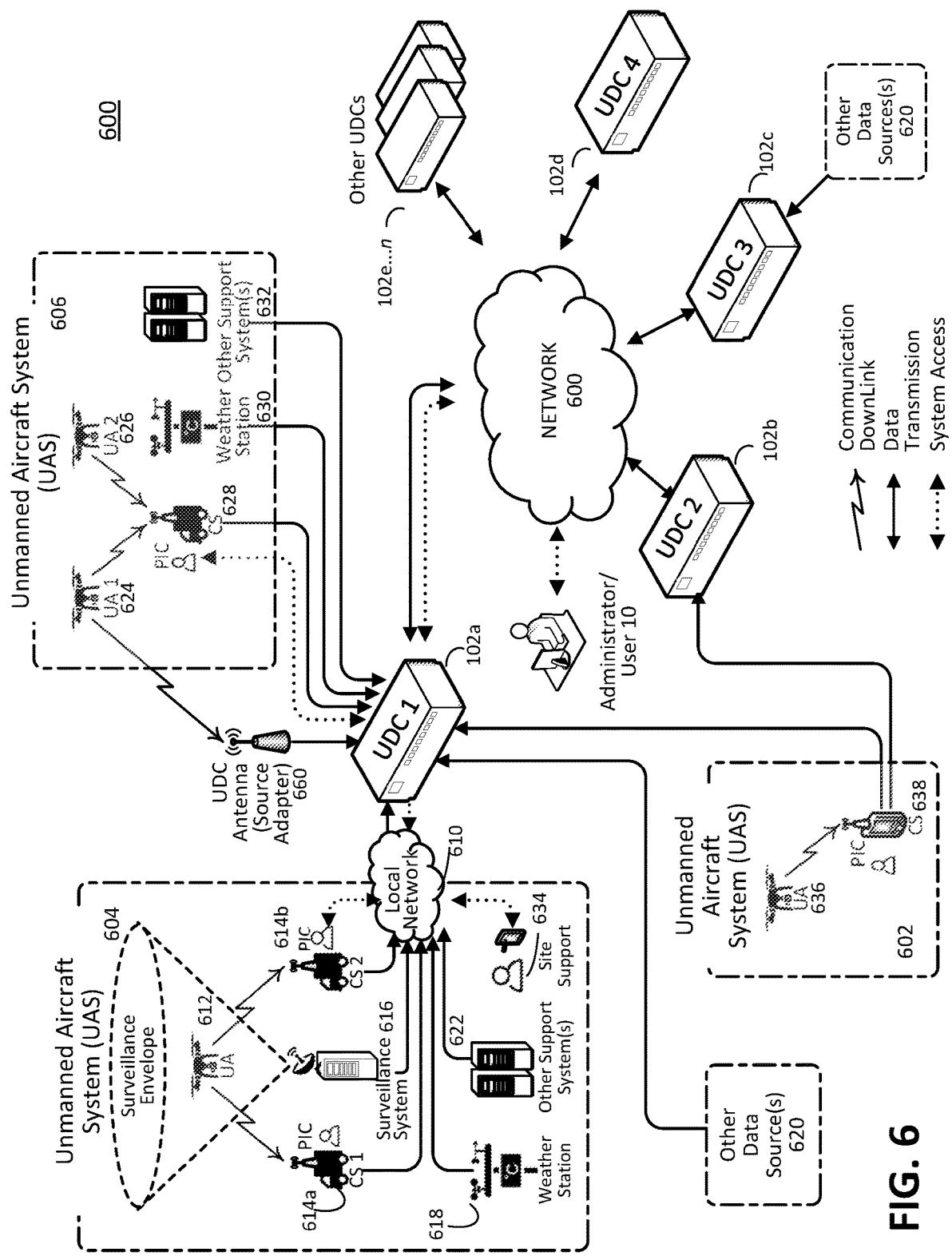
FIG. 6 is a diagram illustrating an exemplary environment for multi-client UDC deployment over a distributed network in accordance with various aspects of the present disclosure.

FIG. 6 is an exemplary embodiment of a distributed network 600 for a UDC System 100 and multi-client UDC 504 deployment. As seen therein, any UDC Device 102 to data source connectivity for the UDC System 100 may be a one-to-one, one-to-many, or many-to-one relationship. For example, as seen in FIG. 6, multiple UAS systems (602, 604, 606) may be connected to provide data to one UDC Device (102*a*), one UAS system (602) may be connected to provide data to multiple UDC Device (102*a*, 102*b*), and/or one data source (620) may be connected to one UDC Device (102*a*). The UDC System 100 may also include additional source adapters (e.g., an antenna 650) to collect data directly from an unmanned aircraft (UA) (e.g., UA 624).

The UDC System 100 may also be configured to connect to local area networks 610 (as needed, to consolidate UAS subsystems onto a single network). For example as seen in FIG. 6, UAS 604 includes UA 612, client stations (614*a*, 614*b*), surveillance systems 616, a weather station 618, site support 634, and other support system(s) 622 connected via a local network 610 to UDC Device 102*a*.

It will be appreciated that multiple clients allow for partitioning of UDC Services 106 in a flexible deployment to mixed environments (i.e., reallocation of clients and services for each new context of use) and amongst diverse user groups. Multiple clients also allow for active collaboration amongst segregated users, while still providing complete control over what data is shared and total system scalability for consortiums ranging from small to large. Here, multi-client implementation may scale anywhere from two clients to an effectively unlimited amount of UDC Clients 104, where each client communicates with the others over a client-to-client interface.

Client Service Sequencing and Service Priority

Irrespective of the network architecture, UDC Client 104 implementation is preferably conditional upon the sequencing of the UDC Services 106 residing upon it. In this context, service sequencing may be understood to mean the order in which UDC Services 106 are sequentially processed within one or more clients. One embodiment of the entire sequencing hierarchy for a UDC Client 104 is shown in FIG. 7.

Figure 7:
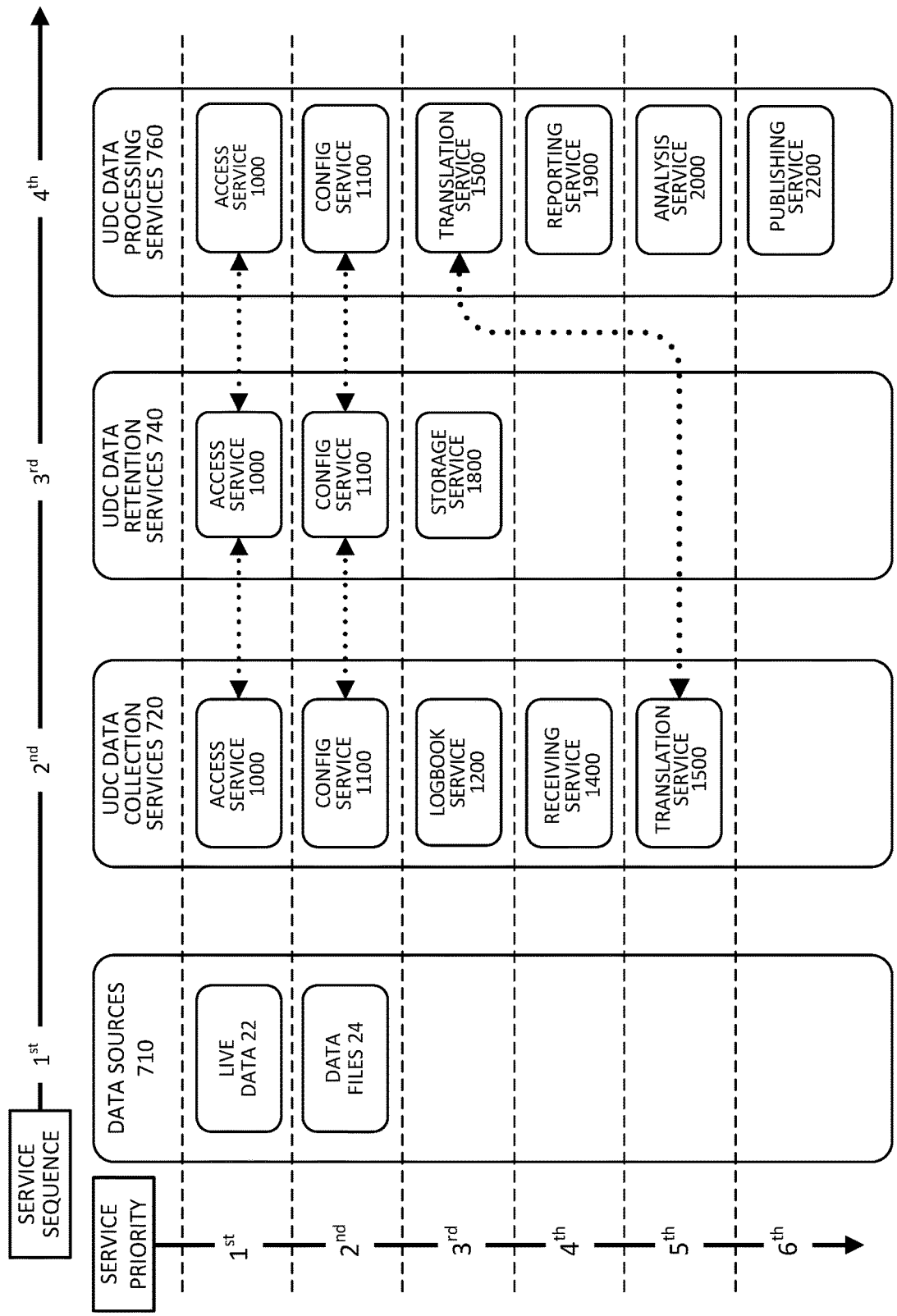
FIG. 7 is a sequencing diagram illustrating an exemplary sequencing and priority of UDC Services in a UDC Client in accordance with various aspects of the present disclosure.

As seen in FIG. 7, each service sequence represents a functional grouping of UDC Services 106 based on the type of operation the UDC Service 106 is capable of performing on data (source and/or UDC data). First order sequence 710 comprises the Data Source(s) from which data is gathered or collected. This first order data sources sequence includes no actual UDC Services 106, but rather establishes that the source of data is to be established before any UDC Service 106 in order for client implementation to be effective. First order sequence data sources include live data 22 and data files 24. The second order sequence is UDC Data Collection Services 720, which includes those services that are used to acquire and generate data from source(s) defined in the first sequence 710. Services in the second sequence preferably include the Logbook Service 1200 and the Receiving Service 1400. The third order sequence, UDC Data Retention Services 740, includes those services that are used to retain data that was generated from services in the second sequence. Services in the third sequence preferably include the Storage Service 1800. The fourth order sequence, UDC Data Processing Services 760, includes those services that are used to process data that was retained by services in the third sequence. Services in the fourth sequence preferably include the Reporting Service 1900, the Analysis Service 2000, and the Publishing Service 2200.

In the embodiment of FIG. 7, all four sequences (and their member constituents) are processed in the order of their assigned sequence number (i.e., first service sequence 710 coming before second service sequence 720; second service sequence 720 before third service sequence 740, etc.). However, there are a few UDC Services 106 for which no sequence is needed and thus that may be processed more freely. These services may be deemed to be 'floating services." As seen in the embodiment of FIG. 7, floating services preferably include the Access Service 1000 (which is preferably a second, third, or fourth order sequenced service), the Config Service 1100 (which is preferably a second, third, or fourth order sequenced service), and the Translation Service 1500 (which is preferably a second or fourth order sequenced service).

In addition to service sequencing, it will be appreciated that each sequence has a priority for the services resident therein. Thus, services will be further processed within each sequence according to this priority. For example, live data services 22 in the first service sequence will be acted upon before any data files 24, Logbook Service 1200 will acted upon before Receiving Service 1400 in the second sequence, etc.

Figure 8:
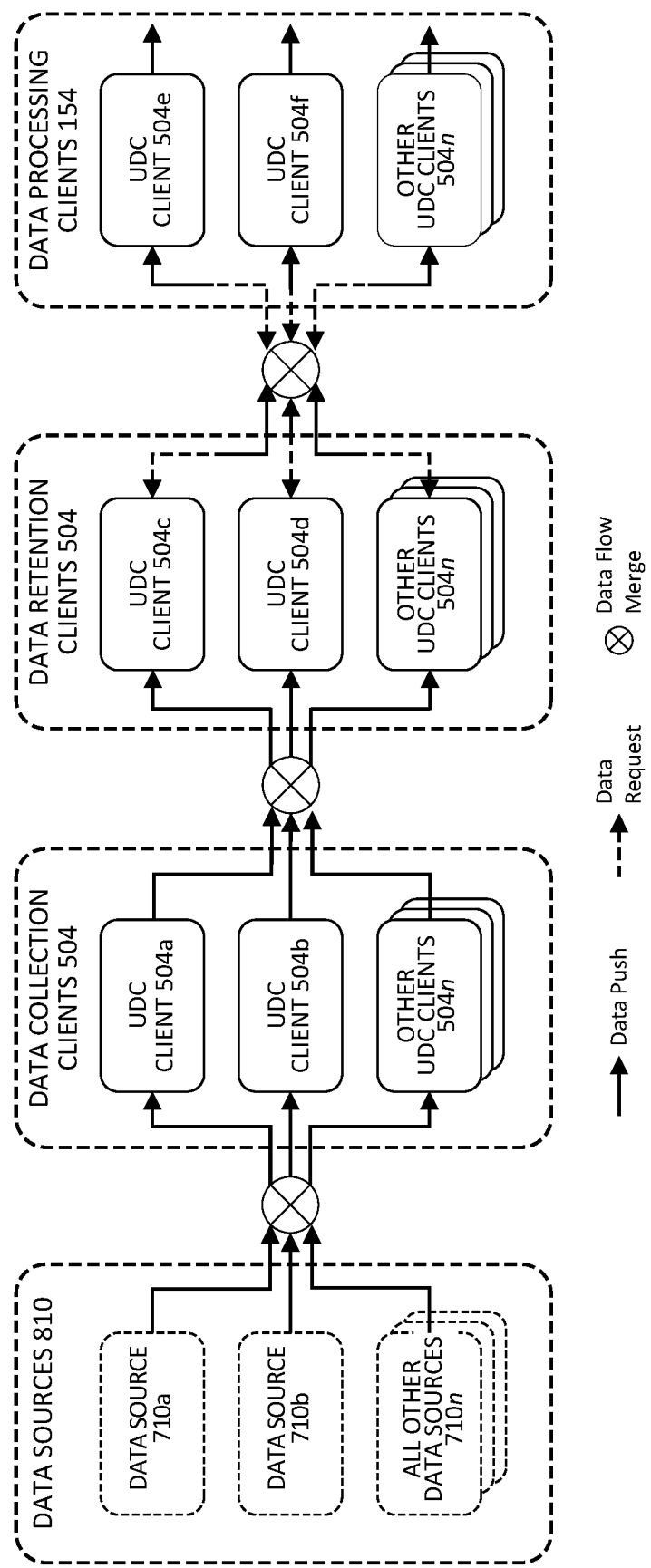
FIG. 8 is a diagram conceptually illustrating the scalability of operation of the UDC Service sequencing of FIG. 7 in a multi-client UDC in accordance with various aspects of the present disclosure.

An example of service sequencing as effected in one embodiment of the multi-client UDC 504 is shown in FIG. 8. As the UDC System 100 transitions from one sequence to another (710 to 720 to 730 to 740), the number of data sources (710*a*, 710*b* . . . 710*n*) and UDC Clients (504*a*, 504*b*, 504*c*, 504*d*, 504*e*, 504*f* . . . 504*n*) may vary from one sequence to the next in specific ways: Many-to-many; many-to-one; one-to-many; and, one-to-one.

It will be appreciated from FIGS. 7 and 8 that UDC System 100, Device(s) 102, and UDC Client(s) 104 allow for parallel processing of UDC Services 106 through multi-threaded operation. Thus, for example, multiple member constituents of UDC Data Collection Services 720 may feed into one or more member constituents of UDC Data Retention Services 740 constituents, multiple member constituents of UDC Data Retention Services 740 may feed into one or more member constituents of UDC Data Processing Services 740, etc.

In a preferred embodiment of the UDC System 100, as long as the multi-client UDC 504 adheres to the sequencing and priority shown in FIG. 7, then client implementation may be otherwise unrestricted in scope and application. Thus the multi-client UDC 504 is effectively infinitely scalable within each ordered sequence. This versatility allows for a highly agile and adaptable system, and is preferably implemented where an extensive network for clients to communicate over is available (e.g., FIG. 6).

It will be further appreciated that the embodiments of the UDC Client 104, 404, 504 herein disclosed provide a highly flexible and adaptive platform for any application (centralized or dispersed) involving the collection, storage, and processing of data. The following subsections describe embodiments of UDC Client 104 implementation, including UDC Services 106, in further detail.

UDC Service(s)

As discussed previously, core UDC functionality is preferably implemented through a set of discrete services. In a preferred embodiment, the UDC Client 104 hosts one or more of the following services: An Access Service for accessing the UDC System; a Configuration Service for configuring the UDC System; a Logbook Service for generating Logbook Data; a Receiving Service for receiving data from connected data sources; a Translation Service for translating data received from connected data sources; a Storage Service for storing translated data; a Reporting Service for requesting, retrieving and reporting data; an Analysis Service; for analyzing data and, a Publishing Service for producing data reports. Each of these services is described in further detail below. Other services may be included as appropriate.

Each of these UDC Services is a combination of interfaces and sub-processes that together implement the root functionality of the UDC Client(s) 104, UDC Device(s) 102, and UDC System 100 described herein. Each of the UDC Services is preferably independent and isolated from each other; cooperating through an exchange of system messaging and/or receiving, dispatching, and requesting of data. Each of the services and member components preferably adheres to a prescribed interface contract; for example, an API.

Figure 9:
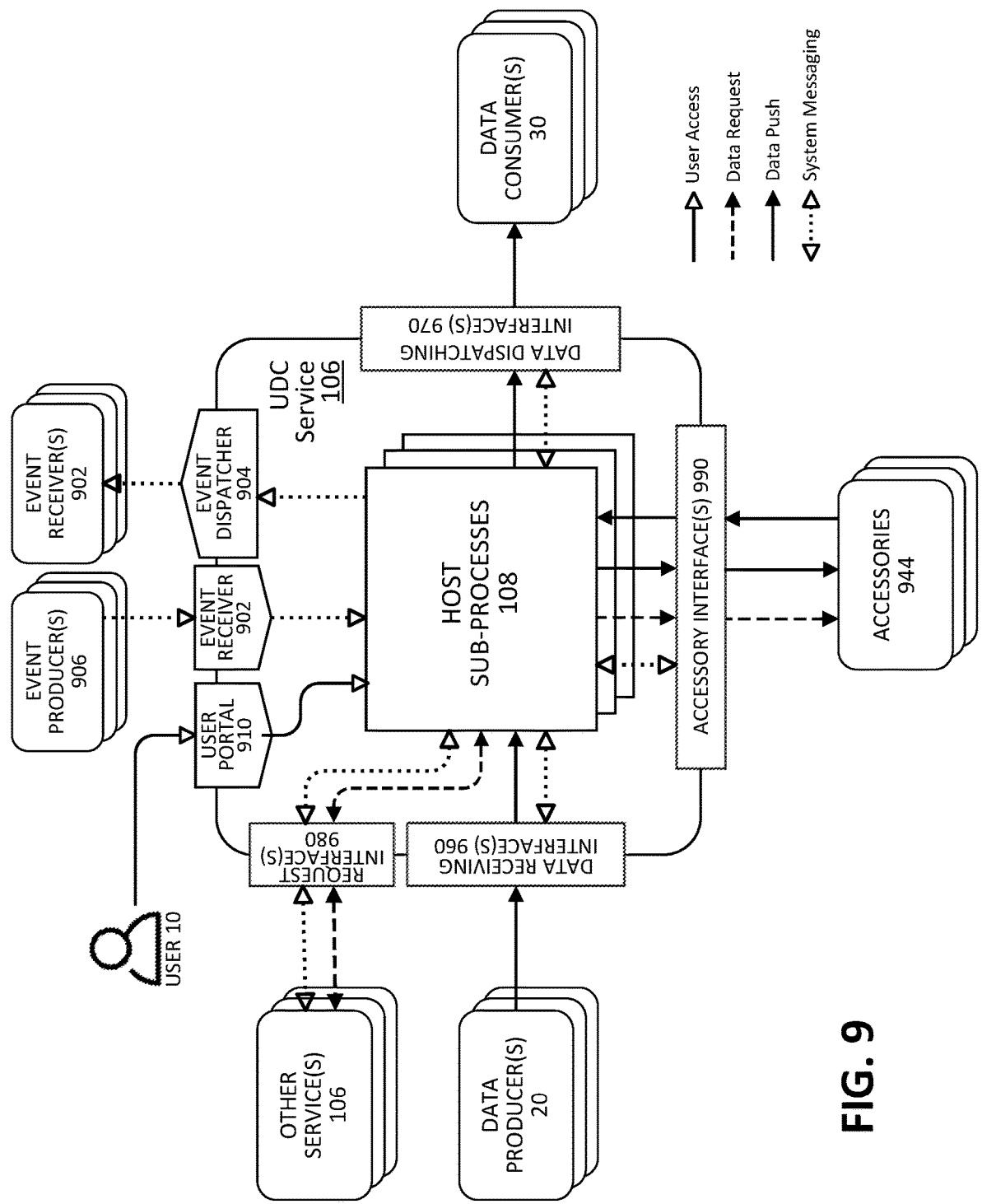
FIG. 9 is a block diagram illustrating core components of exemplary UDC Services, including interfaces and sub-processes, in accordance with various aspects of the present disclosure.
Figure 10:
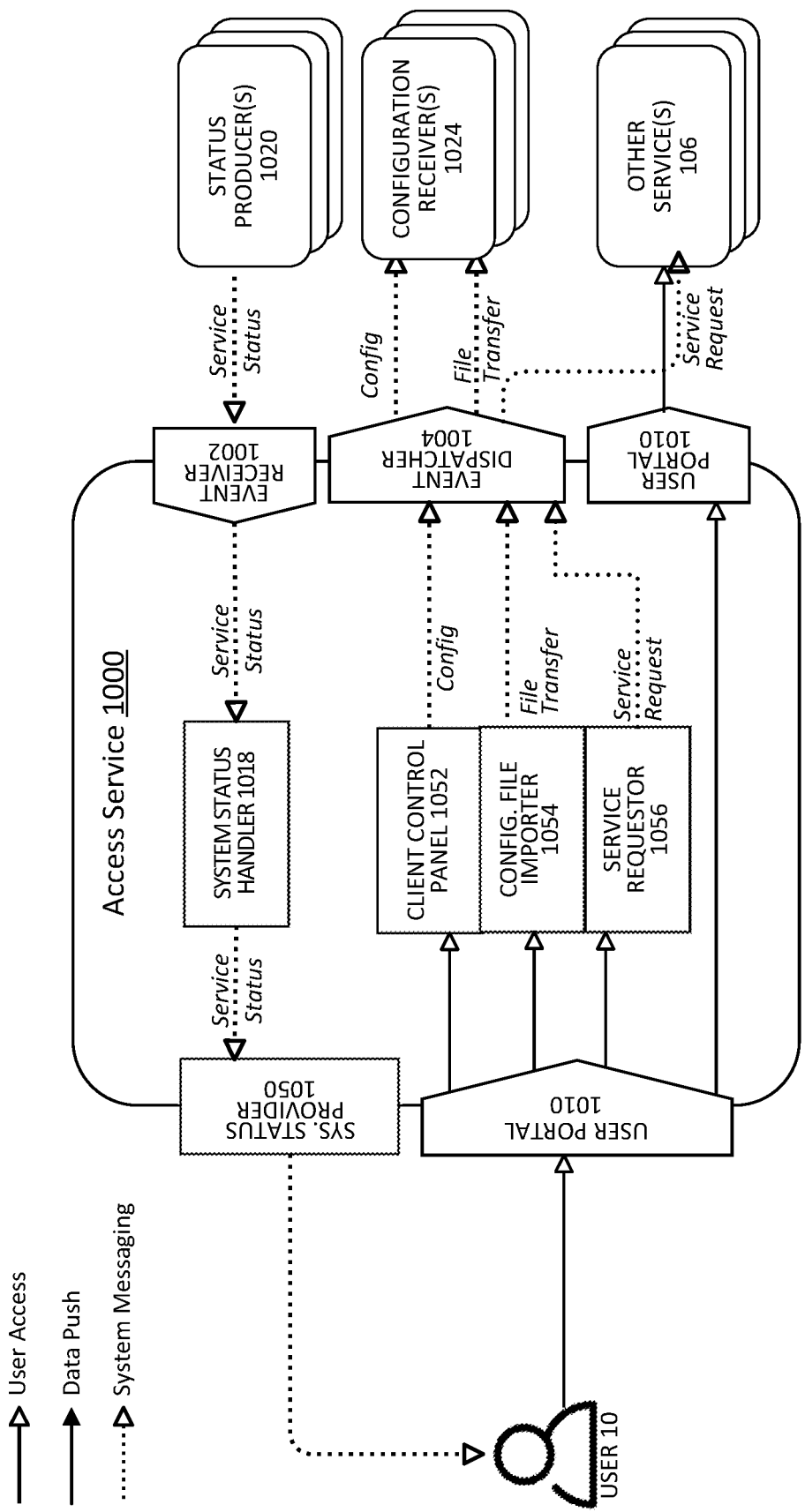
FIG. 10 is a block diagram illustrating an exemplary embodiment of a UDC Access Service and its components and data/messaging flows in accordance with various aspects of the present disclosure.
Figure 11:
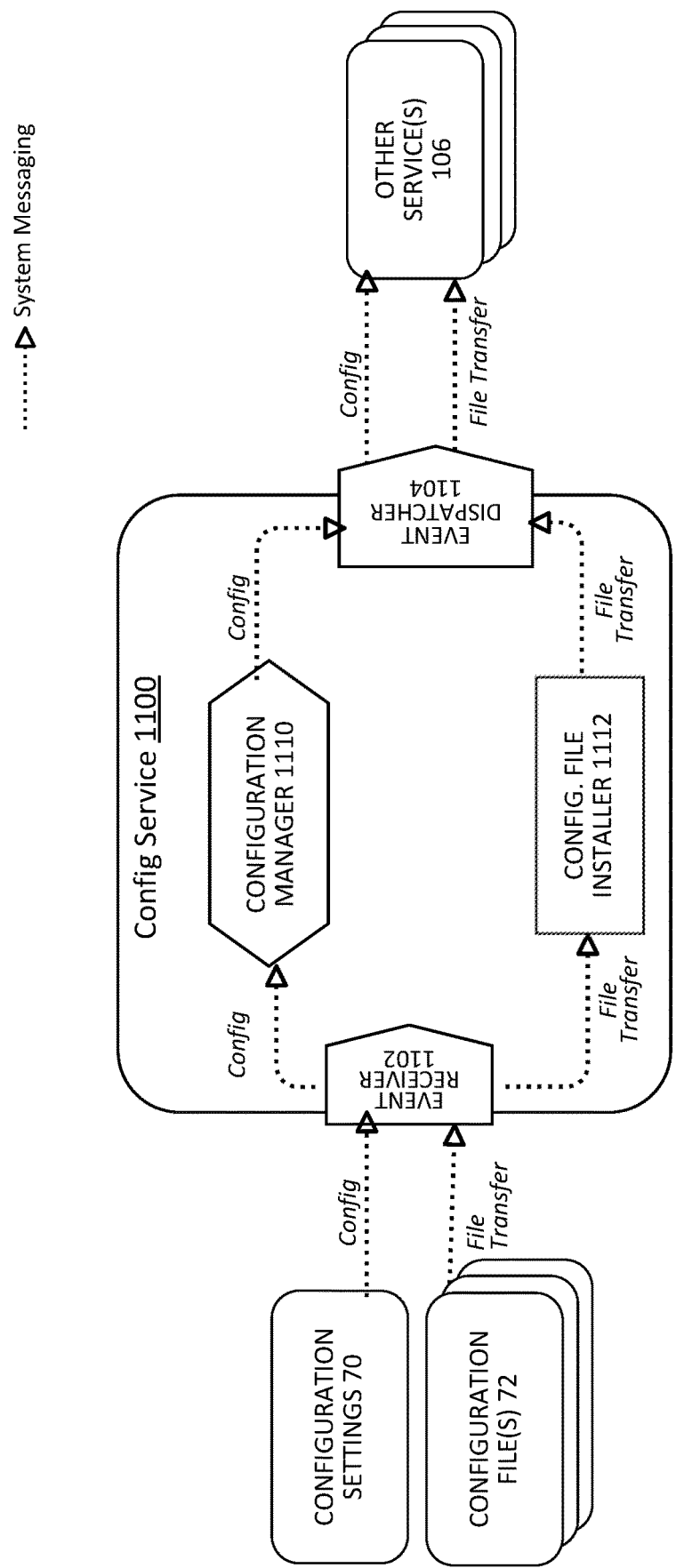
FIG. 11 is a block diagram illustrating an exemplary embodiment of a UDC Configuration (Config) Service and its components and data/messaging flows in accordance with various aspects of the present disclosure.
Figure 12:
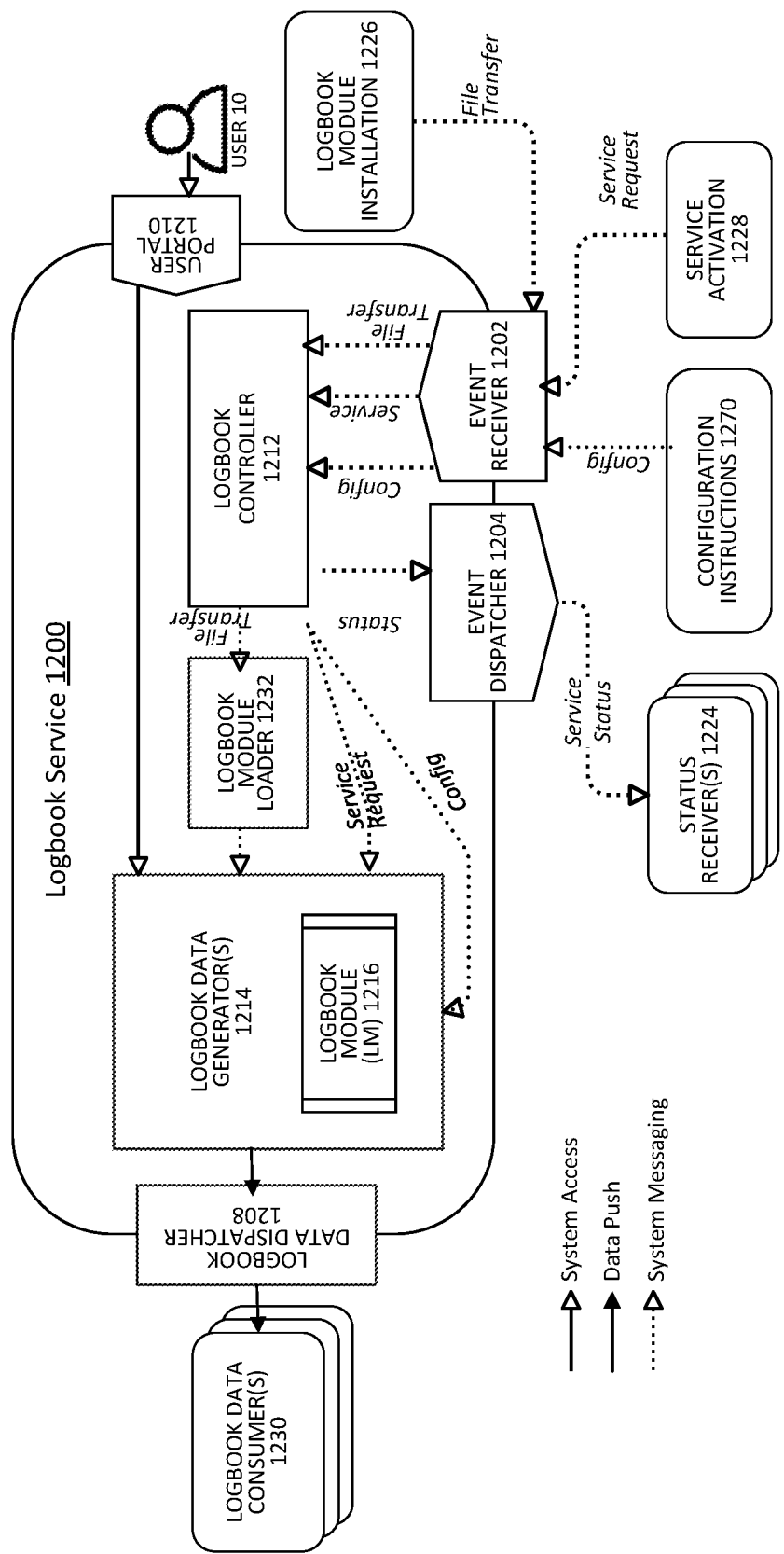
FIG. 12 is a block diagram illustrating an exemplary embodiment of a UDC Logbook Service and its components and data/messaging/file flows in accordance with various aspects of the present disclosure.

More specifically, and with reference to FIG. 9, in a preferred embodiment, each UDC Service 106 will include at least the following two categories of components: Event Handlers and Host Sub-Processes. Event Handlers are Service Interfaces that receive and dispatch all internal system messaging and generally fall into one of two categories: Event Receivers 902 for receiving system messages from outside the service (e.g. from Event Producers 906); and, Event Dispatchers 904 for dispatching system messages generated by the resident service (e.g., to other Event Receivers 902).

Host Sub-Process(es) 108 are a group of sub-processes that comprise key service functions. Sub-processes are preferably unique to the UDC Service 106 they reside upon; however, some of the more common sub-processes on the UDC Client include: Service Controllers, which are responsible for managing all sub-process(es) residing on the service; Data Processors, which are responsible for processing received data; and, System Processors, which are responsible for generating or processing a system event.

Depending upon context of use, UDC Services 106 may also include one or more of the following categories of interfaces: User Portal Interface(s) 910 for redirecting a user 10 to an interactive sub-process on the UDC Service 106; Data Receiving Interface(s) 960 for receiving data into the UDC Service 106 (e.g., from Data Sources or Producers 20); Data Dispatching Interface(s) 970 for dispatching data from the UDC Service 106 (e.g., to consumers of the data 30); Request Interface(s) 980 for exchanging requests between UDC Services 106; and, Accessory Service Interface(s) 990 for connecting accessories 944 to the UDC Service 106. (In FIG. 9, those interfaces and components that are not inclusive to all UDC Services 106 are shown in grey).

Member interfaces of each of these categories are preferably unique to the service they reside upon; however, some of the more common interfaces are set forth below.

Data Receiving Interfaces 960 may include: Source Data Receivers for receiving data from connected data sources; Data Receivers for receiving any data that is generated by the UDC System 100; and Report Receivers for receiving any data report that is generated by the UDC System 100.

Data Dispatching Interfaces 970 may include: Source Data Dispatcher(s) for dispatching data received from connected data sources; Data Dispatcher(s) for dispatching data that is generated by the UDC System 100; and Report Dispatcher (s) for dispatching any data report that is generated by the UDC System 100.

Request Interfaces 980 may include: Query Generator (s)/Receiver(s) for submitting a data query or queries; and Analysis Requestor (s)/Receiver(s) for submitting an analysis request.

Finally, Accessory Interfaces may 990 include: Time Receiver(s) for receiving accurate and reliable time information; and, Data Persistence Interface(s) for data deposit and withdrawal from connected storage device(s).

In one embodiment (e.g., the UDC Client 404 embodiment shown in FIGS. 4A-4D), UDC Services 106 includes each of the service components and their associated event handlers, other interfaces, and host sub-processes to be discussed below. It will be understood that other types, numbers, and permutations of UDC Services 100 and resident event handlers, other interfaces, and host sub-processes may be used without departing from the spirit of the UDC System 100, Device 102, and Client 104 embodiments disclosed herein. Furthermore, while discussion of each of the UDC Services 106 below is had with respect to UDC Client 104 generally and with additional reference to the stand-alone UDC Client 404 embodiment of FIGS. 4A-4D for purposes of clarity of understanding, it will be appreciated that the description of the UDC Services 106, their elements, and their functionalities is also applicable to UDC Services 106 in the multi-client UDC 504. Again, as set forth previously, in view of the distributed nature of the multi-client UDC 504, the UDC Services 106 will be dispersed across a plurality of the clients 504 and processed according to sequencing and priority of services discussed above as well as the context of use.

Access Service

The UDC Access Service provides oversight and control of UDC Services residing upon the UDC Client. The UDC Access Service includes access service interfaces and a plurality of sub-processes, and preferably performs: Configuration assignment; service requests; system status rendering; and, file importation. These functions, along with the sub-processes and interfaces that actuate them, are explained in detail below.

Access Service Interfaces

Referring to FIGS. 4A-D and 10, the Access Service 1000 preferably includes a plurality of access service interfaces, and in one embodiment, includes five: Two User Portals 1010 (i.e., inbound and outbound), an Access Service Event Receiver 1002, an Access Service Event Dispatcher 1004, and a System Status Provider 1050.

The Access Service User Portals 1010 provides the mechanism by which the user 10 interacts with the Client Control Panel 1052, Configuration File Importer 1054, and Service Requestor 1056 sub-processes (all of which are discussed below), as well as providing the means for the user 10 to interact with other UDC Services 106 where additional interactive sub-processes are located.

The Access Service Event Receiver 1002 listens for, receives, and forwards system messages that the Access Service 1000 is subscribed to (e.g., Status Producers 1020). Subscribed events preferably include Service Status messages; that is, system messages that describe the status of an external UDC Service 106. These messages may convey the current configuration properties of an external UDC Service 106 and/or indicate where an external UDC Service 106 is in the lifecycle of a particular operation. The Access Service Event Receiver 1002 preferably forwards system status messages to the System Status Handler sub-process 1018 in the Access Service 1000.

The Access Service Event Dispatcher 1004 transmits system events generated by the Access Service 1000 to external users and consumers. In one embodiment, dispatched events include: Configuration messages and file transfer of configuration file messages, which are forwarded to Configuration Receivers 1024; and, service request messages, which are forwarded to other UDC Services 106.

Access Service Event Dispatcher 1004 configuration messages may be defined as system messages that contain configuration settings that the user has assigned through a selection of settings and options within the Client Control Panel 1052. The Client Control Panel 1052 generates this system event. Access Service Event Dispatcher 1004 file transfer of configuration file messages may be defined as system messages that encapsulate key configuration files imported onto the Access Service 1000 by the user 10 via the Configuration File Importer 1054 (discussed below). The Configuration File Importer 1054 preferably generates this system event. Access Service Event Dispatcher 1004 service request messages may be defined as system messages that issue a request to another (external) service 106. Service requests may include querying the status of an external service or sending an activation command (to an external service) to begin an operation. The Service Requestor 1056 preferably generates this system event. The Access Service Event Dispatcher 1004 publishes these system request messages for consumption by other services within the UDC System 100 (i.e., via a publish-subscribe messaging protocol).

Finally, the System Status Provider 1050 renders service status messages relayed by the System Status Handler 1018 into a format that is presentable to the user 10 through the user interface (e.g., User Interface 410 in FIG. 4A).

Access Service Sub-Processes

The Access Service preferably includes a plurality of sub-processes, and in some embodiments (FIGS. 4A-D and 10) includes four: a Client Control Panel 1052; a Configuration File Importer 1054; a Service Requestor 1056; and, a System Status Handler 1018. Each will be described in detail below.

The Client Control Panel 1052 supplies the user 10 with a navigational representation of the UDC System 100, as well as a series of selectable settings and options that control the services and interfaces residing upon the UDC Client 104. It allows for the user to further refine the baseline configuration of the services and interfaces residing upon the UDC Client 104 that have been implemented by imported configuration files. A user 10 accesses the Client Control Panel 1052 via the User Portal 1010 to provide user input and the Client Control Panel 1052, in turn, renders the user input into system messages containing configuration settings and then pass the system messages to the Access Service Event Dispatcher 1004 for configuration dissemination through the rest of the UDC System 100. (The Client Control Panel 1052 is discussed in further detail below).

The Configuration File Importer 1054 supplies the user 10 with a means of importing one or more configuration files onto the UDC System 100. These configuration files may be modified by a user 10 to support different data collection and/or data processing requirements in the UDC System 100 depending upon the context of use of the UDC System 100. As set forth above, a user 10 accesses the Configuration File Importer 1054 via the User Portal 1010 and imports one or more configuration files onto the sub-process. The Configuration File Importer 1054 then packages the imported configuration files into a system message and sends that message to the Access Service Event Dispatcher 1004 for file transfer to other services within the UDC System 100 (e.g., Configuration Receivers 1024).

The Service Requestor 1056 supplies the user 10 with a means of requesting a service (or operation) from the UDC System 100. A user 10 accesses the Service Requestor 1056 and issues a request for one or more services. The Service Requestor 1056 renders this user input into a system message and sends that message to the Access Service Event Dispatcher 1004 for submission of a service request message for other UDC Services 106 on the UDC System 100.

Finally, the Access Service System Status Handler 1018 manages service status messages received from the Access Service Event Receiver 1002, preparing the messages (e.g., parsing, formatting and cataloguing service status messages) for transmission to the System Status Provider interface 1010.

While each of foregoing sub-processes is preferably configured to carry out only its assigned Access Service 1000 tasks, each may be configured to work in concert with other sub-process and interfaces on the Access Service 1000 to provide the user with consolidated oversight and control of the entire UDC System 100 through the user interface.

Configuration (Config) Service

The UDC Config Service provides configuration management of UDC Services residing upon the UDC Client. The functions of the Config Service preferably include configuration administration and configuration file installation. Config Service includes Config Service Interfaces and a plurality of sub-processes, each of which is discussed in detail below.

Config Service Interface

The Config Service Interfaces preferably includes a plurality of interfaces, and in some embodiments (FIGS. 4A-D and 11) includes two: A Config Service Event Receiver 1102; and, a Config Service Event Dispatcher 1104.

The Config Service Event Receiver 1102 listens for, receives, and forwards system messaging that the Config Service 1100 is subscribed. Subscribed events preferably include configuration messages and file transfer of configuration file messages. In the case of Config Service Event Receiver 1102, configuration messages may be defined as system messages that contain configuration instructions 70 that the user has assigned through a selection of settings and options within the Client Control Panel 1052 on the Access Service 1000. File transfer of configuration file messages may be defined as system messages that encapsulate key configuration files 72 imported by the user via the Configuration File Importer 1054 on the Access Service 1000. The Config Service Event Receiver 1102 forwards configuration messages to the Configuration Manager 1110 sub-process and routes file transfer messages to the Configuration File Installer sub-process 1112, both of which are discussed below.

The Config Service Event Dispatcher 1104 transmits system events generated by the Config Service 1100 to other UDC Services 106. Dispatched events preferably include configuration messages and file transfer of configuration file messages. Similar to Config Service Event Receiver 1102, in the case of Config Service Event Dispatcher 1104, configuration messages may be defined as a system message that contains configuration instructions that are derived from configuration instructions 72 assigned by a user and which are used to configure external UDC Services 106. The Configuration Manager 1110 preferably generates this system event. File transfer of configuration file messages may be defined as a system message that encapsulates key configuration files 72 intended for installation on an external UDC Service 106. The Configuration File Installer 1112 on the Config Service 1100 preferably generates this system event. The Config Service Event Dispatcher 1104 publishes these system messages for consumption by other UDC Services 106 within the UDC System 100 (i.e., a publish-subscribe messaging protocol).

Config Service Sub-Processes

The Config Service 1100 preferably includes a plurality of sub-processes, and in the embodiments of FIGS. 4A-D and 11, includes two: A Configuration Manager 1110; and, a Configuration File Installer 1112.

The Configuration Manager 1110 is preferably an automatic sub-process that manages the administration of configuration throughout the UDC System 100. The Configuration Manager 1110 receives configuration system messages and renders the assigned settings 70 therein into a set of configuration instructions. Those instructions include directives for the collection, retention, and/or processing of data by the UDC System 100. Preferably, the Configuration Manager 1110 generates a unique set of instructions for each service 106 residing upon a UDC Client 104, and dispatches those instruction sets as separate configuration messages
 each intended for a specific UDC Service 106—via the
  Config Service Event Dispatcher 1104.

The Configuration File Installer 1112 is preferably an automatic sub-process that manages the installation of configuration files throughout the UDC System 100. The Configuration File Installer 1112 receives a file transfer of one or more configuration files 72 (e.g., the Data Translator 1522 and Data Dictionary 1526 (both part of the Translation Service 1500), the Logbook Module 1216 (part of the Logbook Service 1200), and Analysis Module (part of Analysis Service 2000) (all discussed below)), and parses those files for installation on other services 106 within the UDC System 100. Parsing preferably involves identifying each configuration file 72, assigning it to a specific UDC Service 106, packaging it for transmission, and generating specific installation instructions for each package. Preferably, the Configuration File Installer 1112 generates a unique file installation package for select UDC Services 106 residing upon the UDC Device 104, and dispatches those packages as separate file transfer messages—each intended for a specific UDC Service 106—via the Config Service Event Dispatcher 1108.

Logbook Service

The Logbook Service is a mechanism for generating logbook data (i.e., 'meta data' or 'static data') from user input). The functions of the UDC Logbook Service preferably include: Logbook modification; generation of logbook data; and, dispatch of logbook data to external consumers. In one embodiment, the Logbook Service includes Logbook Services Interfaces and a plurality of Logbook Service sub-processes. These components and functions are discussed in detail below.

Logbook Service Interfaces

The Logbook Service 1200 preferably includes a plurality of interfaces, and in some embodiments (FIGS. 4A-D and 12), includes four: A User Portal 1210; a Logbook Service Event Receiver 1202; a Logbook Service Event Dispatcher 1204; and, a Logbook Service Data Dispatcher 1208.

The Logbook Service User Portal 1210 provides a means for the user 10 (e.g., an administrator) to access the Logbook Data Generator 1214 (discussed below) on the Logbook Service 1200.

The Logbook Service Event Receiver 1202 listens for, receives, and forwards system messaging that the Logbook Service 1200 is subscribed to. In one embodiment, the Logbook Service Event Receiver 1202 sends all received system messages to the Logbook Controller 1212 (described below). Subscribed events preferably include configuration messages, file transfer of configuration file messages, and service requests. In the case of Logbook Service Event Receiver 1202, configuration messages may be defined as a system message that contains configuration instructions 1270, preferably derived from configuration settings assigned by the user 10 that are used to configure the Logbook Service 1200. File transfer of configuration file messages may be defined as system messages that encapsulate the Logbook Module 1216 (described below), which is intended for installation 1226 on the Logbook Service 1200. Service request messages may be defined as system messages 1228 that activate the Logbook Service 1200 for user input and logbook data generation by the Logbook Data Generator 1214 (described below).

The Logbook Service Event Dispatcher 1204 transmits system events generated by the Logbook Service 1200 to external Logbook Data Consumers 1230. The Logbook Service Event Dispatcher 1204 preferably publishes these system messages for consumption by other services within the UDC System 100 (i.e., via a publish-subscribe messaging protocol). Dispatched events from the Logbook Service Event Dispatcher 1204 preferably include service status messages (e.g., to other UDC Services 106 that are subscribed as Status Receivers 1224), which may be defined for the Logbook Service Event Dispatcher 1204 as system messages that signify the status of the Logbook Service 1200. Service status messages preferably indicate the state that the Logbook Service 1200 is in for a particular UDC operation (see below for discussion of UDC System 100 operational states). Logbook Service 1200 status may include a message such as 'Logbook Service Ready;' however, it will be appreciated that other messages may be used instead.

The Logbook Service Data Dispatcher 1208 is a Data Dispatching Interface that transmits data generated by the Logbook Data Generator 1214 to Logbook Data Consumers 1230. In one embodiment, the Logbook Service Data Dispatcher 1208 is configurable and may be configured to receive a command from the Logbook Controller 1212 to dispatch UDC data to select recipients and to assign a transmission destination for any data generated by the Logbook Service 1200. Such assignment may include issuing an address (or addresses) for data recipient(s) 1230 of logbook data. The Logbook Controller 1212 then configures the Logbook Service Data Dispatcher 1208 for data transmission to those addresses exclusively.

Logbook Service Sub-Processes

The Logbook Service 1200 preferably includes a plurality of sub-processes, and in some embodiments (FIGS. 4A-D and 12), includes three: a Logbook Controller 1212; a Logbook Module Loader 1232; and, a Logbook Data Generator 1214. Each will be discussed in detail below.

The Logbook Controller 1212 is an automatic sub-process that preferably manages the configuration, activation, and general functioning of the Logbook Service 1200. The Logbook Controller 1212 receives all system messages from the Logbook Service Event Receiver 1202 and renders them into a series of commands for disbursement throughout the Logbook Service 1200. The functions it performs depend upon the type of received message.

In response to configuration messages received from the Logbook Service Event Receiver 1202, the Logbook Controller 1212 may perform any of the following actions: Commanding the Logbook Data Generator 1214 to configure itself based upon assigned configuration settings; and, commanding the Logbook Service Data Dispatcher 1208 to dispatch data according to designated data transmission routes. The Logbook Controller 1212 also preferably performs the following action in response to file transfer messages received from the Logbook Service Event Receiver 1202: Commanding the Logbook Module Loader 1232 (discussed below) to load the assigned Logbook Module 1216 into the Logbook Data Generator 1214. Finally, in response to service request messages received from the Logbook Service Event Receiver 1202, the Logbook Controller 1212 also commands the Logbook Data Generator 1214 to activate and prepare for user input and logbook data generation.

The Logbook Controller 1212 also preferably monitors the Logbook Service 1200 sub-processes and Logbook Service interfaces and reports the status of the Logbook Service 1200 as it progresses through various operations. Finally, the Logbook Controller 1212 further preferably generates service status messages, as needed, and sends them to the Logbook Service Event Dispatcher 1204 for publishing within the UDC System 100 (e.g., to other UDC Services 106 that are subscribed as Status Receivers 1224).

The Logbook Module Loader 1232 is an automatic sub-process that loads a Logbook Module file 1216 into the Logbook Data Generator 1214. The Logbook Module Loader 1232 preferably receives a command from the Logbook Controller 1212 to a load a specific Logbook Module 1216, and then inserts that designated Logbook Module 1216 within the Logbook Data Generator 1214.

The Logbook Data Generator 1214 is an interactive sub-process that allows a user to generate logbook data within the UDC System 100. The Logbook Data Generator 1214 is preferably configurable, where such configuration is derived from user assigned settings and options. In this embodiment, such configuration may include: Sub-process instantiation (i.e., implementing one or more Logbook Data Generators 1214); assignment of Logbook Modules 1216; and, constraint of logbook data generation.

More particularly, in this embodiment, the Logbook Controller 1212 may instruct the Logbook Service 1200 to instantiate one or more Logbook Data Generators 1214, where each Logbook Data Generator 1214 receives a unique set of configuration instructions 1270. Each Logbook Data Generator 1214 is configurable to receive commands from the Logbook Controller 1212 to execute at least one of the following: Utilization of a specific Logbook Module 1216, where each Logbook Data Generator 1214 parses through the files loaded by the Logbook Module Loader 1232 and assigns the specified/designated Logbook Module 1216 to its configuration file slot (not shown); and, production of a specific set of logbook data including defining the amount of data submissions (i.e., permitted amount of logbook entries per collection exercise), issuing handling instructions (i.e., how logbook data ought to be treated elsewhere within the UDC System 100), and regulating read/write permissions (i.e., allowances for editing logbook data).

The Logbook Module 1216 is preferably an internal component of the Logbook Data Generator 1214 sub-process and is preferably an optional applet or other small application that is used to configure how logbook data is generated within the Logbook Service 1200. The Logbook Module 1216 provides an administrator or other user 10 the ability to enter/input logbook data that may be used for general record keeping purposes or appending supplementary information to any sourced data. Preferably this is effected by the administrator or other user 10 accessing the Logbook Data Generator 1214 via the Logbook Service User Portal 1210 to enter data into the Logbook Module 1216. The Logbook Module 1216 is preferably configured to: Provide the list of questions/queries to present to the user; define allowable responses; and, administer a basic cataloguing schema for data. Further, the Logbook Module 1216 may be customized by the administrator or other user 10 based upon requirements found within the Data Dictionary 1526 (part of the Translation Service 1500 discussed below) and/or simple record-keeping needs.

In the exemplary embodiment of FIG. 13, the Logbook Module 1216 includes a number of simple queries/questions each of which solicits a—selective or open-ended—static response from the user. These queries/questions may be presented to the user on a UDC Device 102 display (e.g., a display screen)(not shown) as a form 1310 with multiple fields 1320 for inputting pre-flight log data such as flight ID, mission ID, operator ID, date, aircraft takeoff location, time, and weight, aircraft fuel weight, aircraft fuel weight, planned flight route, and/or any other pre-flight data/information of interest. It may also include multiple fields 1330 for inputting aircraft log data, such as the Make and Model of the aircraft, Aircraft ID, FAA Registration Number, Life of the Aircraft, and/or date of Last Inspection. It will be appreciated that alternate or additional data may be included in the logbook.

Once data is submitted by the user 10 through the Logbook Module 1216, the Logbook Data Generator 1214 renders that input into a data package and passes that logbook data to the Logbook Service Data Dispatcher 1208 for dissemination to Logbook Data Consumers 1230. Logbook data is preferably treated as source data 20 within the UDC System 100 and handled accordingly. As noted above, the Logbook Service 1200 may have multiple Logbook Data Generators 1214, any or all of which may be simultaneously operational.

Receiving Service

The Receiving Service provides a mechanism for ingesting source data into the UDC System. The Receiving Service functions preferably include: Receiving data from at least one external source; synchronizing and consolidating received data; and, dispatching source data to external consumers. The Receiving Service includes Receiving Service Interfaces and a plurality of Receiving Service sub-processes, each of which is discussed in detail below.

Receiving Service Interfaces

The Receiving Service preferably includes a plurality of interfaces and, as seen in the embodiments of FIGS. 4A-D and 14, includes seven: A Receiving Service Event Receiver 1402; a Receiving Service Event Dispatcher 1404; a Source Data Dispatcher 1408; a Data Stream Receiver 1462; a Batch Data Importer 1464; a Metadata Receiver 1466 (all interfaces configured to be enabled and managed by the Receiving Service Source Data Receiver 1460 sub-process discussed below); and, a Time Receiver 1490. Each will be described in further detail below.

The Receiving Service Event Receiver 1402 listens for, receives, and forwards system messaging that the Receiving Service 1400 is subscribed to. Subscribed events may include configuration and service request messages. In the context of the Receiving Service Event Receiver 1402, configuration messages may be defined to be system messages that contain configuration instructions 1470, preferably derived from configuration settings assigned by the user 10 that are used to configure the Receiving Service 1400. Service requests may be understood to be system messages 1428 that activate/deactivate the Receiving Service 1400 for data reception from one or more data sources. Exemplary service requests for the Receiving Service 1400 include: 'Data Collection Initiation;' 'Data Collection Termination;' and, 'Data Importation Initiation,' but it will be appreciated that any other number of service requests may be included or used instead. The Receiving Service Event Receiver 1402 preferably sends all (received) system messages to the Receiving Controller 1412 (discussed below).

The Receiving Service Event Dispatcher 1404 transmits system events generated by the Receiving Service 1400. Dispatched events preferably include service status messages (e.g., to other UDC Services 106 that are subscribed as Status Receivers 1424), although other events may be included. In the context of the Receiving Service Event Dispatcher 1404, service status messages may be defined to mean system messages that signify the status of the Receiving Service 1400, where status indicates the state that the Receiving Service 1400 is in for a particular UDC operation (discussed below). Exemplary Receiving Service 1400 states may include 'Data Collection Active,' 'Data Collection Inactive,' 'Data Importation Active,' and 'Data Importation Complete.' Other similar Receiving Service 1400 states may be included or used instead. The Receiving Service Event Dispatcher 1404 publishes these system messages for consumption by other services within the UDC System 100 (i.e., a publish-subscribe messaging protocol).

The Data Stream Receiver 1462 collects streaming data 22 (i.e., data that is continuously generated by one or more data sources and supplied incrementally over time) from one or more external data sources. The Batch Data Importer 1464 collects batched data 24 (i.e., data that is generated in increments and supplied collectively at once) from one or more external data sources.

The Metadata Receiver 1466 collects metadata (i.e., data that describes and gives information about other data) from one or more external data sources. Logbook data 40 (discussed above) is preferably the most typical metadata that the Metadata Receiver 1466 collects.

The Time Receiver 1490 receives referential time information (e.g., a standardized time scale/clock) from an authoritative and reliable time source 1444. The Time Receiver 1490 is preferably configurable, where configuration may include assigning an authoritative time source 1444 for synchronizing any data received by the Receiving Service Source Data Receiver 1460 (discussed below). Such time source assignment preferably includes issuing an address (or addresses) or peripheral information for external time sources 1444. The Time Receiver 1490 preferably receives a command from the Receiving Controller 1412 to reference a particular time source 1444 and then configures the interface for receiving time data from that source exclusively.

The Source Data Dispatcher 1408 transmits data collected by the Receiving Service Data Consolidator 1416 to source data consumers 30. The Source Data Dispatcher 1408 is preferably configurable, where configuration may include assigning a transmission destination for any data collected by the Receiving Service 1400, such assignment preferably entailing the issuing of an address (or addresses) for recipient(s) of source data. The Receiving Controller 1412 then configures the Source Data Dispatcher 1408 to dispatch data to select recipients based on those addresses.

Receiving Service Sub-Processes

The Receiving Service preferably includes a plurality of sub-processes, and in some embodiments (FIGS. 4A-D and 14), includes four: A Receiving Controller 1412; a Receiving Service Source Data Receiver(s) 1460; a Time Synchronizer 1414; and a Data Consolidator 1416. Each will be discussed in detail below.

The Receiving Controller 1412 is an automatic sub-process that preferably manages the configuration, activation, and general function of the Receiving Service 1400. The Receiving Controller 1412 preferably receives all system messages from the Receiving Service Event Receiver 1402 and renders them into a series of commands for disbursement throughout the Receiving Service. The Receiving Controller 1412 performs functions depending on the type of received message. In one embodiment, in response to configuration messages received from the Receiving Service Event Receiver 1402, the Receiving Controller 1412 may perform any of the following actions: Commanding the Receiving Service Source Data Receiver 1460 to configure itself based upon assigned configuration settings; commanding the Time Receiver 1490 to use a specified time source; and, commanding the Source Data Dispatcher 1408 to dispatch data according to designated data transmission routes. Finally, in response to service request messages received from the Receiving Service Event Receiver 1402, the Receiving Controller 1412 also preferably commands the Receiving Service Source Data Receiver 1460 to activate or deactivate data collection from data sources (e.g., 22, 24, 40).

The Receiving Controller 1412 also preferably monitors all sub-processes and interfaces on the Receiving Service 1400 and reports the status of the Receiving Service 1400 as it progresses through various operations. The Receiving Controller 1412 preferably generates service status messages, as needed, and sends them to the Receiving Service Event Dispatcher 1404 for publishing within the UDC System 100.

The Receiving Service Source Data Receiver 1460 is an automatic sub-process that manages and enables the reception of data from the Data Stream Receiver 1462, Batch Data Importer 1464, and Metadata Receiver 1466. The Receiving Service Source Data Receiver 1460 also preferably receives commands from the Receiving Controller 1412 in order to perform a plurality of Receiving Service 1400 data tasks. The Receiving Service Source Data Receiver 1460 is preferably configurable, such configuration preferably derived from user assigned settings and options. In this embodiment, such configuration may include: Sub-process instantiation (i.e., implementing one or more Receiving Service Source Data Receivers 1460); initialization of data receivers; and, assignment of data sources.

More particularly, in this embodiment, the Receiving Controller 1412 may instruct the Receiving Service 1400 to instantiate one or more Receiving Service Source Data Receivers 1460, where each Receiving Service Source Data Receiver 1460 receives a unique set of configuration instructions. Further, the Receiving Service Source Data Receiver 1460 is configurable to receive commands from the Receiving Controller 1412 to execute at least one of the following: Initialization of the reception of data from one or more of the Data Stream Receiver 1462, Batch Data Importer 1464, and Metadata Receiver 1466, wherein the configuration includes their respective provisioning for data collection; and, collection of data from one or more data sources (22, 24, and/or 40) through the Data Stream Receiver 1462, Batch Data Importer 1464, and/or Metadata Receiver 1466, respectively, where such configuration includes assigning a reference list of their addresses.

In one embodiment of the UDC Client 104, when the Receiving Service Source Data Receiver 1460 is issued a command by the Receiving Controller 1412 to activate data collection from streaming data sources 22, it initiates the Data Stream Receiver 1462 and actively collects streamed data until a termination command is issued. Similarly, when the Receiving Service Source Data Receiver 1460 is issued a command by the Receiving Controller 1412 to terminate data collection from streaming data sources 22, it deactivates the Data Stream Receiver 1462 and terminates the collection of streamed data 22. The Receiving Service Source Data Receiver 1460 also preferably initiates the Batch Data Importer 1464 and collects batched data from designated sources 24 upon receiving a command by the Receiving Controller 1412 to activate data importation from batched data sources 24. Finally, when the Receiving Service Source Data Receiver 1460 is issued a command to activate the collection of metadata from supplementary data sources, it initiates the Metadata Receiver 1466 and collects metadata from designated sources (e.g., data 40 from the Logbook Service). It will be understood that the Receiving Service 1400 may have multiple Receiving Service Source Data Receivers 1460, any or all of which may be simultaneously operational.

The Time Synchronizer 1414 is an automatic sub-process that preferably time-stamps data (e.g., appends a 'time of arrival') collected by the Receiving Service Source Data Receiver 1460. Not all data will require time synchronization (e.g., metadata generally will not require time-stamping). The Time Synchronizer 1414 works with the Time Receiver 1490 to acquire accurate time information from a reliably accurate time source 1444 (e.g., GPS).

Finally, the Data Consolidator 1416 is an automatic sub-process that groups data collected by the Receiving Service Source Data Receiver 1460, where grouping may include combing similar/related data from multiple receivers, aligning data based upon time synchronization (preferably by the Time Synchronizer 1414), and appending metadata (e.g., 40) to any collected streamed or batched data 22, 24.

Translation Service

The Translation Service is a service for converting source data to a user-selected, preferred format. The Translation Service preferably performs a plurality of functions including: Conversion of source data to UDC data (i.e., source data that has been converted to a Data Dictionary-compliant format (discussed below)); modification of data conversion/generation; and, dispatching UDC data to external consumers (e.g., to the Storage Service, discussed below). The Translation Service includes Translation Service Interfaces and a plurality of Translation Service sub-processes, each of which is discussed in detail below.

Translation Service Interfaces

The Translation Service 1500 preferably includes a plurality of interfaces, and in some embodiments (FIGS. 4A-D and 15), includes four: a Translation Service Event Receiver 1502; a Translation Service Event Dispatcher 1504; a Translation Service Source Data Receiver 1560; and a Translation Service UDC Data Dispatcher 1508. Each will be described in detail below.

The Translation Service Event Receiver 1502 listens for, receives, and forwards system messaging that the Translation Service 1500 is subscribed to. In one embodiment, the Translation Service Event Receiver 1502 sends all received system messages to the Translation Controller 1512 (described below). Subscribed events preferably include configuration messages, file transfer of configuration file messages, and service requests. In the case of Translation Service Event Receiver 1502, configuration messages may be defined as a system message that contains configuration instructions 1570, preferably derived from configuration settings assigned by the user, that are used to configure the Translation Service 1500. File transfer of configuration file messages 1530 may be defined as system messages that encapsulate the Data Translator 1522 and Data Dictionary 1526 (discussed below) intended for installation on the Translation Service 1500. Service request messages may be defined as system messages 1528 that activate the Translation Service 1500 for data reception (from one or more data sources) and UDC data generation.

The Translation Service Event Dispatcher 1504 transmits system events generated by the Translation Service 1500. The Translation Service Event Dispatcher 1504 preferably publishes these system messages for consumption by other services within the UDC System 100 (i.e., a publish-subscribe messaging protocol). Dispatched events from the Translation Service Event Dispatcher 1504 preferably include service status messages (e.g., to other UDC Services 106 that are subscribed as Status Receivers 1524), which may be defined for the Translation Service Event Dispatcher 1504 as system messages that signify the status of the Translation Service 1500. Status preferably indicates the state that the Translation Service 1500 is in for a particular UDC operation (discussed below). Translation Service 1500 status may include a message such as 'Translation Service Ready'; however, it will be appreciated that other messages may be used instead.

The Translation Service Source Data Receiver 1560 receives source data from one or more external data sources 1520. The Translation Service Source Data Receiver 1560 is preferably configurable, where configuration may include assigning one or more data sources 1520 from which to receive source data. This assignment preferably includes issuing an address (or addresses) for providers of source data. The Translation Service Source Data Receiver preferably receives a command from the Translation Controller 1512 (discussed below) to receive data from select sources 1520, and then configures itself for data reception from those addresses exclusively.

The Translation Service UDC Data Dispatcher 1508 transmits generated UDC data to UDC data consumers 32. The Translation Service UDC Data Dispatcher 1508 is also preferably configurable, where such configuration may include assigning a transmission destination for any UDC data generated by the Translation Service 1500. This assignment preferably includes issuing an address (or addresses) for recipient(s) of UDC data. The Translation Service UDC Data Dispatcher 1508 preferably receives a command from the Translation Controller 1512 (discussed below) to dispatch data to select recipients 32, and transmits data to those addresses exclusively.

Translation Service Sub-Processes

The Translation Service 1500 preferably includes a plurality of sub-processes, and in some embodiments (FIGS. 4A-D and 15), includes four: a Translation Controller 1512; a Data Translator Loader 1510; a Data Dictionary Loader 1514; and, a UDC Data Generator 1530. Each will be discussed in detail below.

The Translation Controller 1512 is an automatic sub-process that preferably manages the configuration, activation and general function of the Translation Service 1500. The Translation Controller 1512 preferably receives all system messages from the Translation Service Event Receiver 1502 and renders them into a series of commands for disbursement throughout the Translation Service 1500. The Translation Controller 1512 performs functions depending on the type of received message. For example, in one embodiment, in response to configuration messages received from the Translation Service Event Receiver 1502, the Translation Controller 1512 may perform any of the following actions: Commanding the UDC Data Generator 1530 (discussed below) to configure itself based upon assigned configuration settings; commanding the Translation Service Source Data Receiver 1560 to receive data from assigned data sources; and, commanding the Translation UDC Data Dispatcher 1508 to dispatch data according to designated data transmission routes. In response to file transfer messages received from the Translation Service Event Receiver 1502, the Translation Controller 1512 preferably commands the Data Translator Loader 1510 to load the assigned Data Translator 1522 into the UDC Data Generator 1530 and commands the Data Dictionary Loader 1514 to load the assigned Data Dictionary 1526 into the UDC Data Generator 1530 (discussed below). Finally, in response to service request messages received from the Translation Service Event Receiver 1502, the Translation Controller 1512 preferably commands the UDC Data Generator 1530 to activate data reception and UDC data generation.

The Translation Controller 1512 also preferably monitors the sub-processes and interfaces on the Translation Service 1500 and reports the status of the service as it progresses through various operations. The Translation Controller 1512 preferably generates service status messages, as needed, and sends them to the Translation Service Event Dispatcher 1504 for publishing within the UDC.

The Data Translator Loader 1510 is an automatic sub-process that preferably loads a Data Translator configuration file 1522 into the UDC Data Generator 1530. The Data Translator Loader 1510 preferably receives a command from the Translation Controller 1512 to a load a specific Data Translator 1522 and then inserts that designated file into the Data Translator slot (not shown) within the UDC Data Generator 1530.

The Data Dictionary Loader 1514 is an automatic sub-process that preferably loads a Data Dictionary configuration file 1526 into the UDC Data Generator 1530. The Data Dictionary Loader 1514 preferably receives a command from the Translation Controller 1512 to a load a specific Data Dictionary 1526 and then inserts that designated file into the Data Validator 1524 (discussed below) within the UDC Data Generator 1530.

UDC Data Generator 1530 is an automatic sub-process that preferably generates UDC data by converting and validating source data 1520 into a Data Dictionary-compliant format. The Translation Service Source Data Receiver 1560 preferably forwards source data 1520 to the UDC Data Generator 1530 where it is first correlated and converted by the Data Translator 1522 and then validated and certified by the Data Validator 1524 (discussed below). This process preferably generates UDC data. After the received source data 1520 has been converted and validated, the UDC Data Generator 1530 preferably packages the UDC data and passes it to the Translation Service UDC Data Dispatcher 1508 for dissemination to UDC data consumers 32. The Translation Service 1500 may have multiple UDC Data Generators 1530, any or all of which may be simultaneously operational.

In one embodiment, the UDC Data Generator 1530 is configurable, where configuration is preferably derived from user assigned settings and options. In this embodiment, such configuration may include: Sub-process instantiation (i.e., implementing one or more UDC Data Generators 1530); assignment of Data Translator 1522 and Data Dictionary 1526 files, and, initialization of UDC data generation.

More particularly, the Translation Controller 1512 may instruct the Translation Service 1500 to instantiate one or more UDC Data Generators 1530, where each UDC Data Generator 1530 receives a unique set of configuration instructions. Further, the UDC Data Generator 1530 is configurable to receive commands from the Translation Controller 1512 to execute at least one of the following: Utilization of a specific Data Translator 1522 and Data Dictionary 1526, where each UDC Data Generator 1530 parses the files loaded by the Data Translator Loader 1510 and Data Dictionary Loader 1514 and then assigns the specified Data Translator (1525) and Data Dictionary (1526) to its configurable slots; and, initialization of the reception, conversion, and validation of source data from one or more producers 1520. Configuration of the UDC Data Generator 1530 in this last action preferably includes provisioning the Data Translator 1522 and Data Validator 1524 for UDC data generation, both of which are discussed in more detail in the following paragraphs.

Figure 16A:
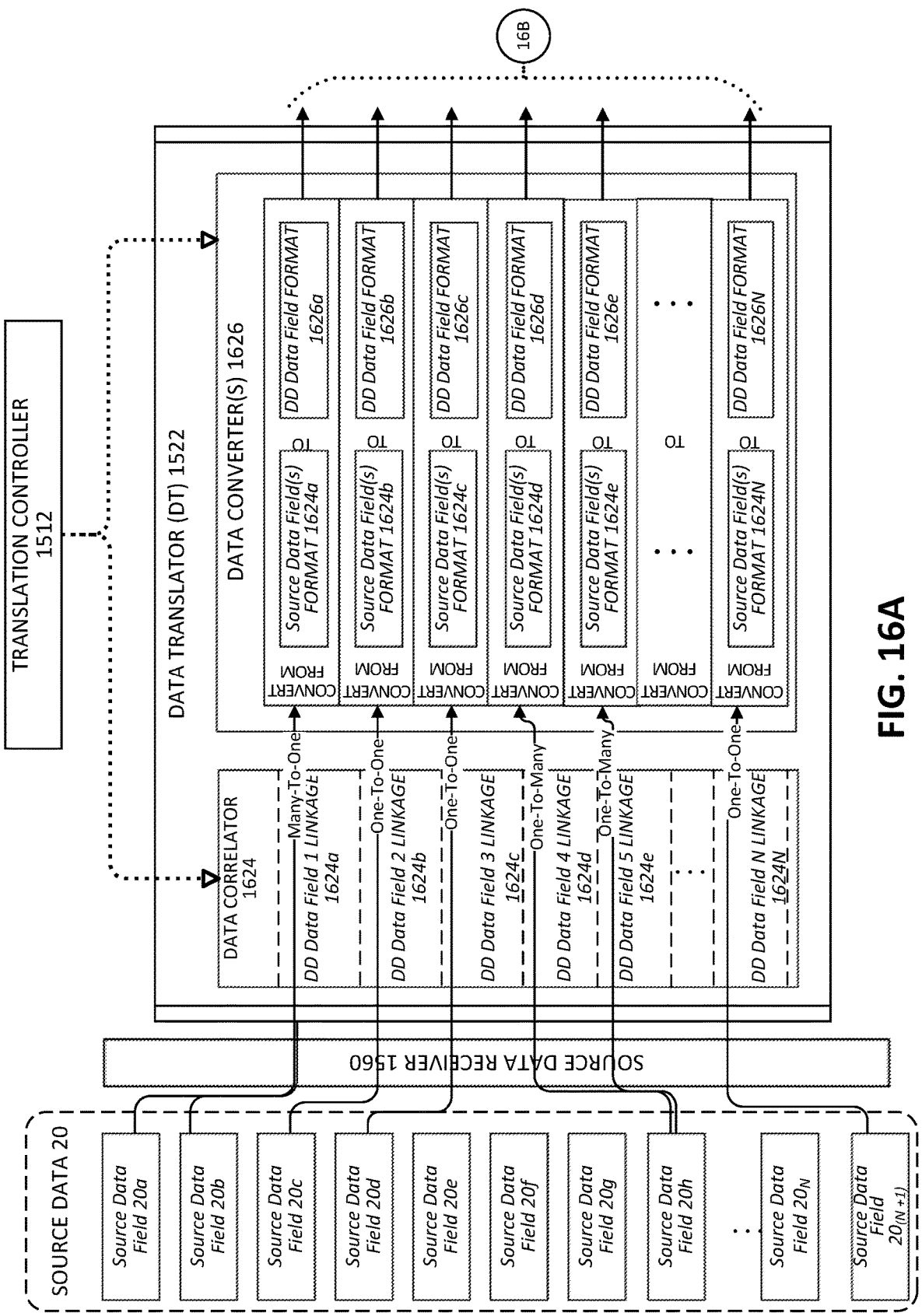
FIG. 16 is a diagram illustrating an exemplary embodiment of a Data Translator and its operation in the UDC Translation Service in accordance with various aspects of the present disclosure.
Figure 16B:
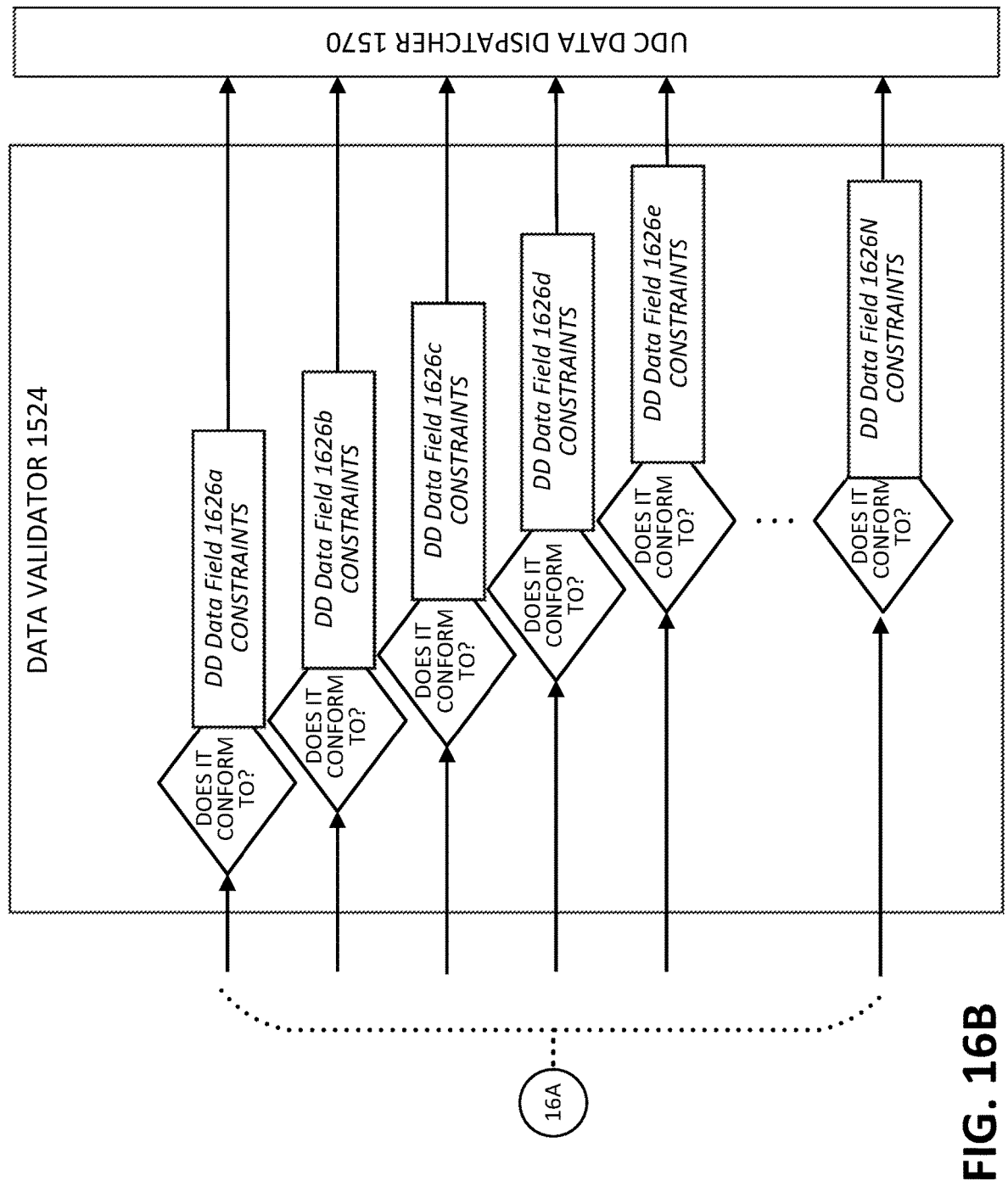

With additional reference to the exemplary embodiment shown in FIG. 16, the Data Translator 1522 is preferably a customized configuration file that is installed on the UDC Data Generator 1530 and configured to translate data within the Translation Service 1500. In one embodiment, the Data Translator 1522 is an applet or other small application that includes a data correlator 1624 and data converter(s) 1626. The Data Translator 1522 preferably correlates source data 20 from its received raw state to requisite fields within the Data Dictionary 1526 and then translates the correlated data from its native format to a data dictionary-compliant format.

In operation, Data Correlator 1624 of Data Translator 1522 ingests source data 20, including source data fields (20a, 20b . . . $20_{(N+1)}$), and establishes correlations (1624a, 1624b . . . $1624_N$) between the source data fields data (20a, 20b . . . $20_{(N+1)}$) and fields within the Data Dictionary 1526, and then converts the correlated data (1624a, 1624b . . . $1624_N$) from its received native format to the user-requested format (1626a, 1626b . . . $1624_N$) via a Data Converter 1626. After correlation and conversion, the Data Translator 1522 preferably passes converted data to the Data Validator 1524. The Data Validator 1524 evaluates converted data (1626a,

1626b . . . 1626$_N$) from the Data Translator 1522 and certifies that conversion has generated a compliant set of data. Compliance is preferably determined by evaluating converted data (1626a, 1626b . . . 1626$_N$) against requisite data formats and data constraints issued within the Data Dictionary 1526. If a set of converted data is determined to be compliant, then the Data Validator 1524 approves the converted data (1626a, 1626b . . . 1626$_N$) for subsequent use within the UDC System 100 (i.e., Data Validator 1524 validates that UDC data has been generated).

Data Dictionary 1526 is used to configure the management and validation of data within the Translation Service 1500. As with the Data Translator 1522, it is also a customized configuration file that is installed on the UDC Data Generator 1530. Data Dictionary 1526 provides instructions to the UDC Client 104 on how to evaluate data from any connected data source 20. It preferably includes structured requirements that stipulate the minimum acceptable criteria for permitting delivery of data onto the UDC System 100, where such requirements further preferably encompasses requirements for the selected context of use. In one embodiment, the Data Dictionary 1526: Appoints acceptance criteria (i.e., pass/fail specifications for translated data); designates which data constraints will be used for quality assurance validation (e.g., by Data Validator 1524); and, issues instructions for how data should be handled later within the system.

Figure 17:
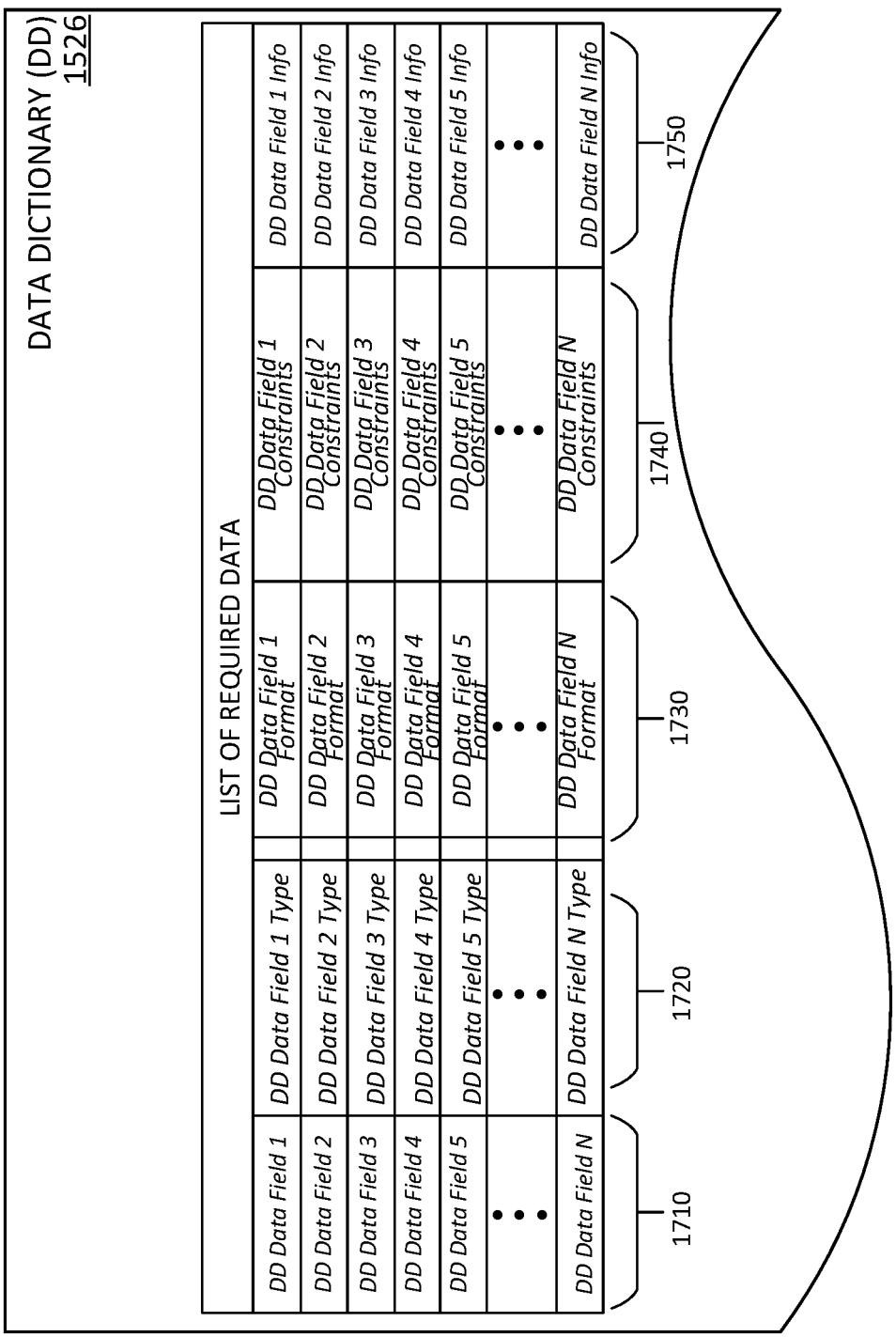
FIG. 17 is a block diagram illustrating an exemplary embodiment of a Data Dictionary of the UDC Translation Service in accordance with various aspects of the present disclosure.
Figure 18:
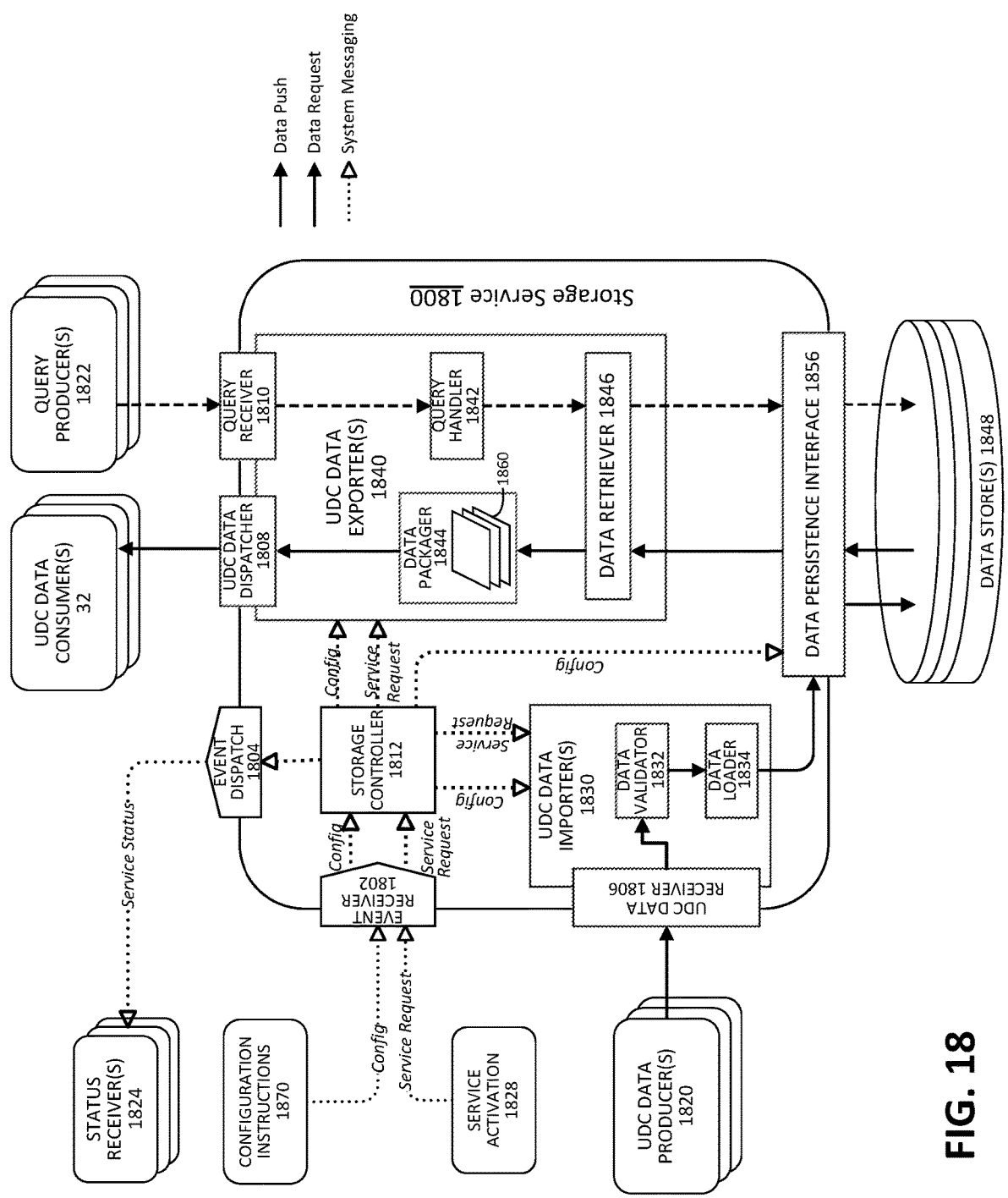
FIG. 18 is a block diagram illustrating an exemplary embodiment of a UDC Storage Service and its components and data/messaging flows in accordance with various aspects of the present disclosure.
Figure 19:
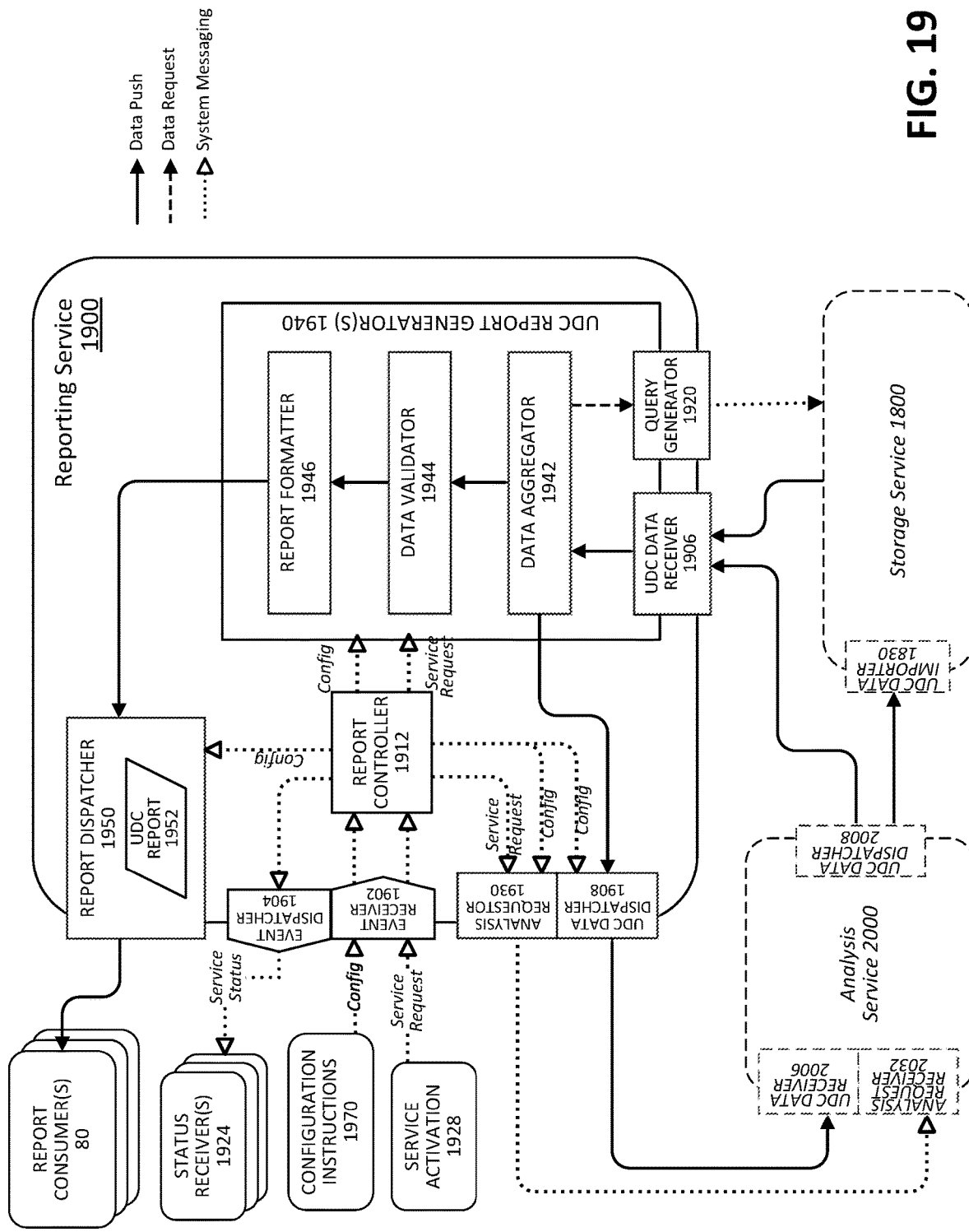
FIG. 19 is a block diagram illustrating an exemplary embodiment of a UDC Reporting Service and its components and data/messaging flows in accordance with various aspects of the present disclosure.
Figure 20:
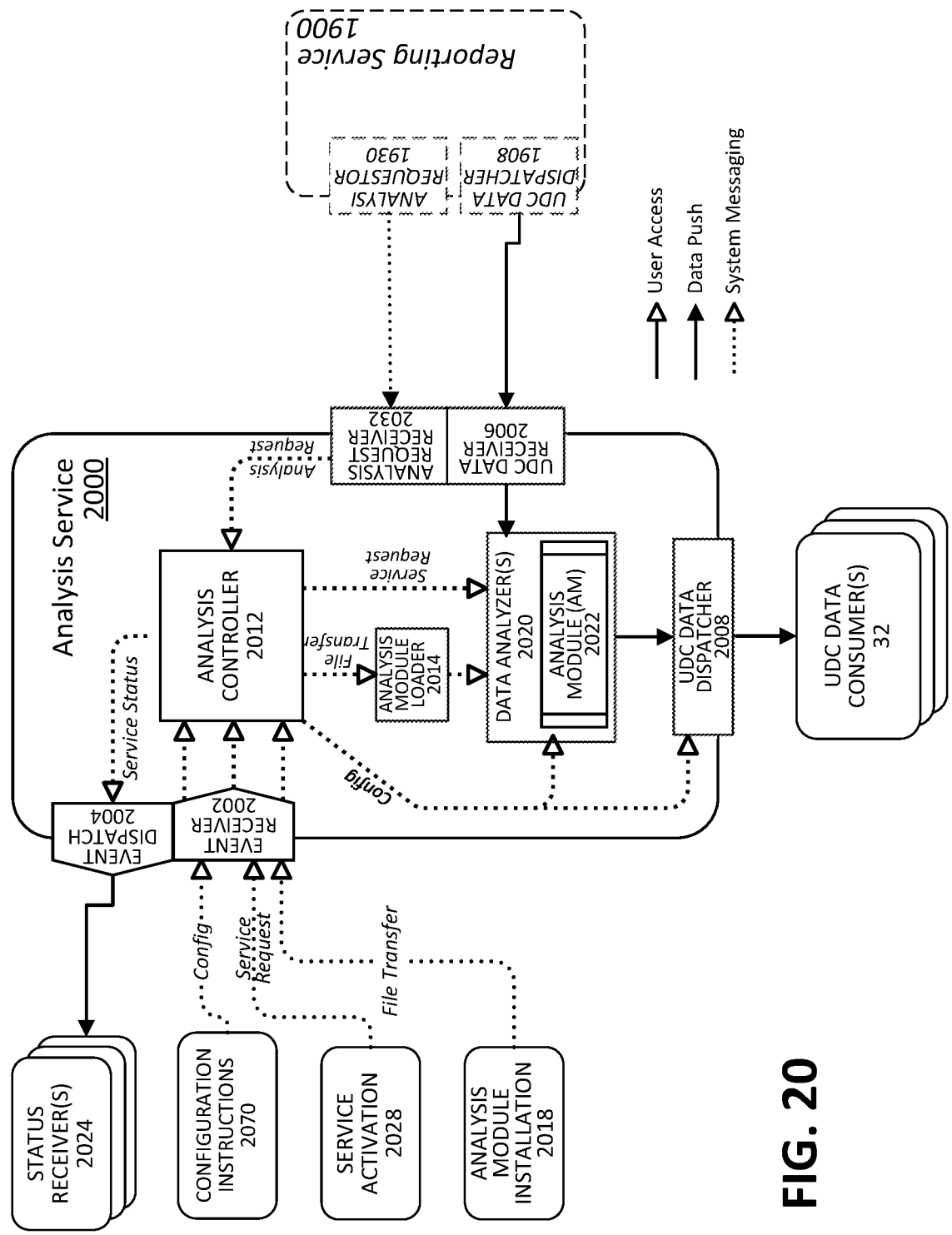
FIG. 20 is a block diagram illustrating an exemplary embodiment of a UDC Analysis Service and its components and data/messaging/file flows in accordance with various aspects of the present disclosure.

As set forth above, the UDC Data Generator 1530 is also configurable to assign and utilize Data Dictionary 1526 files. An exemplary embodiment of Data Dictionary 1526 is shown in FIG. 17. Data Dictionary 1526 preferably includes a plurality of data fields 1710, which are parameters identified for collection, retention, and/or processing by the UDC System 100 (e.g., UA latitude, longitude. and altitude). Data type fields 1720 for each requisite data field area 1710 are also preferably included in order to classify each requisite data field for other uses within the UDC System 100. In a preferred embodiment, at a minimum, the data type field 1720 provides a schema for cataloguing data on the UDC System 100. Data Dictionary 1526 also preferably includes preferred data format 1730 for each requisite data field 1710. This data format informs the client as to how the converted data 20 should be formatted within the system. This may include what units, significant figures, and/or reference frame that data should be in. Data constraints 1740 for each requisite data field 1710 are preferably included to stipulate tolerances for any converted data, including data frequency, minimum/maximum value, and dropout limits. Finally, the Data Dictionary 1526 may include supplemental information 1750 for any requisite data field 1710. Such supplemental information may be used to append extra information to a data field 1710. This might include any information provided by the user 10 through the Logbook Service 1200 or referential details, such as a data dictionary identifier (i.e., associating data in the UDC System 100 with a particular Data Dictionary 1526).

Storage Service

The UDC Client may include a Storage Service for depositing and withdrawing UDC data to/from digital storage. In one embodiment (FIGS. 4A-D, 18), the Storage Service 1800 performs a plurality of functions including: Importing UDC data into storage from UDC Data Producers 1820 (e.g., other UDC Services 106, such as Translation Service 1500 or Analysis Service 2000 (discussed below)); exporting UDC data from storage to UDC Data Consumers 32 (e.g. other UDC Services 106, such as Translation Service 1500 or Reporting Service 1900 (discussed below)); and, modifying storage access and assignment. The Storage Service 1800 includes Storage Service Interfaces and a plurality of Storage Service sub-processes, each of which is discussed in detail below.

Storage Service Interfaces

The Storage Service preferably includes a plurality of interfaces, and in some embodiments (FIGS. 4A-D and 18), includes six: a Storage Service Event Receiver 1802; a Storage Service Event Dispatcher 1804; a Storage Service UDC Data Receiver 1806; a Storage Service UDC Data Dispatcher 1808; a UDC Query Receiver 1810, and a Data Persistence Interface 1856. Each will be described in detail below.

The Storage Service Event Receiver 1802 listens for, receives, and forwards, system messaging that the Storage Service 1800 is subscribed to. Subscribed events may include configuration and service request messages. In the context of the Storage Service Event Receiver 1802, configuration messages may be defined to be system messages that contain configuration instructions 1870 that are preferably derived from configuration settings assigned by the user and which are used to configure the Storage Service 1800. Service requests 1828 may be understood to be system messages that activate/deactivate the Storage Service 1800 for data importation and/or data exportation (1828). Exemplary service requests for the Storage Service 1800 include: 'Data Recollection Initiation;' and, 'Request Data,' but it will be appreciated that other any other number of service requests may be included or used instead. The Storage Service Event Receiver 1802 preferably sends all received system messages to the Storage Controller 1812 (discussed below).

The Storage Service Event Dispatcher 1804 transmits system events generated by the Storage Service 1800 to external status receivers 1824 (e.g. other UDC Services 106, such as Translation Service 1500 or Reporting Service 1900 (discussed below)). Dispatched events preferably include service status messages, although other events may be included. In the context of the Storage Service 1800, the Storage Service Event Dispatcher 1804 service status messages may be defined to mean system messages that signify the status of the Storage Service 1800, where "status" indicates the state that the Storage Service 1800 is in for a particular UDC operation. Exemplary Storage Service 1800 states may include: 'Storage Service Ready'; 'Data Recollection Active'; 'Data Recollection Complete'; and, 'Requested Data Retrieved.' It will be understood that other similar Storage Service 1800 states may be included or used in the alternate. The Storage Service Event Dispatcher 1804 preferably publishes these system messages for consumption by other services within the UDC System 100 (i.e., a publish-subscribe messaging protocol).

The Storage Service UDC Data Receiver 1806 receives UDC data from one or more UDC Data Producers 1820 (e.g., other UDC Services 106, such as Translation Service 1500 or Analysis Service 2000 (discussed below).

The Storage Service UDC Data Dispatcher 1808 dispatches UDC data retrieved from storage 1848 to UDC Data Consumers 32.

The UDC Query Receiver 1810 receives data queries from one or more Query Producers 1822 (e.g., Reporting Service 1900).

Finally, Data Persistence Interface 1856 facilitates the deposit, request, and retrieval of UDC data from one or more data stores 1848. Data Persistence Interface 1856 is preferably configurable, where such configuration may include designating the complete list of data stores 1848 intended for partitioned or gross deposit/withdrawal of UDC data; this assignment preferably includes issuing a location (e.g. path or Universal Resource Location (URL)) for auxiliary data stores). Data Persistence Interface 1856 is preferably configured to receive commands from the Storage Controller 1812 to reference one or more connected data stores and then, in one embodiment, configured for depositing and withdrawing data from those sources exclusively.

Storage Service Sub-Processes

The Storage Service 1800 preferably includes a plurality of sub-processes, and in some embodiments (FIGS. 4A-D and 18), includes three: a Storage Controller 1812; a UDC Data Importer 1830; and, a UDC Data Exporter 1840. Each will be discussed in detail below.

The Storage Controller 1812 is an automatic sub-process that preferably manages the configuration, activation and general function of the Storage Service 1800. The Storage Controller 1812 preferably receives all system messages from the Storage Service Event Receiver 1802 and renders them into a series of commands for disbursement throughout the Storage Service 1800.

The Storage Controller 1812 performs functions depending on the type of received message. In one embodiment, in response to configuration instructions 1870 received from the Storage Service Event Receiver 1802, the Storage Controller 1812 preferably performs the following actions: Commanding the UDC Data Importer 1830 and UDC Data Exporter 1840 to configure themselves based upon assigned configuration settings contained in the configuration instructions 1870; and, commanding the Data Retriever 1846 to deposit and withdraw UDC data to/from select data stores 1848 via the Data Persistence Interface 1856. In addition, in response to service messages 1828 received from the Storage Service Event Receiver 1802, the Storage Controller 1812 may perform any of the following actions: Commanding the UDC Data Importer 1830 to activate data importation from external UDC Data Producers 1820; and, commanding the UDC Data Exporter 1840 to activate data exportation to external UDC Data Consumers 32.

The Storage Controller 1812 also preferably also monitors the sub-processes and interfaces on the Storage Service 1800 and reports the status of the service as it progresses through various operations. The Storage Controller 1812 preferably generates service status messages, as needed, and sends them to the Storage Service Event Dispatcher 1808 for publishing within the UDC System 100.

The UDC Data Importer 1830 is an automatic sub-process that preferably imports UDC data into one or more data stores 1848 through Data Persistence Interface 1856. Storage Service 1800 may have multiple UDC Data Importers 1830, any or all of which may be simultaneously operational.

In one embodiment, the UDC Data Importer 1830 is configurable, such configuration preferably being derived from user assigned settings and options. In one embodiment, such configuration may include: Sub-process instantiation (i.e., implementing one or more UDC Data Importers 1830); initializing data importation; and assigning data stores 1848 and corresponding access permissions.

More particularly, in this embodiment, the Storage Controller 1812 may instruct the Storage Service 1800 to instantiate one or more UDC Data Importers 1830, where each UDC Data Importer 1830 receives a unique set of configuration instructions. Further the UDC Data Importer 1830 is configurable to receive commands from the Storage Controller 1812 to execute at least one of the following: Initialization of the receipt, validation, and loading of data from one or more UDC Data Producers 1820; such configuration preferably including provisioning the Storage Service UDC Data Receiver 1806, Data Validator 1832, and Data Loader 1834 for data importation; and, configuration of each UDC Data Importer 1830 to utilize the Storage Access Interface 1856. Configuration in this latter action preferably includes assigning a list of data store locations (e.g., path or Universal Resource Location (URL)) to the Data Loader 1834 as well as a list of data supplier locations (e.g., path or Universal Resource Location (URL)) to the Storage Service UDC Data Receiver 1806, which together establish a sanctioned data exchange pathway. This configuration also preferably includes adapting the Data Validator 1832 to the assigned data stores 1848.

In the embodiments of FIGS. 4A-D and 18, the UDC Data Importer 1830 includes two components: Data Validator 1832 and Data Loader 1834. Each will be discussed below.

Data Validator 1832 preferably evaluates received UDC data from the Storage Service UDC Data Receiver 1806 and certifies that it is appropriate for storage. Evaluation preferably includes checking the UDC data for any integrity issues (e.g., missing data and/or improperly formatted data) and confirming that the UDC data is compatible with designated Storage Access Interface 1856. If the UDC data is deemed acceptable, then the Data Validator 1832 approves the UDC data and forwards it to the Data Loader 1834.

The Data Loader 1834 preferably prepares and inserts validated UDC data from the Data Validator 1832 into one or more of connected data stores 1848 via the Storage Access Interface 1856. Preparation preferably includes reformatting UDC data to a storage-compliant format that is compatible with the Storage Access Interface 1856, while insertion preferably includes dispatching the prepared data for deposit into data stores 1848 via the Data Persistence Interface 1856. The Data Loader 1834 can either batch or stream the deposit of UDC data to the Storage Access Interface 1856 depending, for example, upon the volume of data.

UDC Data Exporter 1840 is an automatic sub-process that preferably exports UDC data from one or more data stores 1848 and Storage Service 1800 may have multiple UDC Data Exporters 1840, any or all of which may be simultaneously operational. In some embodiments (e.g., FIGS. 4A-D, 18), UDC Data Exporter 1840 includes a Query Handler 1842, a Data Retriever 1846, and Data Packager 1844.

Query Handler 1842 preferably manages received data queries from the Query Receiver 1810 and prepares them for soliciting data from storage 1848 via the Storage Access Interface 1856. The Query Handler 1842 management processes preferably include scanning each data query, decomposing it into distinct data calls, and compiling the calls into a bundled data request. After the Query Handler 1842 has generated a data request from a received data query, it preferably forwards the request to the Data Retriever 1846.

Data Retriever 1846 preferably processes data requests received from the Query Handler 1842 to search and retrieve data from assigned data stores 1848 via the Storage Access Interface 1856. Processing preferably includes executing the data calls within the data request to search through storage, via the Data Persistence Interface 1856, and then copying/retrieving any data that satisfies those data calls. Once data is retrieved, the Data Retriever 1846 preferably sends the data to the Data Packager 1844 for data dispatch preparation.

Data Packager 1844 preferably prepares retrieved UDC data for dispatch to UDC Data Consumers 32. Preparation preferably includes consolidating and encoding retrieved data to a format appropriate for transmission. Once the UDC data is packaged, the Data Packager 1844 preferably sends the data package 1860 to the Storage Service UDC Data Dispatcher 1808, which then disseminates the UDC data to UDC Data Consumers 32. As noted above, it will be understood that transmission of the UDC data can either be batched or streamed depending, for example, upon the volume of data.

In operation of the UDC Data Exporter 1840, data exportation begins with receiving a data query via the UDC Query Receiver 1810 and forwarding it to the onboard Query Handler 1842, which interprets, parses, and prepares the query for transmission to the Data Retriever 1846 (both elements are discussed in more detail below). The Query Handler 1842 then preferably passes the query to the Data Retriever 1846, which utilizes the Storage Access Interface 1856 to search through connected data stores 1848, via the Data Persistence Interface 1856, and retrieves any data that meets the conditions of the query. Once data has been retrieved from the Storage Access Interface 1856 by the Data Retriever 1846, the Data Packager 1844 preferably prepares the retrieved data for dissemination to UDC Data Consumers 32 via the Storage Service UDC Data Dispatching Interface 1808.

UDC Data Exporter 1840 is preferably configurable, configuration preferably being derived from user assigned settings and options. In one embodiment, configuration includes: Sub-process instantiation (i.e., implementing one or more UDC Data Exporter 1840); initializing data exportation; and, assigning storage devices and access permissions.

More particularly, Storage Controller 1812 may instruct the Storage Service 1800 to instantiate one or more UDC Data Exporters 1840, where each UDC Data Exporter 1840 receives a unique set of configuration instructions. Further, the UDC Data Exporter 1840 is configurable to receive commands from the Storage Controller 1812 to execute at least one of the following: Invocation of the request, retrieval, and dispatch of UDC data from one or more data stores 1848 via the Storage Access Interface 1856, where such configuration preferably including provisioning the Query Receiver 1810, Query Handler 1842, Data Packager 1844, Data Retriever 1846, and Storage Service UDC Data Dispatcher 1808 for exportation of UDC Data; and, utilization of one or more data stores 1848 via the Storage Access Interface 1856, where such configuration includes assigning a list of data storage locations (e.g. path or Universal Resource Location (URL)) to the Data Retriever 1846 as well as a list of UDC Data Consumer 32 addresses to the Query Receiver 1810 and Storage Service UDC Data Dispatcher 1808, which together establish a sanctioned data exchange pathway.

Reporting Service

The UDC Client may include a Reporting Service, which is responsible for generating report(s) from retrieved and/or analyzed UDC data. In some embodiments (FIGS. 4A-D and 19), the Reporting Service 1900 performs a plurality of functions including: Requesting UDC data; requesting an analysis of retrieved UDC data; generating a UDC report from retrieved and/or analyzed UDC data; customizing UDC report generation; and, dispatching UDC reports to external consumers. Reporting Service 1900 includes Reporting Service Interfaces and a plurality of Reporting Service sub-processes, each of which is discussed in detail below.

Reporting Service Interfaces

The Reporting Service 1900 preferably includes a plurality of interfaces, and in some embodiments (e.g., 4A-D and 19), includes seven: A Reporting Service Event Receiver 1902; a Reporting Service Event Dispatcher 1904; a Reporting Service UDC Data Receiver 1906; a Reporting Service UDC Data Dispatcher 1908; a Query Generator 1920; an Analysis Requestor 1930; and, a Report Dispatcher 1950. Each will be described in detail below.

The Reporting Service Event Receiver 1902 preferably listens for, receives, and forwards system messaging that the Reporting Service 1900 is subscribed to. Subscribed events may include configuration and service request messages. In the context of the Reporting Service Event Receiver 1902, configuration messages may be defined to be system messages that contain configuration instructions 1970, preferably derived from configuration settings assigned by the user, and that are used to configure the Reporting Service 1900. Service requests 1928 may be understood to be system messages that activate the Reporting Service 1900 for requesting data for analysis and/or report generation. An exemplary service request for the Reporting Service 1900 includes 'Report Request,' but it will be appreciated that other any other number of service requests may be included or used instead. In one embodiment, the Reporting Service Event Receiver 1902 sends all received system messages to the Reporting Controller 1912 (discussed below).

The Reporting Service Event Dispatcher 1904 transmits system events generated by the Reporting Service 1900. Dispatched events preferably include service status messages (e.g., to other UDC Services 106 that are subscribed as Status Receivers 1924), although other events may be included. In the context of the Reporting Service 1900, the Reporting Service Event Dispatcher 1904 service status messages may be defined to mean system messages that indicate the status of the Reporting Service 1900, where status indicates the state that the Reporting Service 1900 is in for a particular UDC operation. Exemplary Reporting Service 1900 states may include: 'Reporting Service Ready.' It will be understood that other similar Reporting Service 1900 states may be included or used in the alternate. The Reporting Service Event Dispatcher 1904 preferably publishes these system messages for consumption by other services within the UDC System 100 (i.e., a publish-subscribe messaging protocol).

Reporting Service UDC Data Dispatcher 1908 preferably transmits aggregated UDC data to the Analysis Service 2000 (discussed below). However, it will be understood that UDC data may be transmitted to other similar UDC data receivers (not shown). The Reporting Service UDC Data Dispatcher 1908 is preferably configurable, and may be configured to receive a command from the Report Controller 1912 to assign a transmission destination for any UDC data that is to be analyzed and to dispatch the UDC data to select recipients of that destination. Such assignment preferably includes issuing an address (or addresses) for recipient(s) of UDC data. The Report Controller 1912 then configures the Reporting Service UDC Data Dispatcher 1908 for data transmission to those addresses exclusively.

Query Generator 1920 preferably generates a data query derived from a report request and then dispatches it to query consumers (e.g., Storage Service 1800).

Analysis Requestor 1930 preferably generates an analysis request derived from a report request and dispatches it to the Analysis Service 2000. The Analysis Requestor 1930 preferably functions collaboratively with the Reporting Service UDC Data Dispatcher 1908 so that any issued analysis request coincides with a dispatch of UDC data. In one embodiment, the Analysis Requestor 1930 is configurable, and may be configured to receive a command from the Reporting Controller 1912 to assign a transmission destination for any analysis request generated by the Reporting Service 1900 and to dispatch the analysis request to select recipients. Such assignment preferably also includes issuing an address (or addresses) for recipient(s) of the analysis requests. The Report Controller 1912 then configures the Analysis Requestor 1930 for data transmission to those addresses exclusively.

Finally, Report Dispatcher 1950 transmits UDC reports 1952 generated by the UDC Report Generator (discussed below) to external report consumers 80 (e.g., Publishing Service 2000). The Report Dispatcher 1950 is preferably configurable, where configuration includes assigning a transmission destination for any UDC report 1952 generated by the Reporting Service 1900. This assignment also preferably includes issuing an address (or addresses) for recipient(s) of UDC reports. The Report Dispatcher 1950 is also preferably configurable to receive a command from the Reporting Controller 1912 to dispatch UDC reports 1952 exclusively to select recipients based on the issued address (or addresses).

Reporting Service Sub-Processes

The Reporting Service 1900 preferably includes a plurality of sub-processes, and in some embodiments (e.g., FIGS. 4A-D and 19), includes two: a Report Controller 1912 and a UDC Report Generator 1940. Each will be discussed in detail below.

The Report Controller 1912 is an automatic sub-process that preferably manages the configuration, activation, and general functions of the Reporting Service 1900. The Report Controller 1912 preferably receives all system messages from the Reporting Service Event Receiver 1902 and renders them into a series of commands for disbursement throughout the Reporting Service 1900. The Report Controller 1912 performs functions depending on the type of received message. In one embodiment, in response to configuration messages 1970 received from Reporting Service Event Receiver 1902, the Report Controller may perform any of the following actions: Commanding the UDC Report Generator 1940 to configure itself based upon assigned configuration settings; commanding the Reporting Service UDC Data Dispatcher 1908 to dispatch retrieved UDC data to designated recipients; commanding the Reporting Service Analysis Requestor 1930 to dispatch analysis requests to designated recipients; and, commanding the Report Dispatcher 1950 to transmit UDC reports 1952 to select report consumers 80 (e.g., Publishing Service 2000).

The Report Controller 1912 also preferably performs any of the following actions in response to service messages 1928 received from the Reporting Service Event Receiver 1902: Commanding the UDC Report Generator 1940 to request UDC data from storage; commanding the UDC Report Generator 1940 to dispatch retrieved UDC data for analysis; commanding the UDC Report Generator 1940 to activate report generation from retrieved and/or analyzed UDC data; and, commanding the Analysis Requestor 1930 to dispatch an analysis request.

Finally, the Report Controller 1912 preferably also monitors the sub-processes and interfaces on the Reporting Service 1900 and reports the status of the service as it progresses through various operations. The Report Controller 1912 preferably generates service status messages as needed, and then sends them to the Reporting Service Event Dispatcher 1904 for publishing within the UDC System 100.

The UDC Report Generator 1940 is an automatic sub-process that preferably generates UDC reports by aggregating, validating, and formatting retrieved and/or analyzed UDC data. The Reporting Service 1900 may have multiple UDC Report Generators 1940, any or all of which may be simultaneously operational. In some embodiments (e.g., FIGS. 4A-D and 19), the UDC Report Generator 1940 includes a Data Aggregator 1942, a Data Validator 1944, and a Report Formatter 1946.

The Data Aggregator 1942 preferably manages the requesting, retrieval, dispatch, and assembly of UDC data within the Reporting Service 1900. Processing preferably includes issuing data requests to the Query Generator 1920, retrieving queried UDC data from the Reporting Service UDC Data Receiver 1906, facilitating and coordinating the dispatch of UDC data for any issued analysis request, and retrieving analyzed data from the Reporting Service UDC Data Receiver 1906. Data assembly preferably includes sorting and collating all retrieved data in a manner suitable for report generation. After the Data Aggregator 1942 has assembled all data, Data Aggregator 1942 preferably forwards the aggregated to the Data Validator 1944.

Data Validator 1944 preferably evaluates aggregated data from the Data Aggregator 1942 and certifies that it is appropriate for report generation. Evaluation preferably includes checking the aggregated data for any integrity issues (e.g., missing data and/or improperly formatted data) and confirming that a sufficient amount of data exists to generate the requested report 1952. If the aggregated data is deemed acceptable, then the Data Validator 1944 preferably approves the data and forwards it to the Report Formatter 1946.

Report Formatter 1946 preferably transforms validated data from the Data Validator 1944 into a series of specified tables, graphs, plots, and/or other statistical representations of data. Data transformation preferably includes at least one of systematically arranging data into concise tables, graphing and/or plotting target subsets of data, generating summary statistics (e.g., means, medians, and averages), and rendering those transformed elements to a preferred format. Once validated data has been appropriately formatted, the Report Formatter 1946 preferably packages the data into a UDC report 1952, and then transmits it to the Report Dispatcher 1950 for dissemination to report consumer(s) 80 (e.g., Publishing Service 2000).

In one embodiment, the UDC Report Generator 1940 is configurable, such configuration preferably derived from user assigned settings and options. Configuration may include: Sub-process instantiation (i.e., implementing one or more UDC Report Generators 1940); assignment of data queries, dispatches, and receiving addresses; initialization of report generation; and, assignment of report preferences.

More particularly, in this embodiment, the Reporting Controller 1912 may instruct the Reporting Service 1900 to instantiate one or more UDC Report Generators 1940, where each UDC Report Generator 1940 receives a unique set of configuration instructions. Further the UDC Report Generator 1940 is configurable to receive commands from the Report Controller 1912 to execute at least one of the following: First, UDC Report Generator 1940 may be configurable to transact with one or more data producers, which includes assigning a list of data provider addresses to the Query Generator 1920 as well as a list of reference data producer addresses to the Reporting Service UDC Data Receiver 1906. Together these establish a sanctioned data exchange pathway. This configuration also preferably includes directing the Data Aggregator 1942 to dispatch retrieved UDC data to the Reporting Service UDC Data Dispatcher 1908 when an analysis request is issued. In addition, the UDC Report Generator 1940 may be configurable to initialize the request, retrieval, aggregation and formatting of UDC data and/or analyzed data from data producers, where such configuration includes provisioning the Data Aggregator 1942, Query Generator 1920, Reporting Service UDC Data Receiver 1906, Data Validator 1944, and Report Formatter 1946, for UDC Report 1952 generation.

Finally, the Reporting Controller preferably configures each UDC Report Generator 1940 to generate a UDC Report 1952 per a specified set of user preferences, including those contained in configuration settings within configuration instructions 1970. This configuration preferably involves applying user-designated formatting preferences to the Report Formatter 1946.

In operation, the UDC Report Generator's onboard Data Aggregator 1942 renders the service request command from the Report Controller 1912 into a data query for dispatch via the Query Generator 1920. Service initialization preferably also informs the Data Aggregator 1942 to expect analyzed data from any issued analysis request. Once the queried and/or analyzed UDC data is retrieved by the Reporting Service UDC Data Receiver 1906, the Data Aggregator 1942 assembles the data and passes it to the Data Validator 1944 to verify that the retrieved data is sufficient for report generation. After validation, the data is preferably sent to the Report Formatter 1946, where it is rendered into a specified report format and transferred to the Report Dispatcher 1950 for dissemination as a UDC Report 1952 to report consumers 80 (e.g., Publishing Service 2000).

Analysis Service 2000

The UDC Client may include an Analysis Service for analyzing UDC data for report generation and/or redeposit into storage. In one embodiment (FIGS. 4A-D and 20), the Analysis Service 2000 performs a plurality of functions including: Responding to analysis requests; performing analysis modification; generating analyzed data; and, dispatching of the analyzed data to external consumers. In the embodiment shown in FIGS. 4A-D and 20, the Analysis Service 2000 includes Analysis Service Interfaces and a plurality of Analysis Service Sub-Processes, each of which is discussed in detail below.

Analysis Service Interfaces

The Analysis Service 2000 preferably includes a plurality of interfaces, and in some embodiments (e.g., FIGS. 4A-D and 20), includes five: An Analysis Service Event Receiver 2002; an Analysis Service Event Dispatcher 2004; an Analysis Service UDC Data Receiver 2006; an Analysis Service UDC Data Dispatcher 2008; and, an Analysis Request Receiver 2032. Each will be described in detail below.

Analysis Service Event Receiver 2002 preferably listens for, receives, and forwards system messaging that the Analysis Service is subscribed to. In one embodiment, the Analysis Service Event Receiver 2002 sends all received system messages to the Analysis Controller 2012 (described below). Subscribed events may include configuration messages including configuration instructions, file transfer of configuration file messages, and service requests. In the case of Analysis Service Event Receiver 2002, configuration messages may be defined as a system message that contains configuration instructions 2070, preferably derived from configuration settings assigned by the user, that are used to configure the Analysis Service 2000. File transfer of configuration file messages 2018 may be defined as system messages that encapsulate the Analysis Module 2022 (described below), which is intended for installation on the Analysis Service 2000. Service request messages 2028 may be defined as system messages that activate the Analysis Service 2000 for data reception from one or more data sources and analyzation of UDC data.

The Analysis Service Event Dispatcher 2004 transmits system events generated by the Analysis Service 2000. The Analysis Service Event Dispatcher 2004 preferably publishes these system messages for consumption by other services within the UDC System 100 (i.e., a publish-subscribe messaging protocol). Dispatched events from the Analysis Service Event Dispatcher 2004 preferably include service status messages (e.g., to other UDC Services 106 that are subscribed as Status Receivers 2024), although other events may be included. In the context of Analysis Service Event Dispatcher 2004 service status messages may be defined as system messages that signify the status of the Analysis Service 2000. Status preferably indicates the state that the Analysis Service is in for a particular UDC operation. Analysis Service status messages may include a message such as 'Analysis Service Ready;' however, it will be appreciated that other messages may be used instead.

Analysis Service UDC Data Receiver 2006 preferably receives UDC data that has been dispatched or sent by the Reporting Service UDC Data Dispatcher 1908. It will be understood, however, that UDC data may be transmitted from other similar UDC data dispatchers (not shown). The two components preferably function so that received UDC data coincides with an analysis request.

Analysis Service UDC Data Dispatcher 2008 preferably transmits UDC data that has been analyzed by the Data Analyzer 2020 (discussed below) to UDC data consumers 32 (e.g., Reporting Service 1900). The Analysis Service UDC Data Dispatcher 2008 is preferably configurable, and may be configured to assign a transmission destination for the analyzed data generated by the Data Analyzer 2020. This transmission destination assignment preferably includes issuing an address (or addresses) for recipient(s) of the analyzed data. In this configuration, the Analysis Service UDC Data Dispatcher 2008 receives analyzed data from the Data Analyzer 2020 and is configured to transmit data exclusively to those issued addresses.

Analysis Request Receiver 2032 preferably receives analysis requests from the Reporting Service's Analysis Requestor 1930 and passes the requests to the Analysis Controller 2012 (discussed below). Analysis Request Receiver 2032 preferably functions collaboratively with the Analysis Service UDC Data Receiver 2006 so that any received analysis request coincides with the receipt of UDC data.

Analysis Service Sub-Processes

The Analysis Service preferably includes a plurality of sub-processes and, in some embodiments (e.g., FIGS. 4A-4D and 20), includes three: an Analysis Controller 2012; a Data Analyzer 2020; and, an Analysis Module Loader 2014. Each will be discussed in detail below.

Analysis Controller 2012 is an automatic sub-process that preferably manages the configuration, activation, and general function of the Analysis Service 2000. Analysis Controller 2012 preferably receives most system messages from the Analysis Service Event Receiver 2002 and renders them into a series of commands for disbursement throughout the Analysis Service 2000. Some service request messages do not originate from the Analysis Service Event Receiver 2002 (e.g., analysis requests come from the Analysis Request Receiver 2032); thus, the Analysis Controller 2012 preferably has the added responsibility of correlating and reconciling service request messages from multiple receivers.

The Analysis Controller 2012 performs functions depending on the type of received message. In one embodiment, in response to configuration messages received from the Analysis Service Event Receiver 2002, the Analysis Controller 2012 may perform any of the following actions: Commanding the Data Analyzer 2020 to configure itself based upon assigned configuration settings; and, commanding the Analysis Service UDC Data Dispatcher 2008 to dispatch data according to select UDC data consumers 32. In response to file transfer messages received from the Analysis Service Event Receiver 2002, the Analysis Controller 2012 preferably commands the Analysis Module Loader 2014 (discussed below) to load the assigned the Analysis Module 2022 (discussed below) into the Data Analyzer 2020. Finally, in response to service messages received from the Analysis Service Event Receiver 2002, the Analysis Controller 2012 preferably commands the Data Analyzer 2020 to activate data reception and analysis.

Analysis Controller 2012 also preferably monitors the Analysis Service sub-processes and Analysis Service interfaces and reports the status of the Analysis Service 2000 as it progresses through various operations. The Analysis Controller 2012 further preferably generates service status messages, as needed, and sends them to the Analysis Service Event Dispatcher 2004 for publishing within the UDC System 100.

Data Analyzer 2020 is preferably an automatic sub-process that analyzes UDC data by correlating and performing calculations on and/or based upon the UDC data. The Analysis Service UDC Data Receiver 2006 preferably forwards UDC data to the Data Analyzer 2020 where the data is operated on by discrete function calculators and computed through a series of equations and/or mathematical operations to generate analyzed data. (The process is discussed in further detail below with respect to FIG. 21) The Analysis Service may have multiple Data Analyzers 2020, any or all of which may be simultaneously operational.

In one embodiment, the Data Analyzer 2020 is configurable, such configuration preferably derived from user assigned settings and options. In this embodiment, the configuration permits the Data Analyzer 2020 to perform several tasks: Sub-process instantiation (i.e., implementing one or more Data Analyzers 2020); assigning an Analysis Module 2022; and, initializing data analysis.

More particularly, in this embodiment, the Analysis Controller 2012 may instruct the Analysis Service to instantiate one or more Data Analyzers 2020, where each Data Analyzer 2020 receives a unique set of configuration instructions. Further the Data Analyzers 2020 are configurable to receive commands from the Analysis Controller 2012 to execute at least one of the following: Utilization of a specific Analysis Module 2022, wherein the Analysis Controller 2012 parses through the Analysis Module(s) 2022 loaded by the Analysis Module Loader 2014 and assigns the specified module as the Analysis Module 2022 to be used; and, initialization of the reception, correlation and calculation of UDC data from one or more data sources. This latter action preferably also includes provisioning of the Analysis Module 2022 for data analysis.

Analysis Module Loader 2014 is preferably an automatic sub-process that loads an Analysis Module 2022 into the Data Analyzer 2020. The Analysis Module Loader 2014 preferably receives a command from the Analysis Controller 2012 to a load a specific Analysis Module 2022, and then assigns that Analysis Module to be used by the Data Analyzer 2020.

Analysis Module 2022 enables the analytical processing of acquired data after it has been processed by the Translation Service 1500 and placed within storage. Analysis Module 2022 is preferably an optional applet or other small application that instructs how data is processed within the Analysis Service 2000. It is preferably customized by user or group of users based upon the user's data processing requirements.

Figure 21:
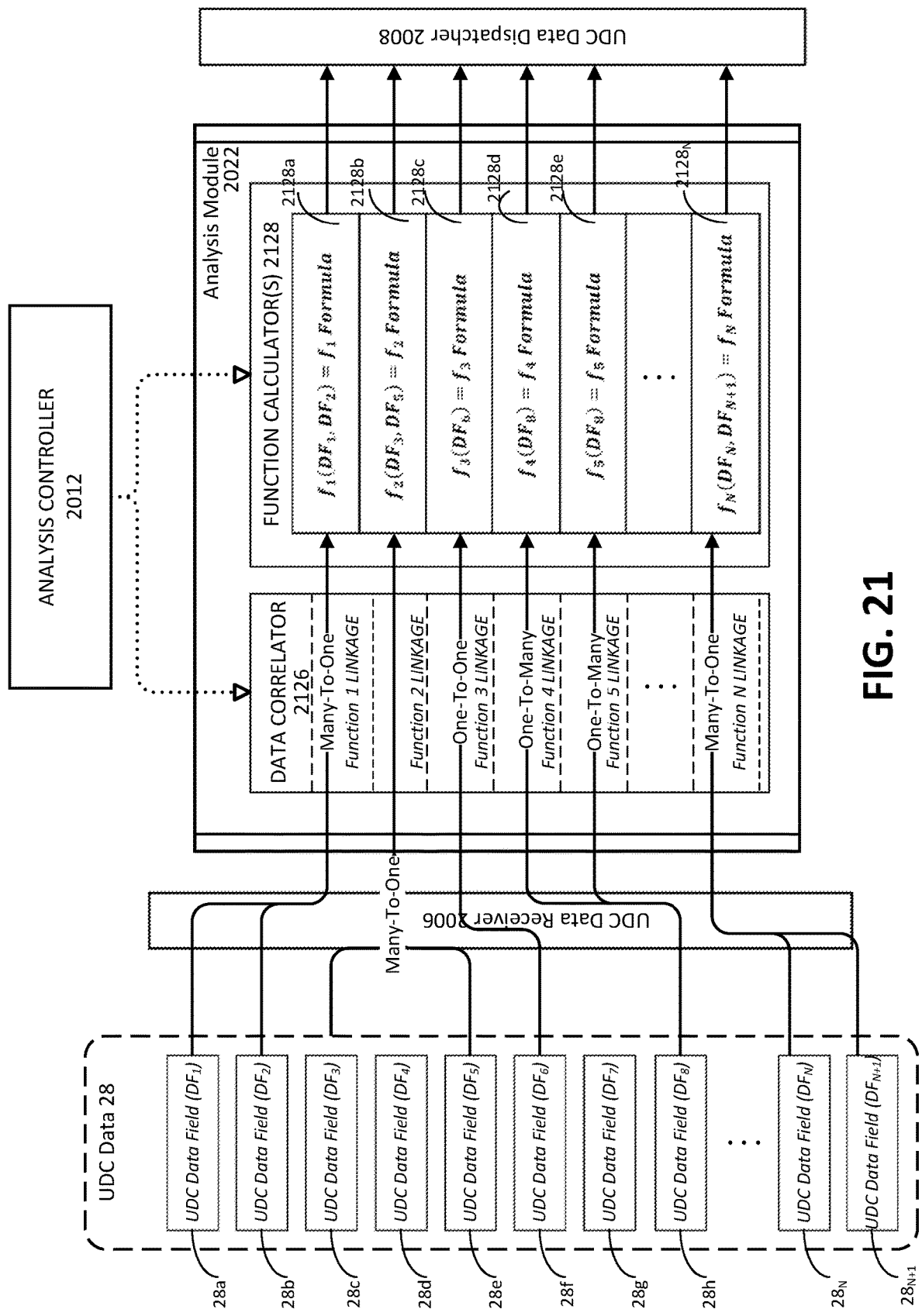
FIG. 21 is a diagram illustrating an exemplary embodiment of an Analysis Module of the and its operation in the UDC Analysis Service in accordance with various aspects of the present disclosure.
Figure 22:
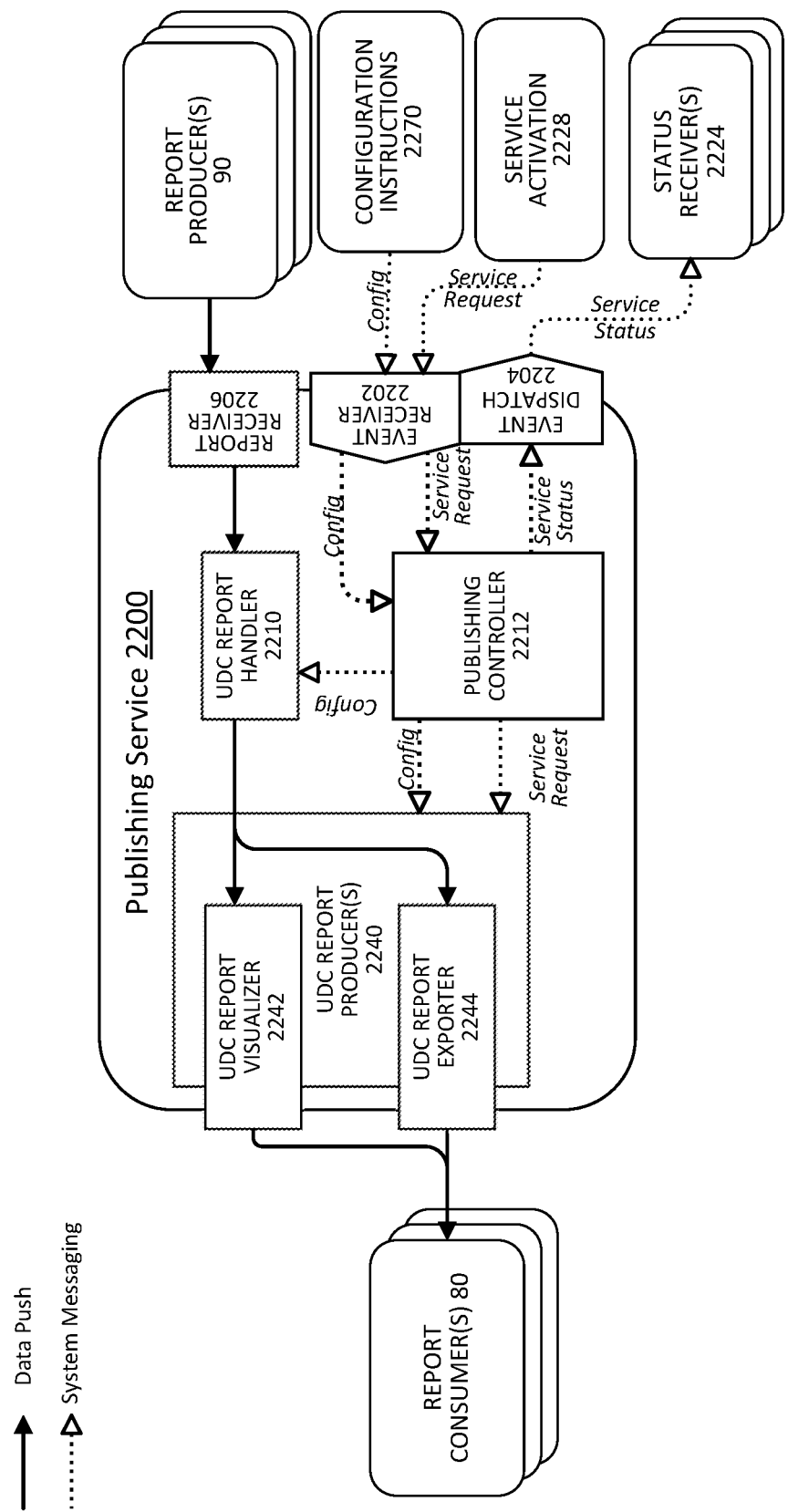
FIG. 22 is a block diagram illustrating an exemplary embodiment of a UDC Publishing Service and its components and data/messaging flows in accordance with various aspects of the present disclosure.

More particularly, once an analysis request accompanied by data has been passed to the Data Analyzer 2020, Analysis Module 2022 preferably designates how UDC data is correlated from its received state and how it is processed for analysis, and further indicates specific functions (and formulas) used to transform data according to the prescribed analysis. FIG. 21 illustrates one embodiment of this process.

In the embodiment of FIG. 21, Analysis Module 2022 ingests UDC data 28 including UDC data fields (28$a$, 28$b$ ... 28$_{(n+1)}$) and correlates the ingested data fields (28$a$, 28$b$ ... 28$_{(n+1)}$) via a Data Correlator 2126, for transmission to one or more function calculator(s) (2128$a$, 2128$b$ ... 2126$_N$). Each function calculator(s) (2128$a$, 2128$b$ ... 2126$_N$) processes the UDC data according to prescribed function(s)/formula(s). The thus computed results are then packaged by the Data Analyzer 2020 and passed to Analysis Service UDC Data Dispatcher 2008 for dissemination to UDC Data Consumers 32 (e.g., the Reporting Service 1900 that issued the original analysis request).

Publishing Service 2200

The UDC Client may include a Publishing Service for producing UDC Reports to a user in a preferred format. In one embodiment (FIGS. 4A-4D and 22), the Publishing Service 2200 performs a plurality of functions including: Visualizing UDC Reports; exporting UDC Reports (to a file); and, modifying report production. Publishing Service 2200 includes Publishing Service Interfaces and a plurality of Publishing Service sub-processes, each of which is discussed in detail below.

The Publishing Service 2200 preferably includes a plurality of interfaces, and in some embodiments (e.g., FIGS. 4A-4D and 22), includes five: A Publishing Service Event Receiver 2202; a Publishing Service Event Dispatcher 2204; a Report Receiver 2206; a UDC Report Visualizer 2242; and a UDC Report Exporter 2240. Each will be described in detail below.

Publishing Service Interfaces

The Publishing Service Event Receiver 2202 listens for, receives, and forwards, system messaging that the Publishing Service 2200 is subscribed to. Subscribed events may include configuration and service request messages. In the context of the Publishing Service Event Receiver 2202, configuration messages may be defined to be system messages that contain configuration instructions 2270 derived from configuration settings assigned by the user that are used to configure the Publishing Service 2200. Service requests 2228 may be understood to be system messages that activate the Publishing Service 2200 for report production to the user. The Publishing Service Event Receiver 2202 preferably sends all received system messages to the Publishing Controller 2212 (discussed below).

The Publishing Service Event Dispatcher 2204 transmits system events generated by the Publishing Service 2200. Dispatched events preferably include service status messages (e.g., to other UDC Services 106 that are subscribed as Status Receivers 2224), although other events may be included. In the context of the Publishing Service 2200, Publishing Service Event Dispatcher 2204 service status messages may be defined to mean system messages that indicate the status of the Publishing Service 2200, where status indicates the state that the Publishing Service 2200 is in for a particular UDC operation. Exemplary Publishing Service 2200 states may include: 'Publishing Service Ready,' but it will be understood that other similar Publishing Service states may be included or used instead. The Publishing Service Event Dispatcher 2204 preferably publishes these system messages for consumption by other services within the UDC System 100 (i.e., a publish-subscribe messaging protocol).

Report Receiver 2206 receives generated UDC reports 1952 from the Reporting Service 1900 or other Report Producer 90 and transmits to the UDC Report Handler 2210 for preparation for submission to a user (discussed below).

Finally, UDC Report Visualizer 2242 provisions a graphical UDC report and UDC Report Exporter 2244 provisions a UDC report for export to report consumer(s) 80 via any of a plurality of device peripherals that are or may be connected to UDC System 100.

Publishing Service Sub-Processes

The Publishing Service 2200 preferably includes a plurality of sub-processes, and in some embodiments (e.g., FIGS. 4A-4D and 22), includes three: A Publishing Controller 2212; a UDC Report Handler 2210; and a UDC Report Producer 2240. Each will be discussed in detail below.

The Publishing Controller 2212 is an automatic sub-process that preferably manages the configuration, activation, and general functions of the Publishing Service 2200. The Publishing Controller 2212 preferably receives all system messages from the Publishing Service Event Receiver 2202 and renders them into a series of commands for disbursement throughout the Publishing Service 2200.

The Publishing Controller 2212 preferably performs functions depending on the type of received message. In one embodiment, in response to configuration messages received from the Publishing Service Event Receiver 2202, the Publishing Controller 2212 may perform any of the following actions: Commanding the UDC Report Handler 2210 to configure itself based upon assigned configuration settings; and, commanding the UDC Report Producer 2240 to configure itself based upon assigned configuration settings included in configuration instructions 2270. In response to service request messages 2228 received from the Publishing Service Event Receiver 2202, the Publishing Controller 2212 preferably performs any of the following actions: Commanding the UDC Report Visualizer 2242 to present the UDC report (e.g., 1952) to a user via connected device peripherals (not shown); and, commanding the UDC Report Exporter 2244 to render the UDC report (e.g., 1952) to a file suitable for download/upload also via one or more of the device peripherals 254 or device outputs 226.

The Publishing Controller 2212 also preferably monitors the Publishing Service sub-processes and Publishing Service interfaces and reports the status of the Publishing Service 2200 as it progresses through various operations. The Publishing Controller 2212 further preferably generates service status messages, as needed, and sends them to the Publishing Service Event Dispatcher 2204 for publishing within the UDC System 100.

The UDC Report Handler 2210 is an automatic sub-process that preferably manages received UDC reports (e.g., 1952) received from the Reporting Service 1900 and then prepares them for submission to the user. In the context of the UDC Report Handler 2210, management preferably includes directing each UDC report (e.g., 1952) to export and/or visualization production, and establishing read and retrieval permissions per user. After the UDC Report Handler 2210 has prepared a UDC report (e.g., 1952), it preferably forwards it to the UDC Report Producer 2240 (discussed below).

In one embodiment the UDC Report Handler 2210 is configurable, such configuration preferably derived from user assigned settings and options. In this embodiment, the UDC Report Handler 2210 preferably receives a command from the Publishing Controller 2212 to assign UDC Reports (e.g., 1952) for viewing and/or export and then is configured to submit received reports for visualization and/or exportation production by the UDC Report Producer 2240.

The UDC Report Producer 2240 is an automatic sub-process that preferably renders UDC reports (e.g., 1952) in a format appropriate for visualization and/or file exportation. In the context of the UDC Report Producer 2240, rendering preferably includes compiling a UDC Report (e.g., 1952) for graphical representation and/or encapsulating a UDC Report (e.g., 1952) into a file suitable for download/upload. It will be appreciated that the user preferably designates how to produce this report. After the UDC Report (e.g., 1952) is sufficiently rendered, the UDC Report Producer 2240 preferably publishes the report to the user via the UDC Report Visualizer 2242 and/or to the UDC Report Exporter 2244. The Publishing Service 2200 may have multiple UDC Report Producers 2240, any or all of which may be simultaneously operational, In one embodiment the UDC Report Producer 2240 is also configurable, such configuration preferably derived from user assigned settings and options. In this embodiment, such configuration may include: Sub-process instantiation (i.e., implementing one or more UDC Report Producer 2240); and, initializing UDC Report visualization and/or exportation.

More particularly, in this embodiment, the Publishing Controller 2212 may instruct the Publishing Service 2200 to instantiate one or more UDC Report Producers 2240, where each UDC Report Producer 2240 receives a unique set of configuration instructions. Further, the UDC Report Producer 2240 is configurable to receive commands from the Publishing Controller 2212 to execute the initialization of the reception, visualization, and/or exportation of one or more UDC Reports (e.g., 1952), where such configuration includes provisioning the UDC Report Visualizer 2242 and UDC Report Exporter 2244 Interfaces for report publishing.

UDC System Configuration

As will now be appreciated, the UDC System, UDC Device, UDC Client, and UDC Services provide a highly flexible and adaptive platform for the collection, storage, and processing of data from one or more UAS data sources. This flexibility enables the UDC System to be configured for use in a number of diverse settings and contexts while still providing uniform and reliable data. Prior to such use, the UDC System, UDC Device, UDC Client, and UDC Services must be configured.

Configuring the UDC System, UDC Device(s), UDC Client(s), and UDC Service(s) includes, at least, how the UDC Client(s) will be implemented (i.e., stand-alone UDC Client or multi-client UDC), what devices, systems, and/or services (e.g., data sources, data storage, time sources) will be connected to the UDC System/UDC Device(s), how the UDC Service(s) on the UDC Client(s) will behave, and what outputs are required or desired from the UDC Device(s), UDC Client(s), and UDC Service(s) (e.g., collection, storage, analysis, and/or reporting of data). Much of this will be determined by the intended context of use of the UDC System. (Exemplary contexts of use and UDC System, UDC Device(s), UDC Client(s), and UDC Service(s) configurations are set forth below in exemplary UDC System Deployments).

Once an administrator or other user initially determines the intended context of use of the UDC System and operations to be performed thereunder (e.g., collection, storage, analysis, and/or reporting), and from that determination, assigns roles and responsibilities of other user(s) of the UDC System, the administrative or other user installs the UDC Client(s) and service software onto the UDC Device(s) through the device inputs and connects the UDC System to all external devices, systems, and services associated with the selected context of use and operations.

Referring again to FIGS. 2-5, such connectivity may include client-to-client interfacing (i.e., establishing UDC Client(s) 104 implementation), linking to live data sources (e.g., live data stream 22), coupling with auxiliary support services (e.g., time source 444 (e.g., GPS or Network Time Protocol (NTP) server) and/or external storage device(s) (e.g., 248, 1848)), and attaching any device peripherals 254 (e.g., wired peripherals such as a wired keyboard, mouse, and/or monitor and/or wireless peripherals such as a wireless keyboard, mouse, smartphone, tablet, and/or monitor). Each of these connections may be: Local to the UDC Device 102 (e.g., a storage device and a UDC Client 104 reside on the same device); point-to-point (i.e., one system directly connected to another by a physical cable or 'line'); or, routed through a distributed network (e.g., FIG. 6). Regardless of the connection pathway, each connection preferably maps to a UDC Client interface via the prescribed interface contract (e.g., API) as discussed above. In the situation where the connection is external to the UDC Device 102 (i.e., point-to-point or networked), a UDC Device input/output (e.g., 224, 226) preferably precedes the UDC Client 104 interface. In such case, a specialized adapter (e.g., 250) may be required to convert the connection protocol to the client interface contract.

The administrator or other user then installs baseline configuration files and other further customizations through the UDC Device user interface via device inputs (e.g., 224). As discussed in more detail above, baseline configuration files may include any of the Data Dictionary (e.g., 1526), Data Translator (e.g., 1522), Analysis Module (e.g., 2022), and Logbook Module (e.g., 1216). The UDC Device 102 and UDC Client(s) 104 are also preferably configured to allow for further refined customizations of the baseline configuration of services and interfaces residing upon the UDC Client(s) 104. Such customizations may include designating data collection and data processing preferences, as well as assigning data transmission routes (i.e., where data is coming from and where data is going to with respect to established connections).

Client Control Panel 2300

According to one embodiment, the aforementioned baseline configuration and additional customizations are effected by a user through a client control panel. Administrators and other users enter inputs onto the UDC Client 104 via a user interface that connects to the Access Service (e.g., Access Service 1000) where the client control panel (e.g., client control panel 1052) is located. This control panel renders user input into a set of configuration actions and passes those actions to applicable UDC Services 106 on the UDC Client 104 for respective configuration.

Figure 23A:
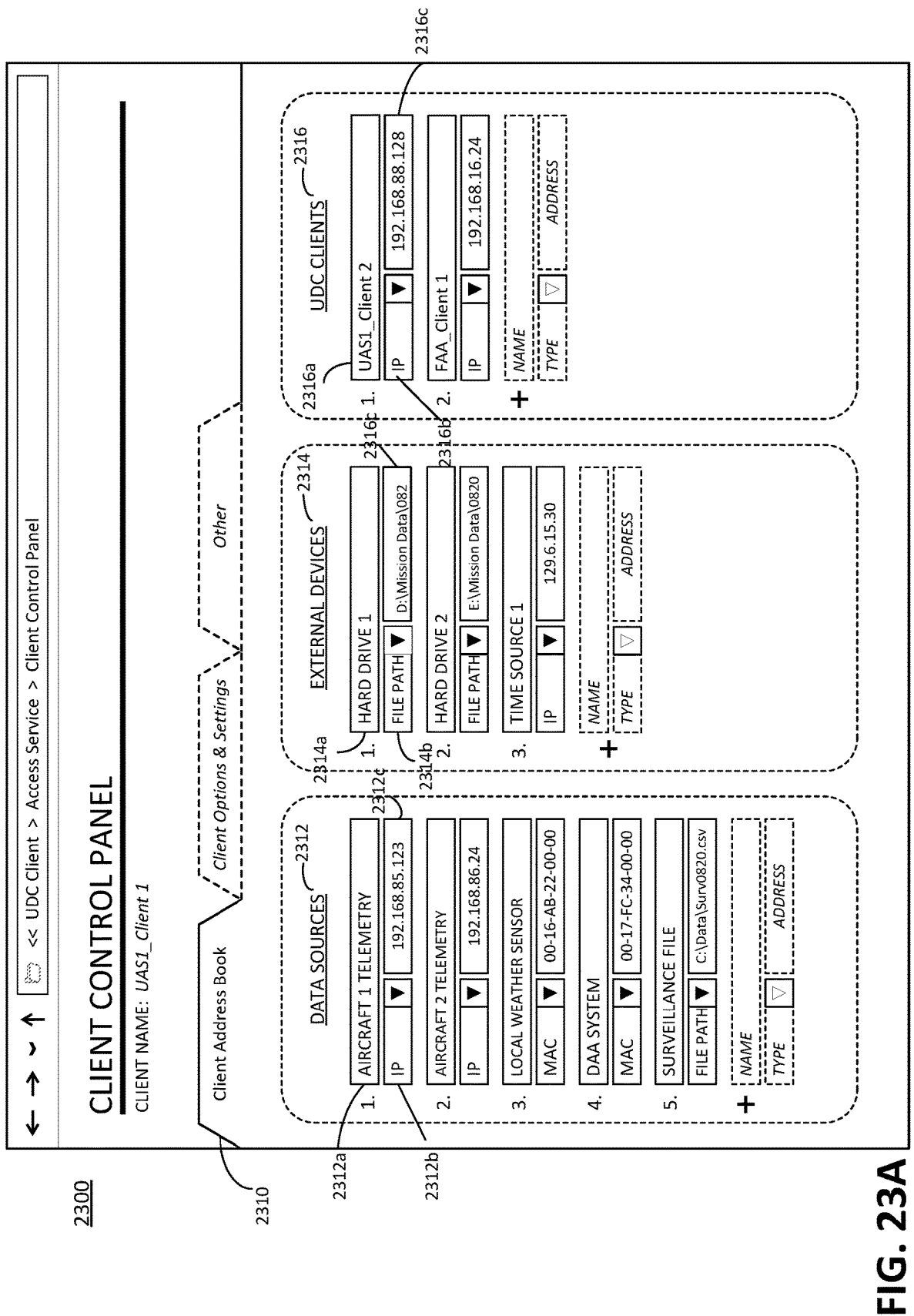
FIGS. 23A-B are graphical illustrations of an exemplary Client Control Panel, including Client Address Book and Client Options & Settings sections, for effecting baseline configuration and customizations of the UDC System, UDC Device(s), UDC Client(s) and/or UDC Service(s) in accordance with various aspects of the present disclosure.
Figure 23B:
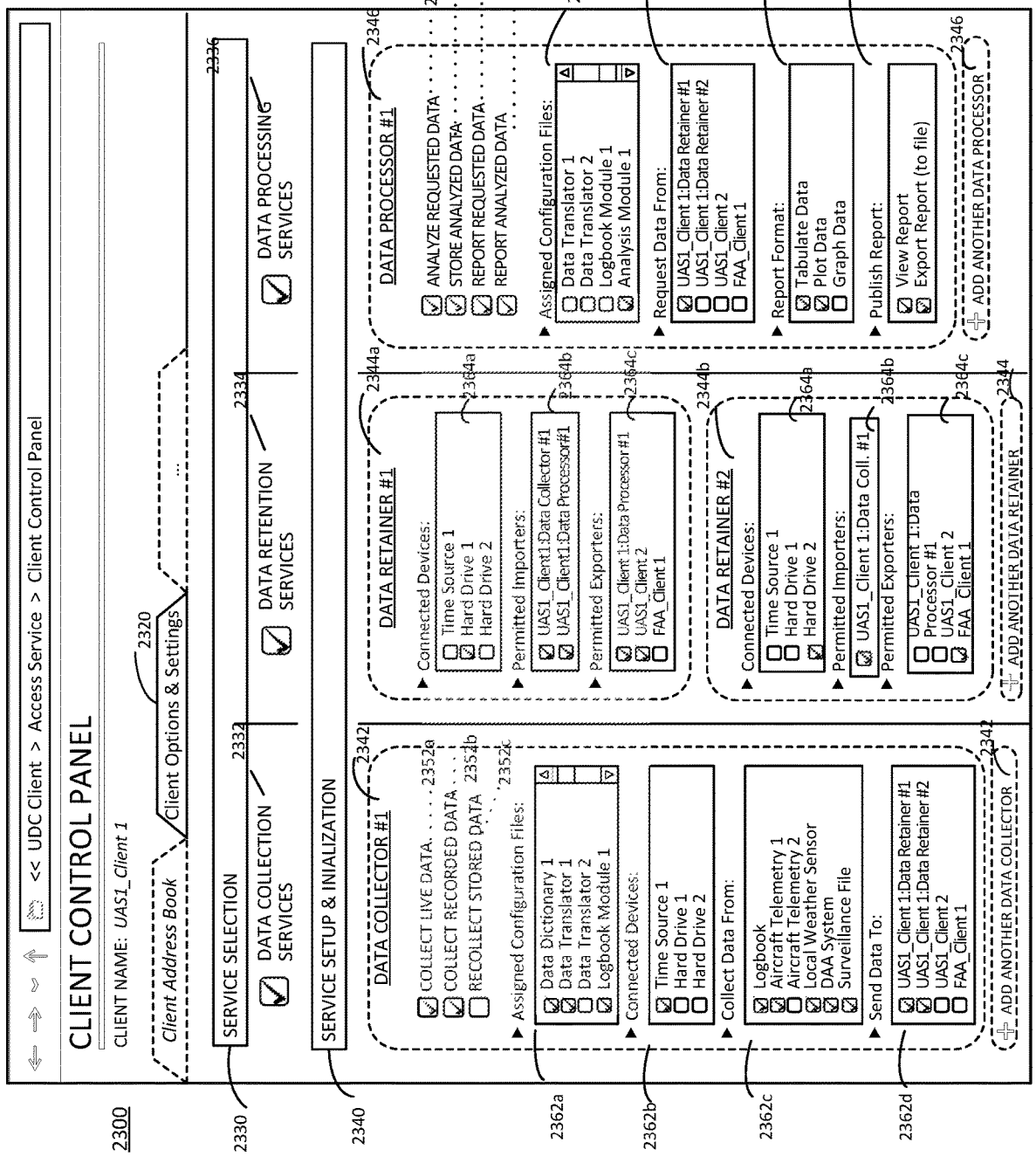

The client control panel may be understood with reference to an embodiment of the Client Control Panel 2300 set out in FIGS. 23A and 23B. Client Control Panel 2300 is preferably configured to include a section for allowing an administrator or other user to manually enter baseline configurations, including a plurality of address information (Client Address Book 2310) and a section for declaring preferences for the collection and processing of data upon a client (Client Options & Settings 2320). It will be appreciated that other sections may be included or substituted on Client Control Panel 2300 to allow a user more refined configuration of services and interfaces residing upon the UDC Client(s) 104 without departing from the spirit of the embodiments disclosed here.

As seen in the FIG. 23A, Client Address Book 2310 is preferably configured to allow an administrator or other user to assign address information for those data sources, external devices, and UDC Client(s) 104 available or connected to the UDC System 100 (respectively, in Data Sources section 2312, External Devices section 2314, and UDC Clients section 2316). This address assignment can either be arbitrary (i.e., discretionary to the user) or predetermined (i.e., fixed and non-elective) and serves two primary purposes: Identifying each connected client, device, and/or data source; and, locating each connected client, device and/or data source. In some embodiments (e.g., FIG. 23A), address information includes: The name or other identification of the device 2312a, 2314a, 2316a; the address type 2312b, 2314b, 2316b (e.g., Internet Protocol (IP), media access control (MAC), file path address, etc.); and, an address 2312c, 2314c, 2316c. It will be appreciated that, for address assignments involving local networks and/or local storage, a user may be given the flexibility to designate a personalized address (e.g., local IP or file path address), whereas larger networks or direct hardware connections may require the user to assign a preset address (e.g., MAC address).

Client Options & Settings 2320 (FIG. 23B) is configured to allow an administrator or other user to declare preferences for the collection, retention, and/or processing of data upon the UDC Client(s) 104, including the ability to select from a plurality of options and discrete settings that correspond to the configurable aspects of the services residing upon the UDC Client(s) 104. As seen in the embodiment of FIG. 23B, Client Options & Settings 2320 includes Service Selection section 2330 and Service Setup & Initialization section 2340.

Service Selection section 2330 presents an administrator or other user a selection of grouping of services, where each grouping reflects the service sequence functional groupings and priorities of UDC Services 106 discussed in FIG. 7. The embodiment of FIG. 23B shows three of those service sequencing groupings: Data Collection Services 2332; Data Retention Services 2334; and/or Data Processing Services 2336.

Service Setup & Initialization section 2340 presents to the administrator or other user the separate instances of the service sequencing groupings as well as available additional configuration action options and discrete settings associated with each separate service instance which may be selected for further customization. Thus, as seen in FIG. 23B, Data Collector 2342 is an instance of Data Collection Services 2332, Data Retainers 2344a and 2344b are two instances of Data Retention Services 2334, and Data Processor 2346 is an instance of Data Processing Services 2336.

Although only Data Collector 2342, Data Retainers 2344a and 2344b, and Data Processor 2346 are shown in FIG. 23B, it will be appreciated that additional Data Collector(s) 2342, Data Retainer(s) 2344, and Data Processor(s) 2346 may be included to represent other service instances in UDC System 100. Furthermore, the service sequencing groupings displayed in Client Options & Settings 2330 are preferably affected by client implementation. More specifically, in the embodiment of the UDC Device 102 with stand-alone UDC Client 404, the Client Control Panel 2300 will preferably display all three service sequencing groupings (and associated available configuration action options and settings), whereas, in the multi-client UDC 504 embodiment, the Client Control Panel 2300 preferably only displays one or two of the service sequencing groupings (and associated available configuration action options and settings), the provision of which depending upon the UDC Client(s) and associated UDC Services 106 on the UDC Device 102.

In operation, selection of Data Collection Services 2332 preferably results in the Client Control Panel 2300 presenting to the administrator or other user available Data Collectors 2342 on the UDC Client(s) 104, including a plurality of configuration action options for the Data Collector 2342 (i.e., Collect Live Data 2352a, Collect Recorded Data 2352b, and Recollect Stored Data 2352c). Selection of Collect Live Data 2352a by an administrator or other user causes the Receiving Service Source Data Receiver (e.g., 1460) to be configured to collect streamed data. Selection of Collect Recorded Data 2352b causes the Receiving Service Source Data Receiver (e.g., 1460) to be configured to collect batched data. Selection of Recollect Stored Data 2352c by the user causes the UDC Data Exporter within the Storage Service (e.g., 1840) to be configured to recollect stored data.

Selection of Data Retention Services 2334 preferably results in the Client Control Panel 2300 presenting to the administrator or other user available Data Retainers 2344a and 2344b on the UDC Client (s) 104. Data Retention Services 2334 provides the administrator or other user an option to store collected data. Data Retention Services 2334 configures the Storage Service UDC Data Importer (e.g., 1830) to deposit data into storage, in a format consistent with the manner in which it was originally collected (i.e. storage configuration will changed based upon whether the data is live, batched, re-run, etc.), and configures the Storage Service UDC Data exporter (e.g., 1840) to export data to authorized data consumers.

Finally, selection of Data Processing Services 2336 by an administrator or other user preferably results in the Client Control Panel 2300 presenting to the administrator or other user available Data Processors 2346 on the UDC Client(s) 104, including a plurality of configuration action options 2356 for the Data Processors 2346, including the following: Analyze Requested Data 2356a; Store Analyzed Data 2356b; Report Requested Data 2356c; and, Report Analyzed Data 2356c. Selection of Analyze Requested Data 2356a by an administrator or other user causes the Analysis Requestor and Reporting Service UDC Data Dispatcher (e.g., Analysis Requestor 1930 and Reporting Service UDC Data Dispatcher 1908) as well as the Analysis Service UDC Data Dispatcher (e.g., Analysis Service UDC Data Dispatcher 2008) to be configured to support data analysis operation(s). Selection of Store Analyzed Data 2356b causes the Analysis Service UDC Data Dispatcher (e.g., Analysis Service UDC Data Dispatcher 2008) to be configured to support data storage operation(s). Selection of Report Requested Data 2356c causes the UDC Report Generator and UDC Report Dispatcher (e.g., UDC Report Generator 1940 and UDC Report Dispatcher 1950) to be configured to report data that has been retrieved from storage. Selection of Report Analyzed Data 2356d by an administrator or other user will cause UDC Report Generator and UDC Report Dispatcher (e.g., UDC Report Generator 1940 and UDC Report Dispatcher 1950) to be configured to support report generation operation(s).

In addition to the foregoing service selection and configuration action options, Client Control Panel 2300 is further configured to provide an administrator or other user with additional discrete settings (2362, 2364, 2366) for further customization of the UDC Services 106 available in each associated service instance (2342, 2344a and 2344b, and 2346).

In a preferred embodiment, selection of any of these discrete settings also initializes the associated UDC Services 106 for operation in a manner corresponding to the service order sequencing and priorities discussed above with reference to FIG. 7. Thus, selection of a particular service sequencing grouping under Service Selection section 2330 deploys instances of those UDC Services 106 associated with it and which are currently hosted on UDC Client(s) 104. For example, selection of Data Collection Services 2332 causes deployment of Data Collector(s) 2342, which may include any of the Access 1000, Config 1100, Logbook 1200, Receiving 1400 and/or Translation Services 1500. Selection of Data Retention Services 2334 causes deployment of Data Retainer(s) 2344, which may include any of the Access 1000, Config 1100, and/or Storage Services 1800. Finally, selection of Data Processing Services 2336 causes deployment of Data Processor(s) 2346, which may include any of the Access 1000, Config 1100, Translation Services 1500, Reporting Service 1900, Analysis Service 2000, and/or Publishing Service 2200.

In the embodiment of FIG. 23B, discrete settings 2362 for Data Collector 2342 preferably include: Configuration file selection setting(s) 2362a; external device setting(s) 2362b; data source setting(s) 2362c; and, data transmission setting(s) 2362d. Configuration file setting(s) 2362a allows an administrator or other user to assign which imported configuration files to utilize. Selection of these configuration files causes an instruction to the configuration file loader(s) within the applicable UDC Services 106. External device setting(s) 2362b allow an administrator or other user to assign external devices from a list of client-connected devices and their prescribed addresses (e.g., from 2314 of the Client Address Book 2310 (FIG. 23A)). Selection of these external devices configures the accessory interfaces within applicable UDC Services 106. Data source setting(s) 2362c allows an administrator or other user to assign data collection sources from a list of client-connected data sources and their prescribed addresses (e.g., from 2312 of the Client Address Book 2310 (FIG. 23A)). Selection of these data sources configures the data receiver interfaces within applicable UDC Services 106. Finally, data transmission setting(s) 2362d permit an administrator or other user to assign a data transmission route for the collected data. The data transmission route may be internal and/or external to the client. Internal assignment preferably involves designating transmission to another service instance (or instances) on the existing UDC Client 104, while external assignment involves designating transmission to dissociated clients (using the prescribed addresses of those UDC Client(s) 104). Data transmission setting(s) 2362d configures the Data Dispatching Interfaces within applicable UDC Services 106 and/or any client-to-client interface in the case of the multi-client UDC System 100.

Discrete settings for Data Retainers 2344a and 2344b in the embodiment of FIG. 23B preferably include: External device setting(s) 2364a; storage access permission setting(s) 2364b; and, data transmission setting(s) 2364c. External device setting(s) 2364a and data transmission setting(s) 2464c for Data Retainers 2344a and 2344b are configured to execute in a manner similar to the corresponding settings for Data Collector 2342. Storage access permission setting(s) 2364b permit an administrator or other user to assign storage access permissions to one or more of the connected storage devices. Selection of storage access permissions setting(s) 2364b configures the UDC Data Importer, UDC Data Exporter, and Data Persistence Interface within the Storage Service (e.g., UDC Data Importer 1830, UDC Data Exporter 1840, and Data Persistence Interface 1856 within the Storage Service 1800).

Finally, discrete settings for Data Processor 2346 preferably include the following: Configuration file selection setting(s) 2366a; data source setting(s) 2366b; report format setting(s) 2366c; and, publish report setting(s) 2366d. Configuration file selection setting(s) 2366a and data source setting(s) 2366b are configured to execute in a manner similar to the corresponding settings for Data Collector 2342. Report format setting(s) 2366c permit an administrator or other user to assign reporting preferences including format guidelines (e.g., graph, plot and/or tabulation instructions) for a requested data report. Selection of report format setting(s) 2366c configures the UDC Report Generator within the Reporting Service (e.g., UDC Report Generator 1940 within the Reporting Service 1900). Finally, publish report setting(s) 2366d permit an administrator or other user to assign publishing preferences including stipulations as to how a UDC Report is provisioned (e.g., exported as file or visualized on the device peripherals). Selection of publish report setting(s) 2366d configure the UDC Report Handler and UDC Report Producer within the Publishing Service (e.g., UDC Report Handler 2210 and UDC Report Producer 2240 within the Reporting Service 2200).

It will be appreciated that the discrete settings for instances under the same service sequencing grouping may differ. For example, Data Retainer 2344a allows for an additional Permitted Importer 2364b over that allowed for Data Retainer 2344b.

It will be further appreciated that Client Control Panel 2300 and its configuration and options and settings is but an exemplary user interface by which a user can configure the UDC Device 102 and Client 104 and input baseline configuration files and customizations. Other similar user interfaces and configurations may be used without departing from the spirit of the UDC System 100, UDC Device 102, and UDC Client 104 embodiments disclosed herein.

Once the baseline configuration files have been uploaded and the administrator or other user has provided any further desired customizations (i.e., configuration action options and/or discrete settings), the UDC Client(s) 104 auto-configure the remainder of the components of the system (i.e., UDC Services 106 and UDC Client Interfaces (User Interface(s), Data Source Interface(s), External Device Interface(s), Host UDC Service(s), and Data Dissemination Interface(s)) based upon these installed baseline configuration files and customizations. The UDC Client(s) 104 render the baseline configuration files and customizations into a set of customized configuration instructions, and pass the customized instructions to applicable UDC Services 106 on the UDC Client(s) 104 per the sequencing and priority previously discussed above and in FIG. 7. Each UDC Service 106 will automatically configure itself per those instructions. UDC Device 102 and Client(s) 104 configuration are now complete and the system is ready for operation.

UDC System Operation

UDC System operation may be viewed as a collection of a plurality of operational states. In a preferred embodiment, there are nine operational states: Configuration of UDC Data Collection Services; Configuration of UDC Data Retention Services; Configuration of UDC Data Processing Services; Collection of Streamed Data; Collection of Batched Data; Recollection of Stored Data; Request and Retrieval of Stored Data; Analysis of Data; and, Reporting of Data. Each will be discussed in detail below.

UDC Data Collection Services Configuration Operating State

Figure 24:
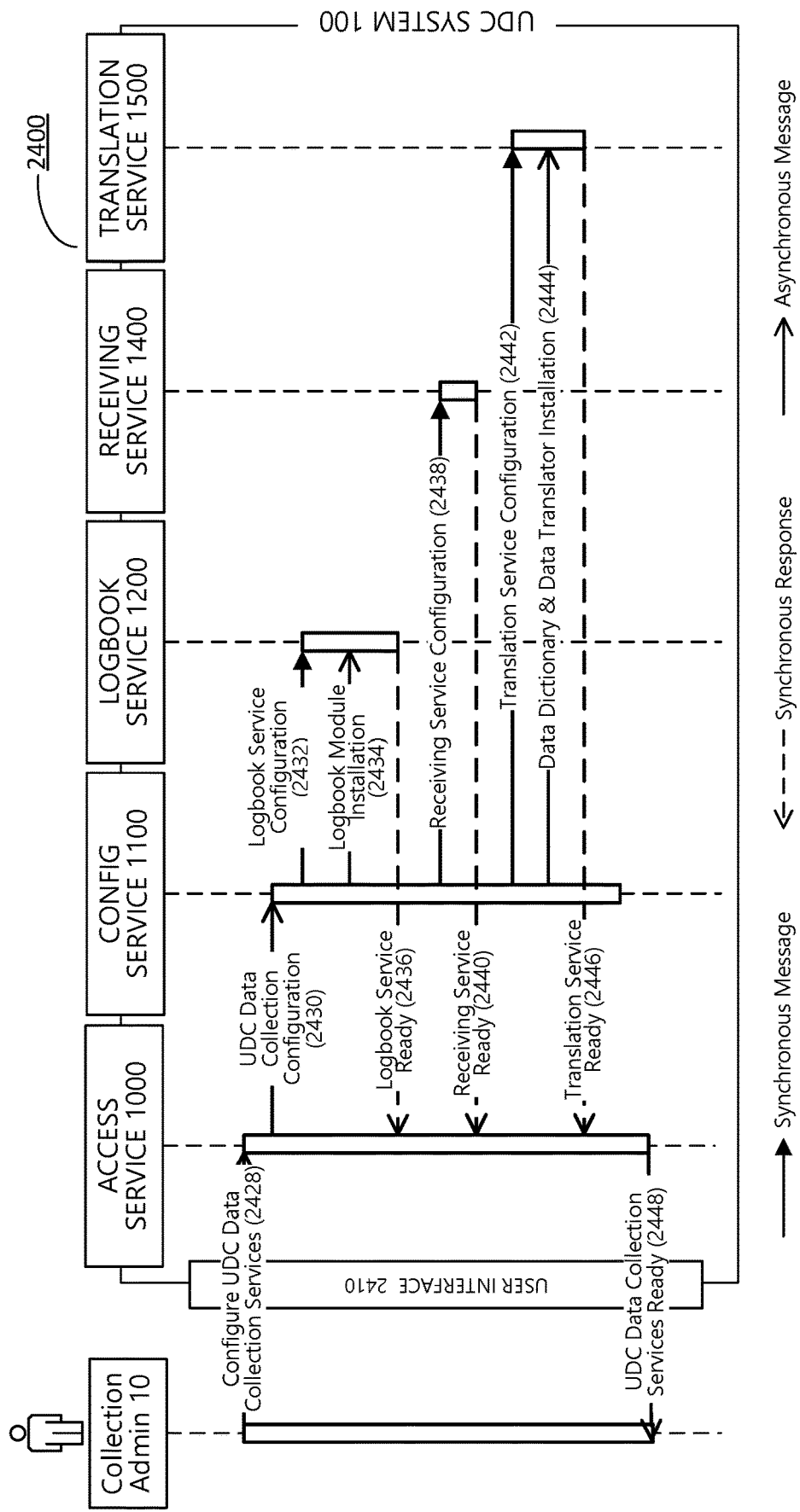
FIG. 24 is a sequence diagram illustrating an exemplary embodiment of UDC Data Collection Services configuration operating state of the UDC System in accordance with various aspects of the present disclosure.

The UDC Data Collection Services Configuration operating state 2400 includes those UDC Service-level interactions associated with configuring the UDC System for data collection. FIG. 24 shows a sequence diagram for an exemplary embodiment of this operating state.

The Collection Administrator or other user 10 accesses the UDC System through the user interface 2410 to install baseline configuration files and other further customizations and discrete settings as required (2428), including any or all of: Importation of a Logbook Module; importation of a Data Dictionary; importation of a Data Translator; selection of data collection options; assignment of data sources; assignment of any time sources; and, assignment of data transmission routes. The Access Service 1000 preferably facilitates each of these actions and then dispatches the configuration files and further data collection customizations to the Config Service 1100 for automated configuration of the UDC Client (2430). The Config Service 1100 receives these elements and preferably generates two system events: Installation of the configured module(s) and installation of the configuration instructions (rendered from the customizations and discrete settings). The Config Service 1100 dispatches these system events as follows:

The Config Service 1100 dispatches configuration instructions (2432) and a Logbook Module installation package (including installation instructions) to the Logbook Service 1200 (2434). The Logbook Service 1200 receives these events, installs the Logbook Module and, as discussed previously, modifies sub-processes and interfaces on the service according to the received configuration instructions. Once the Logbook Module configuration is complete, the Logbook Service 1200 sends a notification event to the Access Service 1000 that it is ready for data collection (2436).

The Config Service 1100 also dispatches configuration instructions and customizations to the Receiving Service 1400 (2438). The Receiving Service 1400 receives this event and, as discussed previously, modifies sub-processes and interfaces on the service according to the received configuration instructions and customizations. Once configuration is complete, the Receiving Service 1400 sends a notification event to the Access Service 1000 that it is ready for data collection (2440).

The Config Service 1100 also dispatches configuration instructions (2442) and a Data Dictionary and Data Translator installation package (including installation instructions) (2444) to the Translation Service 1500. The Translation Service 1500 receives these events, installs both the Data Dictionary and Data Translator, and modifies sub-processes and interfaces on the service according to the received configuration instructions. Once configuration is complete, the Translation Service 1500 sends a notification event to the Access Service 1000 that it is ready for data collection (2446).

Finally, the Access Service 1000 notifies the Collection Administrator or other user 10 (via the user interface 2410) that the UDC Data Collection Services configuration 2400 is complete and UDC Data Collection Services are ready for data collection (2448).

UDC Data Retention Services Configuration Operating State

Figure 25:
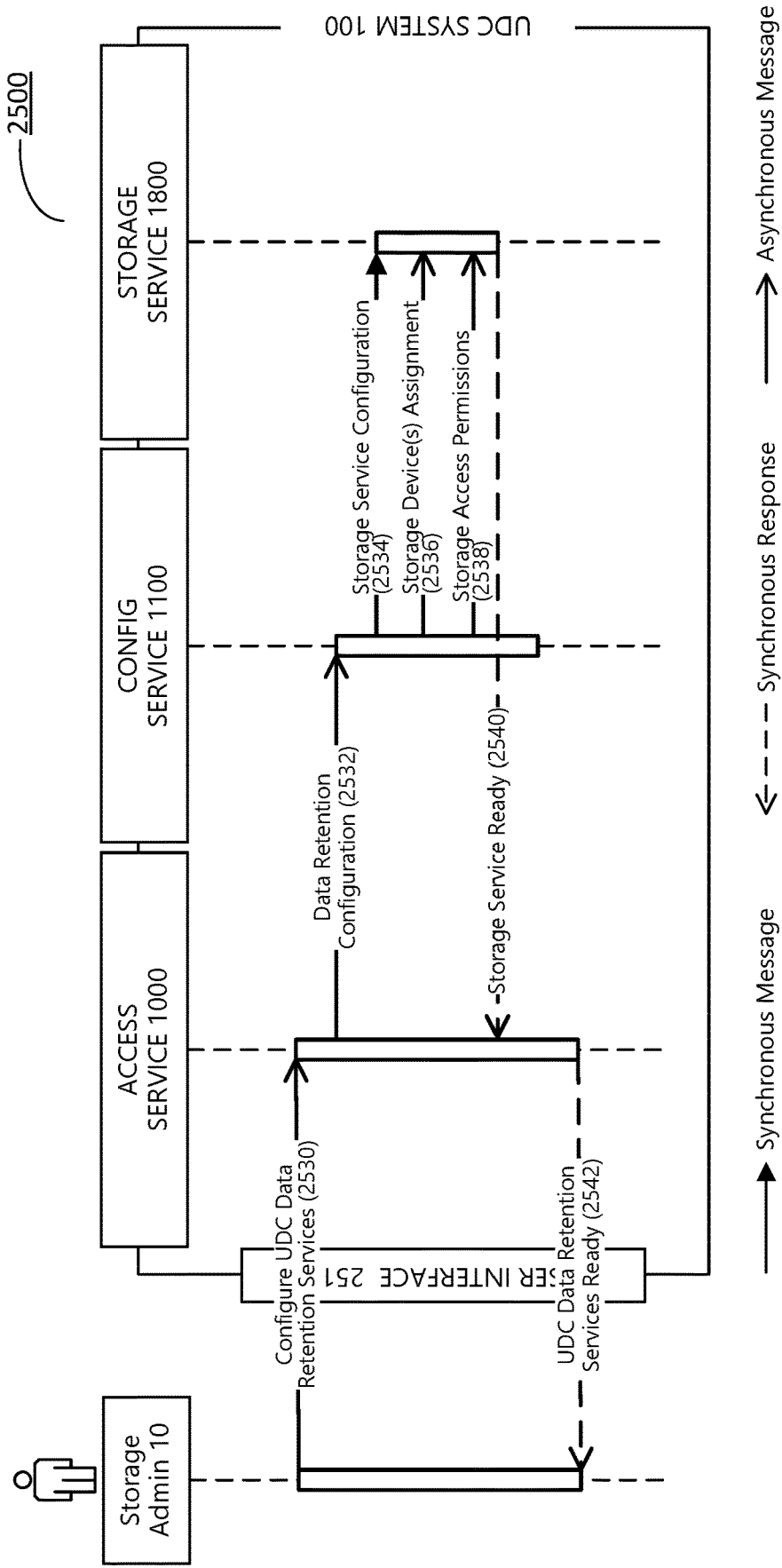
FIG. 25 is a sequence diagram illustrating an exemplary embodiment of UDC Data Retention Services configuration operating state of the UDC System in accordance with various aspects of the present disclosure.

The UDC Data Retention Services Configuration Operating State 2500 includes those UDC Service-level interactions associated with configuring the UDC System for data retention. FIG. 25 shows a sequence diagram for an exemplary embodiment of this operating state.

The Storage Administrator or other user 10 initiates this operation by accessing the UDC System through the user interface 2510 to assign storage devices and to assign storage access permissions (2530). The Access Service 1000 facilitates both actions and dispatches these retention settings to the Config Service 1100 for automated configuration of the UDC Client (2532). The Config Service 1100 receives these elements and generates configuration instructions (rendered from the data retention settings), storage device assignments, and storage access permissions to the Storage Service 1800 (2534, 2536, 2538). The Storage Service 1800 receives this event and, as discussed previously, modifies sub-processes and interfaces on the service according to the received configuration instructions. Once configuration is complete, the Storage Service 1800 sends a notification event to the Access Service 1000 that the service is ready for data retention (2540). Finally, the Access Service 1000 notifies the Storage Administrator or other user 10 (via the user interface 2520) that the UDC Data Retention Services configuration 2500 is complete and UDC Data Retention Services are ready for data retention (2542).

UDC Data Processing Services Configuration Operating State

Figure 26:
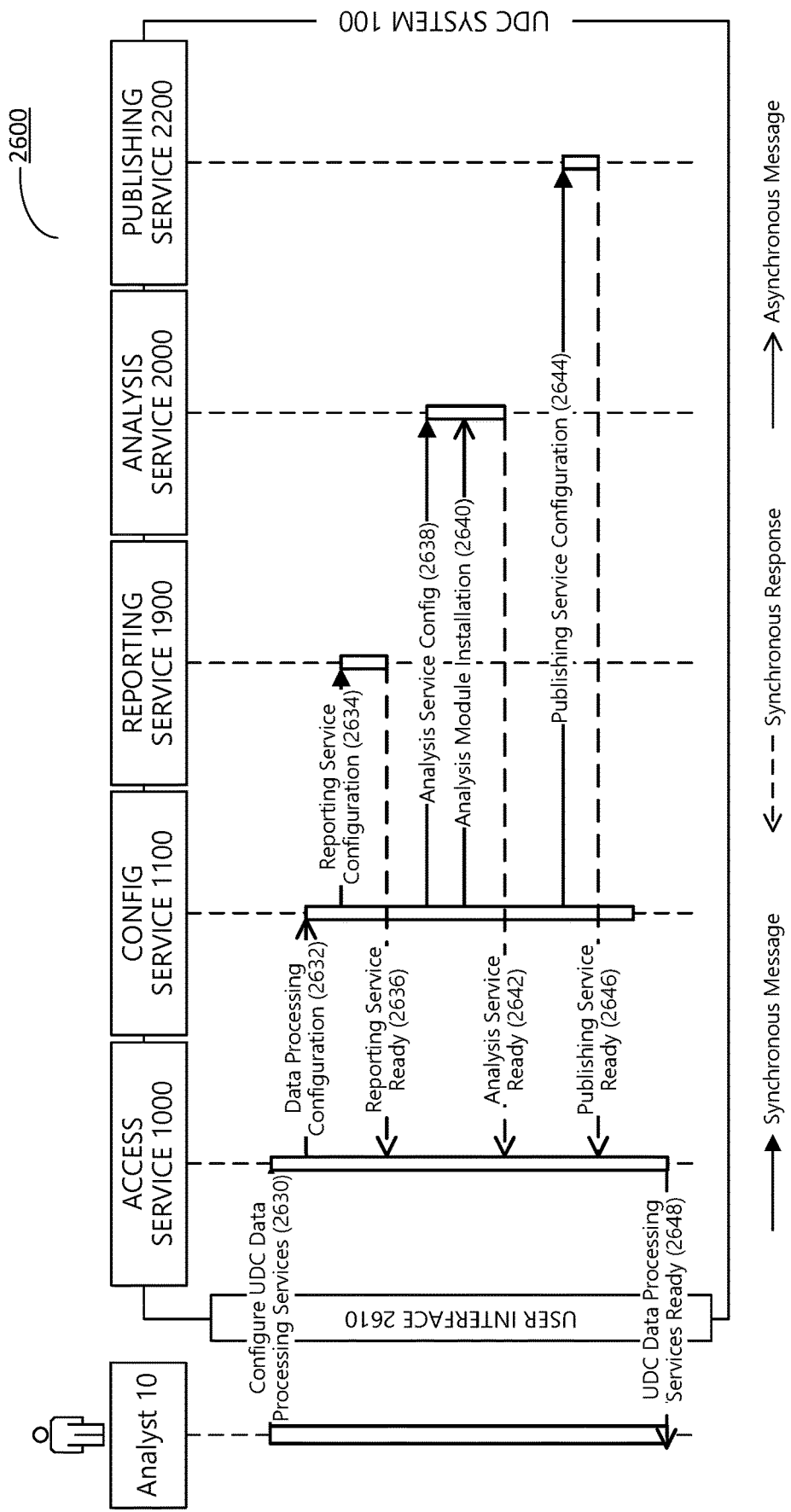
FIG. 26 is a sequence diagram illustrating an exemplary embodiment of UDC Data Processing Services configuration operating state of the UDC System in accordance with various aspects of the present disclosure.

The UDC Data Processing Services Configuration Operating State 2600 includes those UDC Service-level interactions associated with configuring the UDC System for data processing. FIG. 26 shows a sequence diagram for an exemplary embodiment of this operating state.

The Analyst or other user 10 initiates this operation by accessing the UDC System through the user interface 2610 to performs several configuration actions (2630), including any of: Importing an Analysis Module; selecting data processing options; assigning report formatting preferences; assigning report publishing preferences; and, assigning data transmission routes. The Access Service 1000 preferably facilitates all of these actions and dispatches the configuration files and further data customizations and settings to the Config Service 1100 for automated configuration of the UDC Client (2632). The Config Service 1100 receives these elements and installs the configured module(s) and configuration instructions (rendered from the data processing settings) as follows.

The Config Service 1100 dispatches configuration instructions to the Reporting Service 1900 (2634). The Reporting Service 1900 receives this event and, as discussed previously, modifies sub-processes and interfaces on the service according to the received configuration instructions. Once configuration is complete, the Reporting Service 1900 sends a notification event to the Access Service 1000 that the Reporting Service 1900 is ready for data processing (2636).

The Config Service 1100 also dispatches configuration instructions and an Analysis Module installation package (including installation instructions) to the Analysis Service 2000 (2638, 2640). The Analysis Service 2000 receives these events, installs the Analysis Module and modifies sub-processes and interfaces on the service according to the received configuration instructions. Once configuration is complete, the Analysis Service 2000 sends a notification event to the Access Service 1000 that the Analysis Service 2000 is ready for data processing (2642).

The Config Service 1100 also dispatches configuration instructions to the Publishing Service 2200 (2644). The Publishing Service 2200 receives this event and modifies sub-processes and interfaces on the service according to the received configuration instructions. Once configuration is complete, the Publishing Service 2200 sends a notification event to the Access Service 1000, that the Publishing Service 2200 is ready for data processing (2646).

Finally, the Access Service 1000 notifies the Analyst or other user 10 (via the user interface 2610) that the UDC Data Processing Services configuration operation 2600 is complete and services are ready for data processing (2648).

UDC Streamed Data Collection Operating State

Figure 27:
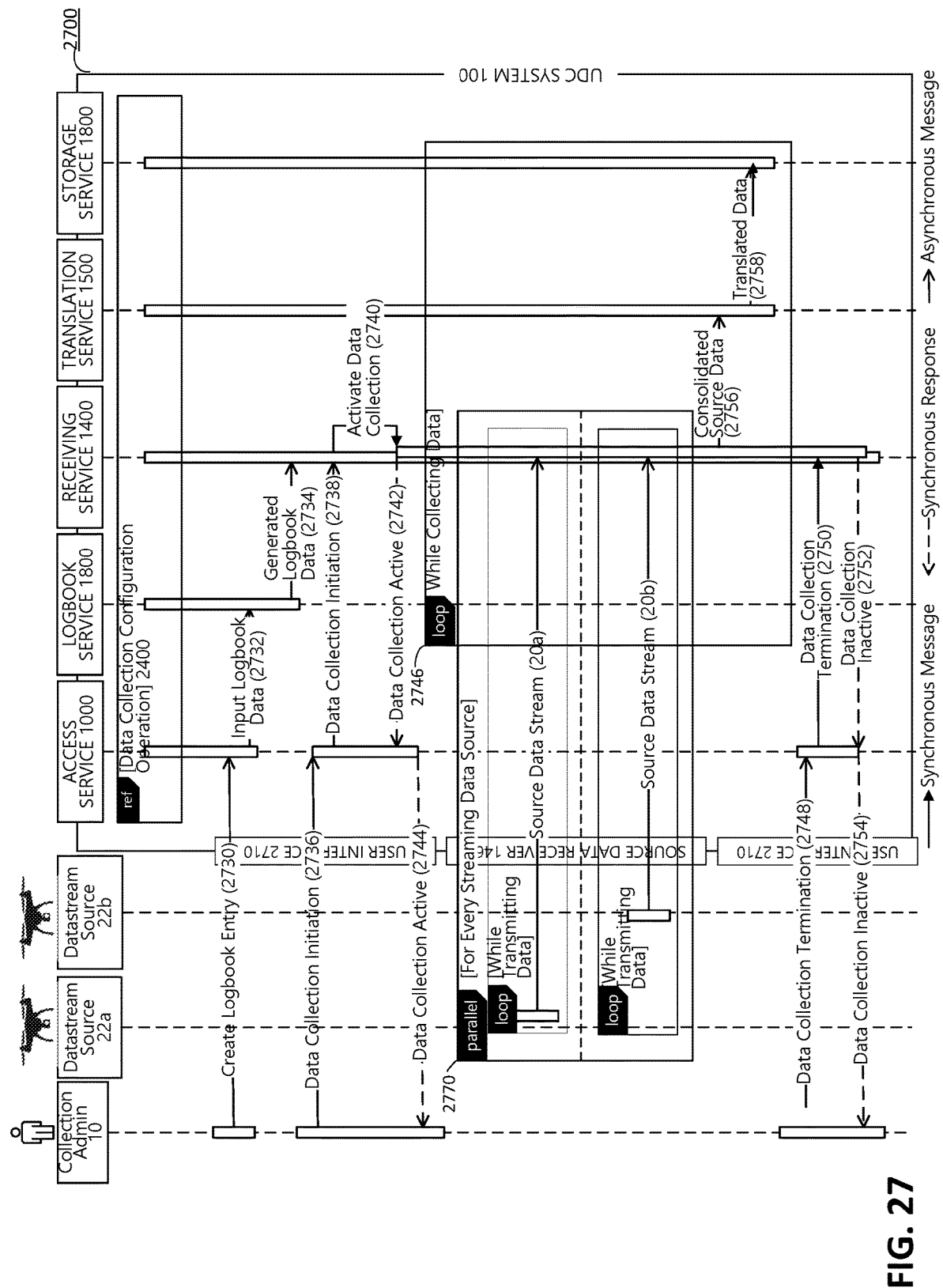
FIG. 27 is a sequence diagram illustrating an exemplary embodiment of a streamed data collection operating state of the UDC System in accordance with various aspects of the present disclosure.

The UDC Streamed Data Collection Operating State 2700 includes those UDC Service-level interactions associated with procuring data from any streaming data source (e.g., live UA operations 22a, 22b). FIG. 27 shows a sequence diagram for an exemplary embodiment of this operating state.

The Collection Administrator or other user 10 initiates this operation at by accessing the UDC System through the user interface 2710 to perform several configuration actions, including any of: Inputting any logbook data (2730); activating data collection (2736); and, deactivating data collection (e.g., to signify collection is complete)(2748). The Access Service 1000 preferably facilitates all of these actions by directing the user 10 to the Logbook Service 1200 (for any logbook data entry) and dispatching service requests to the Receiving Service 1400 for initial data collection activation and later deactivation.

More specifically, the Access Service 1000 redirects the Collection Administrator or other user 10 to the Logbook Service 1200, where the user 10 manually inputs the required Logbook entry information (2732). The Logbook Service 1200 generates logbook data from the user provided input and then dispatches it to the Receiving Service 1400 for consolidation with the streamed data (2734). As discussed previously, since entry of logbook data is not required in all contexts of use, this operation is optional.

The Access Service 1000 also generates and dispatches a service request to the Receiving Service 1400 (2738) in response to the user activation of streamed data collection (2736). The Receiving Service 1400 receives the request, initiates collection from any connected streaming data source (2740), and sends a notification to the Access Service 1000 that data collection is active (2742). Access Service 1000 transmits this notification to the Collection Administrator or other user 10 via the user interface 2710 (2744). All streamed data is received, time stamped, consolidated (with logbook data, if any), and dispatched for translation, while data collection remains active (2770).

The Translation Service 1500 receives the source data (e.g., 22a, 22b) dispatched from the Receiving Service 1400 (2756) and continually converts, validates, and dispatches the translated data (as UDC data) to the Storage Service 1800 (2758) for storage while data collection remains active (2746). UDC data is received, validated, and deposited into storage by Storage Service 1800 also while data collection remains active (2746).

Once data collection is complete (as preferably determined by the user 10), the user 10 generates a service request for collection deactivation through the Access Service 1000 (2748), which will send that system event to the Receiving Service 1400 for data collection termination (2750).

The Receiving Service 1400 acknowledges receipt of that request to the Access Service 1000 (2752). After data collection has terminated, the Access Service 1000 notifies the Collection Administrator or other user 10 via the user interface 2710 that the UDC Streamed Data Collection operation 2700 is complete and streamed data collection is inactive (2754).

UDC Batched Data Collection Operating State

Figure 28:
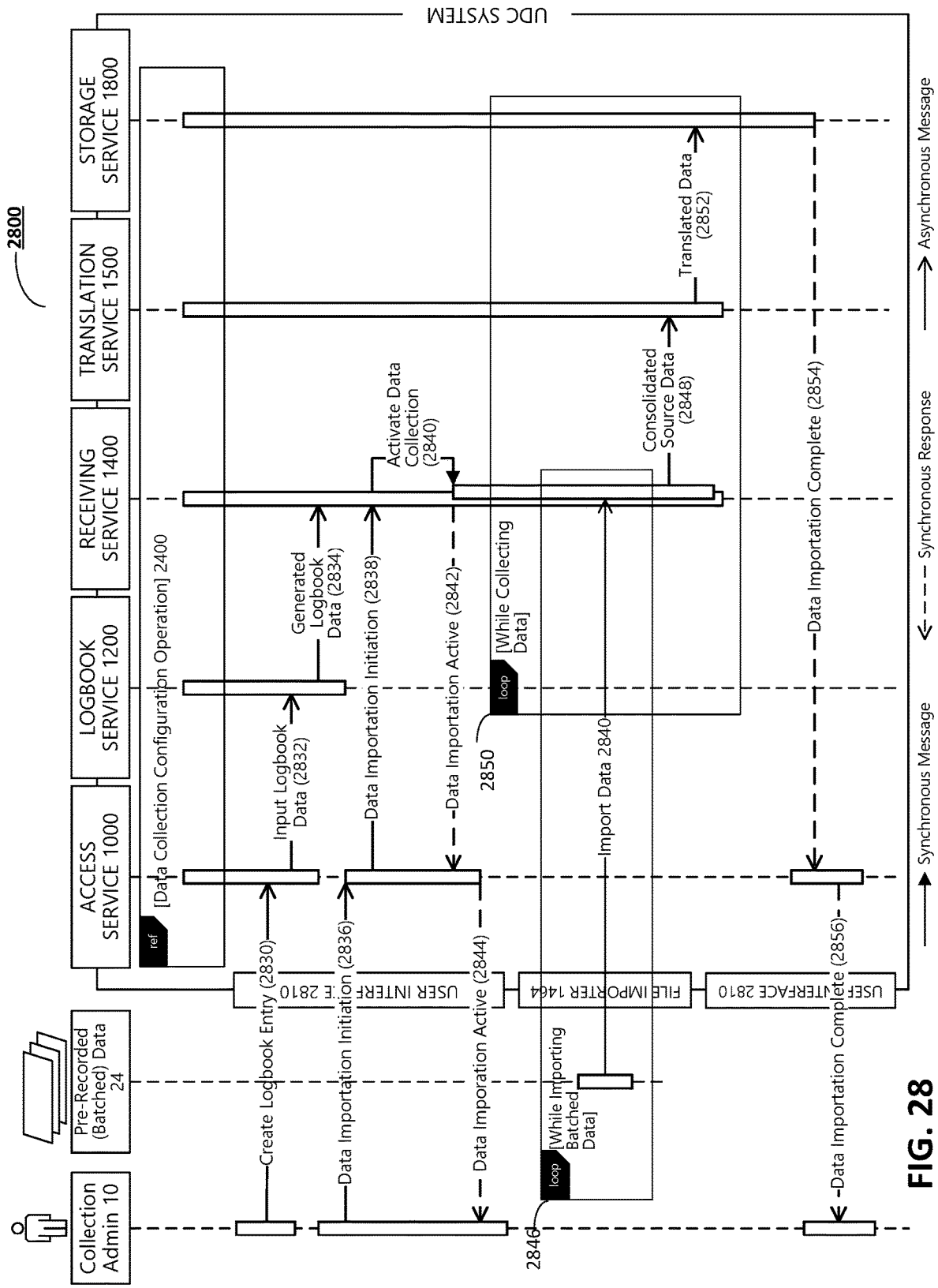
FIG. 28 is a sequence diagram illustrating an exemplary embodiment of a batched data collection operating state of the UDC System in accordance with various aspects of the present disclosure.

The UDC Batched Data Collection Operating State 2800 includes those UDC Service-level interactions associated with procuring data from any batched data source (e.g., a pre-recorded data file 24). FIG. 28 shows a sequence diagram for an exemplary embodiment of this operating state.

The Collection Administrator or other user 10 initiates this operation by accessing the UDC System through the user interface 2810 to perform several configuration actions, including inputting logbook data (2830) and activating data importation (2836). The Access Service 1000 preferably facilitates these actions by directing the Collection Administrator or other user 10 to the Logbook Service 1200 (for logbook data entry) and dispatching service requests to the Receiving Service 1400 for data import activation and later completion.

More specifically, the Access Service 1000 redirects the Collection Administrator or other user 10 to the Logbook Service 1200, where the user manually inputs the required Logbook entry information (2832). The Logbook Service 1200 generates logbook data from the provided user input and dispatches it to the Receiving Service 1400 for consolidation with the batched data (2834). As discussed previously, this operation is optional as logbook data may not be required for every context of use.

The Access Service 1000 also generates and dispatches a service request event (2838) to the Receiving Service 1400 in response to user activation of batched data collection. The Receiving Service 1400 receives the request, initiates importation of any batched data (2840) and sends a notification to the Access Service 1000 that data importation is active (2842), which in turn sends a similar notification to the Collection Administrator or other user 10 through user interface 2810 (2844). All batched data is received, time stamped, consolidated (with logbook data, if any) and dispatched for translation while data importation remains active (2846).

The Translation Service 1500 receives the source data (e.g., pre-recorded data file 24) from the Receiving Service 1400 (2848) and converts, validates, and dispatches the translated data (as UDC data) to the Storage Service 1800 (2852) for storage while data collection remains active (2850). The UDC data is received, validated, and deposited into storage by Storage Service 1800 also while data collection remains active (2850).

Once all UDC data is stored, the Storage Service 1800 notifies the Access Service 1000 that data importation is complete (2854). After data importation is complete (which preferably occurs automatically), the Access Service 1000 notifies the Collection Administrator or other user 10 via the user interface 2810 that the UDC Batched Data Collection Operating State 2800 is complete and batched data importation has finished (2856).

UDC Stored Data Recollection Operating State

Figure 29:
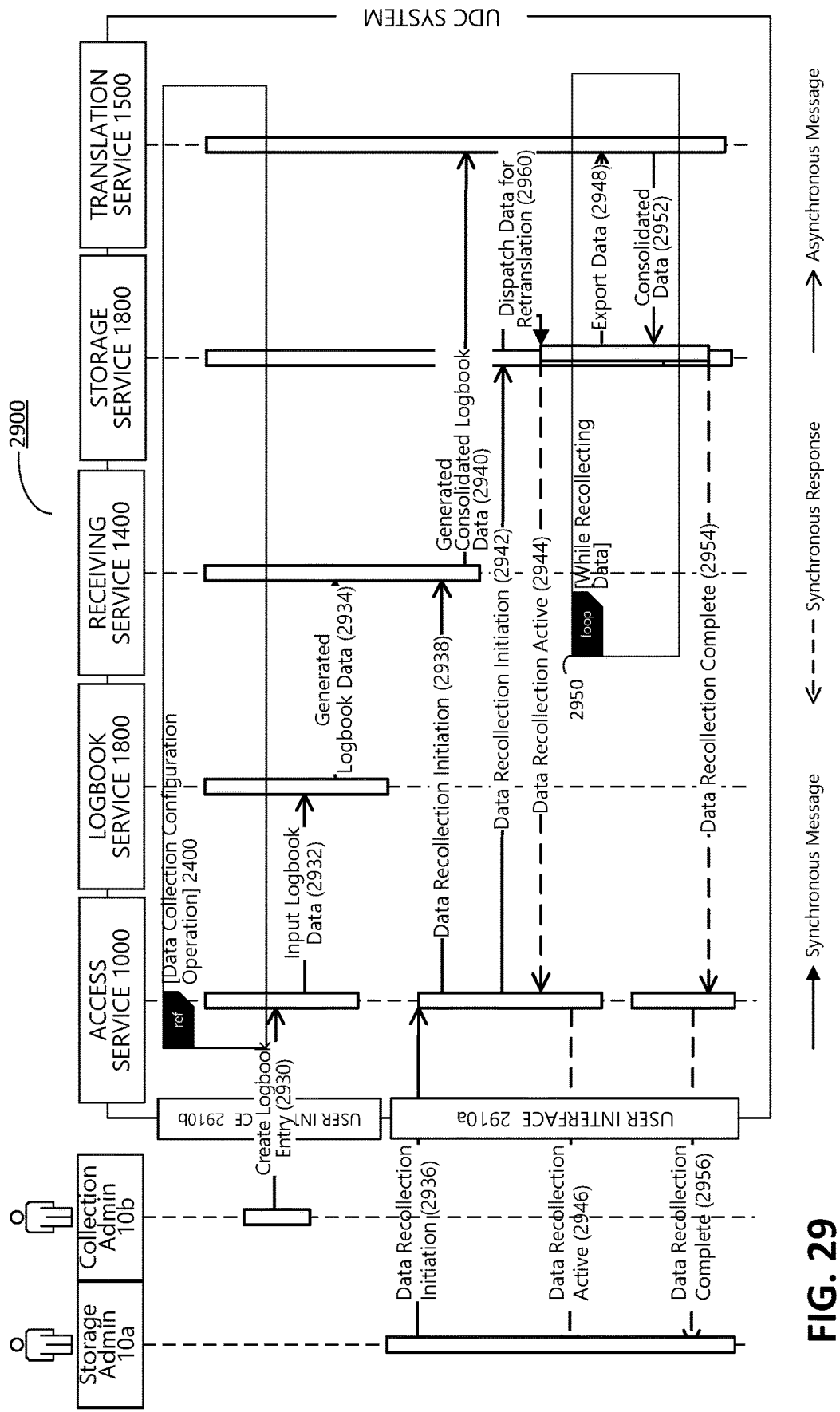
FIG. 29 is a is a sequence diagram illustrating an exemplary embodiment of a stored data recollection operating state of the UDC System in accordance with various aspects of the present disclosure.

The UDC Stored Data Recollection Operating State 2900 includes those UDC Service-level interactions associated with recollecting (i.e., retranslating) data previously deposited into storage. FIG. 29 shows a sequence diagram for an exemplary embodiment of this operating state.

The Collection and Storage Administrators (10b, 10a) or other user initiates this operation by accessing the UDC System through the user interface 2910a, 2910b to perform several actions, including inputting logbook data (2930) and activating data recollection (2936). The Access Service 1000 facilitates both actions by directing the Collection Administrator 10b or other user to the Logbook Service 1200 for logbook data entry and dispatching service requests to the Receiving and Storage Services (1400, 1800) for data recollection activation. (As with the other operating states, it will be appreciated that while the Collection and Storage Administrators are shown in FIG. 29 as separate users, the roles and responsibilities may be combined. Alternately the roles and responsibilities may be effected across multiple users).

More specifically, the Access Service 1000 redirects the Collection Administrator 10b or other user to the Logbook Service 1200, where the Collection Administrator 10b or other user manually inputs the required Logbook entry information (2932). The Logbook Service 1200 generates logbook data from the provided user input and dispatches it to the Receiving Service 1400 (2934). As discussed previously, this operation is optional as logbook data may not be required for every context of use.

The Access Service 1000 also generates and dispatches a service request event to the Receiving Service 1400 (2938) in response to the user activation of data recollection. The Receiving Service 1400 receives the data recollection request, initiates the receipt of recollected data and/or any generated logbook data (from previous step 2934), consolidates the recollected data and/or any generated logbook data, and then dispatches the consolidated (i.e., received and recollected) logbook data for translation to the Translation Service 1500 (2940).

The Access Service 1000 also generates and dispatches another service request event to the Storage Service 1800 (2942) in response to the user activation of data recollection. The Storage Service 1800 receives the request, and initiates the exportation of stored data for recollection (i.e., retranslation)(2960) to the Translation Service 1500 (2948). The Storage Service 1800 also sends a notification to the Access Service 1000 that data recollection is active (2944) which, in turn sends a similar notification to the Storage Administrator 10a or other user via user interface 2910a (2946). Stored data is then retrieved from storage, packaged, and dispatched to the Translation Service 1500, while data recollection remains active (2950).

The Translation Service 1500 receives the exported data from the Storage Service 1800 and initiates retranslation of the exported data by converting and validating the data, and dispatches the retranslated data back to the Storage Service 1800 (2952) all while data collection remains active (2950).

The Storage Service 1800 receives, validates, and deposits the retranslated UDC data received from the Translation Service 1500 while data recollection remains active (2950). Once all UDC data is stored, the Storage Service 1800 will notify the Access Service 1000 that data recollection is complete (2954). After data recollection is complete, the Access Service 1000 notifies the Storage Administrator 10a or other user via the user interface 2910a that the UDC Stored Data Recollection Operating State 2900 operation is complete and batched data importation has finished (2956).

UDC Stored Data Request and Retrieval Operating State

Figure 30:
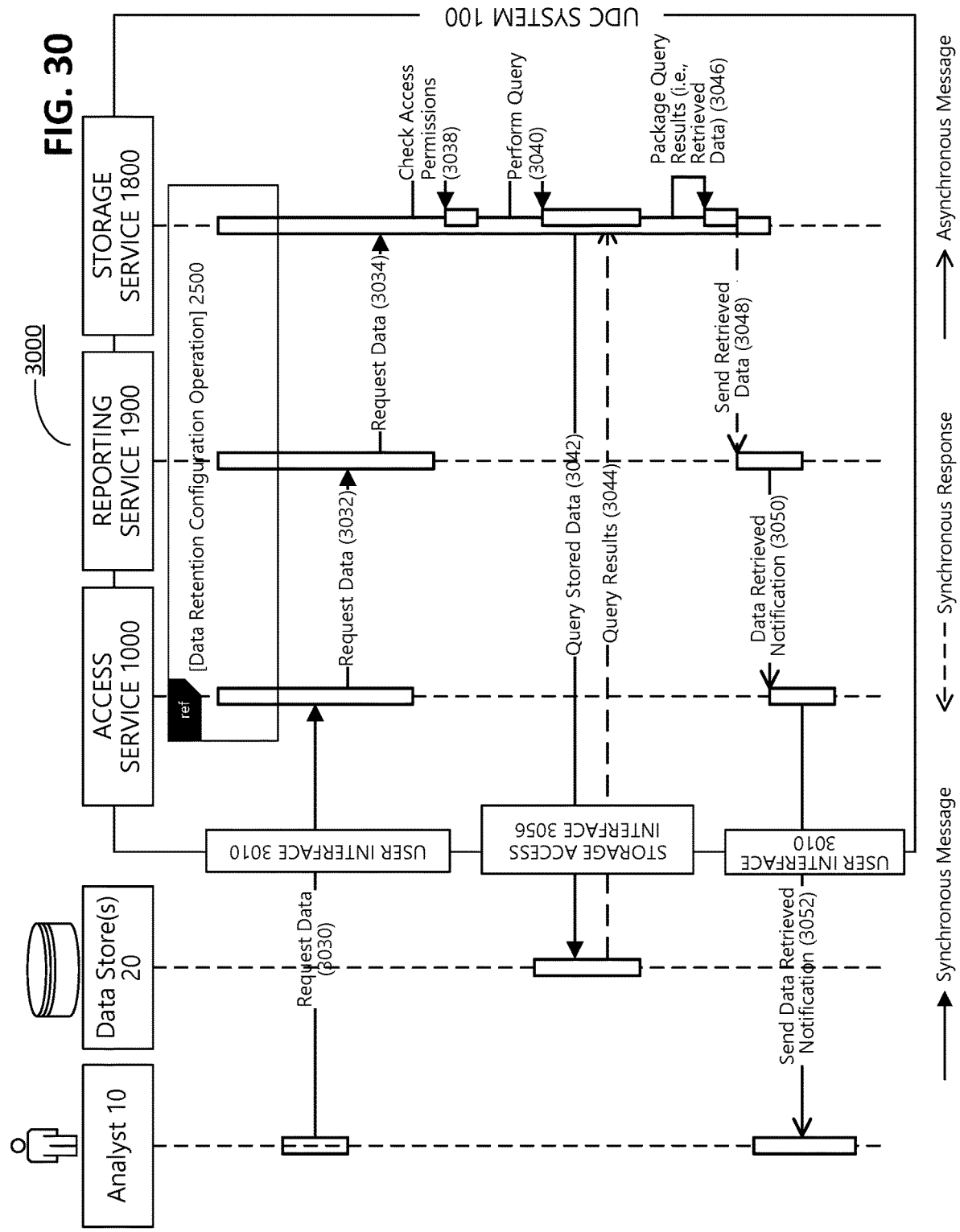
FIG. 30 is a sequence diagram illustrating an exemplary embodiment of a stored data request and retrieval operating state of the UDC System in accordance with various aspects of the present disclosure.

The UDC Stored Data Request and Retrieval Operating State 3000 includes those UDC Service-level interactions associated with exporting data from storage. FIG. 30 shows a sequence diagram for an exemplary embodiment of this operating state.

The Analyst 10 or other user initiates this operation by accessing the UDC System 100 through the user interface 3010 to request data (3030). The Access Service 1000 then facilitates this action by dispatching a service request to the Reporting Service 1900 for data querying and retrieval.

More specifically, the Access Service 1000 generates and dispatches a service request to the Reporting Service 1900 (3032) in response to the received user data request. The Reporting Service 1900 receives the request and generates a data query that is dispatched (3034) to the Storage Service 1800 for search and retrieval of data from storage.

After the Storage Service 1800 receives the data query, it verifies that the requesting user 10 has permission to access the storage 20 (3038). If permission is verified, the stored data is queried (3040), retrieved (if the queried data exists within the storage devices 20)(3042, 3044), packaged (3046), and then dispatched back to the Reporting Service 1900 (3048). After data exportation is complete (which preferably occurs automatically), the Reporting Service 1900 notifies the Access Service 1000, which in turn notifies the Analyst 10 or other user (via the user interface 3010) that the UDC Stored Data Request and Retrieval Operating State 3000 is complete and data retrieval is finished (3052).

UDC Data Analysis Operating State

Figure 31:
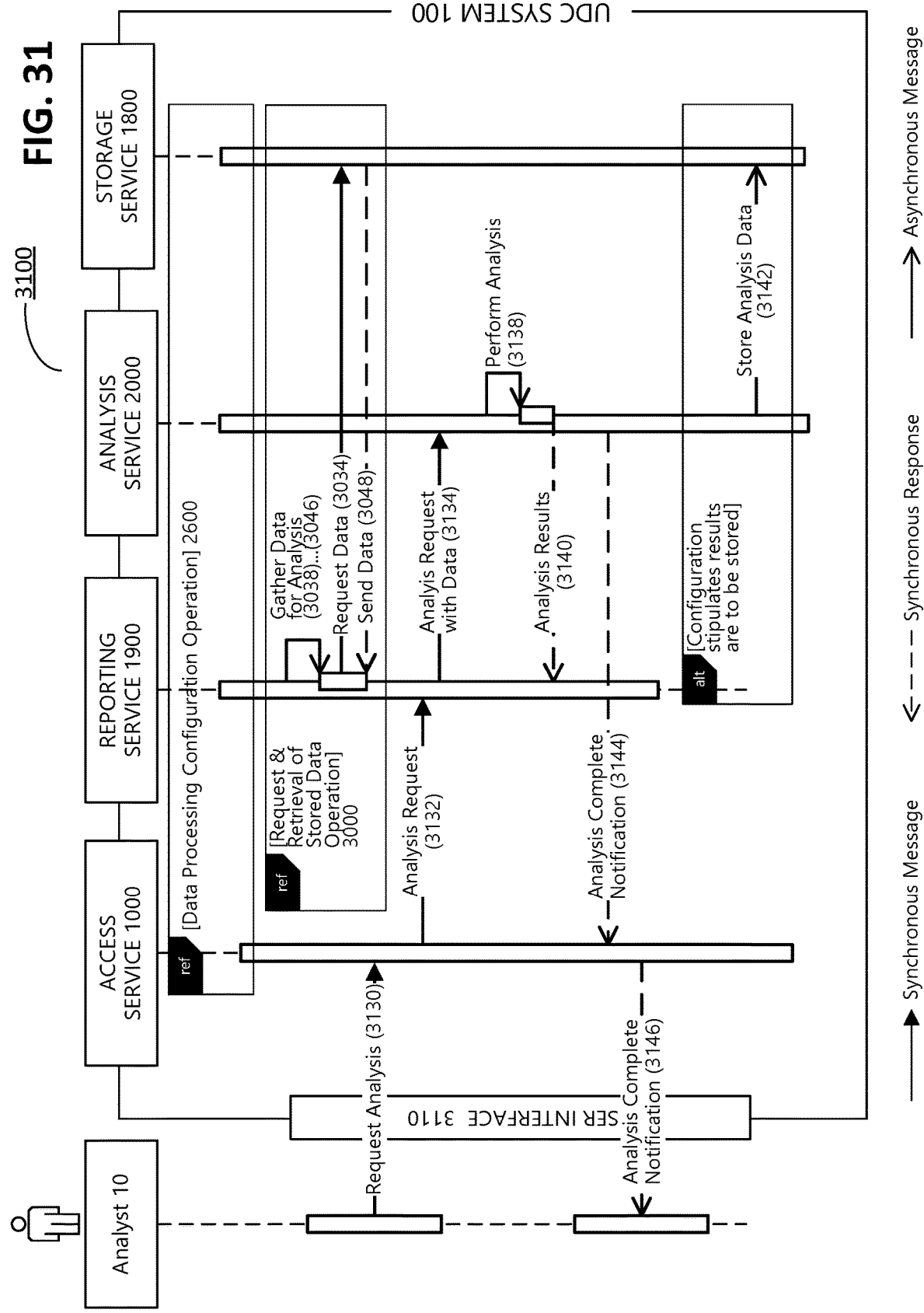
FIG. 31 is a sequence diagram illustrating an exemplary embodiment of a data analysis operating state of the UDC System in accordance with various aspects of the present disclosure.

The UDC Data Analysis Operating State 3100 includes those UDC Service-level interactions associated with analyzing data that has been retrieved from storage. FIG. 31 shows a sequence diagram for an exemplary embodiment of this operating state.

The Analyst 10 or other user initiates this operation by accessing the UDC System 100 through the user interface 3110 to request analysis (3130). The Access Service 1000 then facilitates this action by dispatching a service request to the Reporting Service 1900 for data aggregation, analysis, and storage.

More specifically, the Access Service 1000 generates and dispatches a service request event to the Reporting Service 1900 (3132) in response to the user analysis request. The Reporting Service 1900 receives the request and generates an analysis request, which is dispatched to the Analysis Service 2000 along with the UDC data to be analyzed (3134). It is preferably the Analysis Service 2000 that initiates the receipt of UDC data and analysis request from the Reporting Service 1900. (It will be appreciated that the UDC data to be analyzed has previously been requested and retrieved pursuant to system events occurring under the UDC Stored Data Request and Retrieval Operating State 3000 (FIG. 30))

Once the UDC data and the analysis request are received, the Analysis Service 2000 analyzes the UDC data (3138) using the Analysis Module (e.g., Analysis Module 2022) and then generates a set of analysis results that it dispatches back to the Reporting Service 1900 (3140).

After data analysis is complete (which preferably occurs automatically), the Analysis Service 2000 notifies the Access Service 1000 that data analysis is complete (3144) which in turn, notifies the Analyst 10 or other user via user interface 3110 that the UDC Data Analysis Operating State 3100 is complete and data is analyzed (3146).

Optionally, after data analysis is complete, if the UDC System 100 and the Analysis Service 2000 are pre-configured to deposit analysis results into storage, then the Analysis Service 2000 dispatches the Analysis Results 3142 to the Storage Service 1800 (3148). Analysis results are received, validated, and deposited into storage by the Storage Service 1800 (e.g., in accordance with UDC Data Retention Services Configuration Operating State 2500).

UDC Data Reporting Operating State

Figure 32:
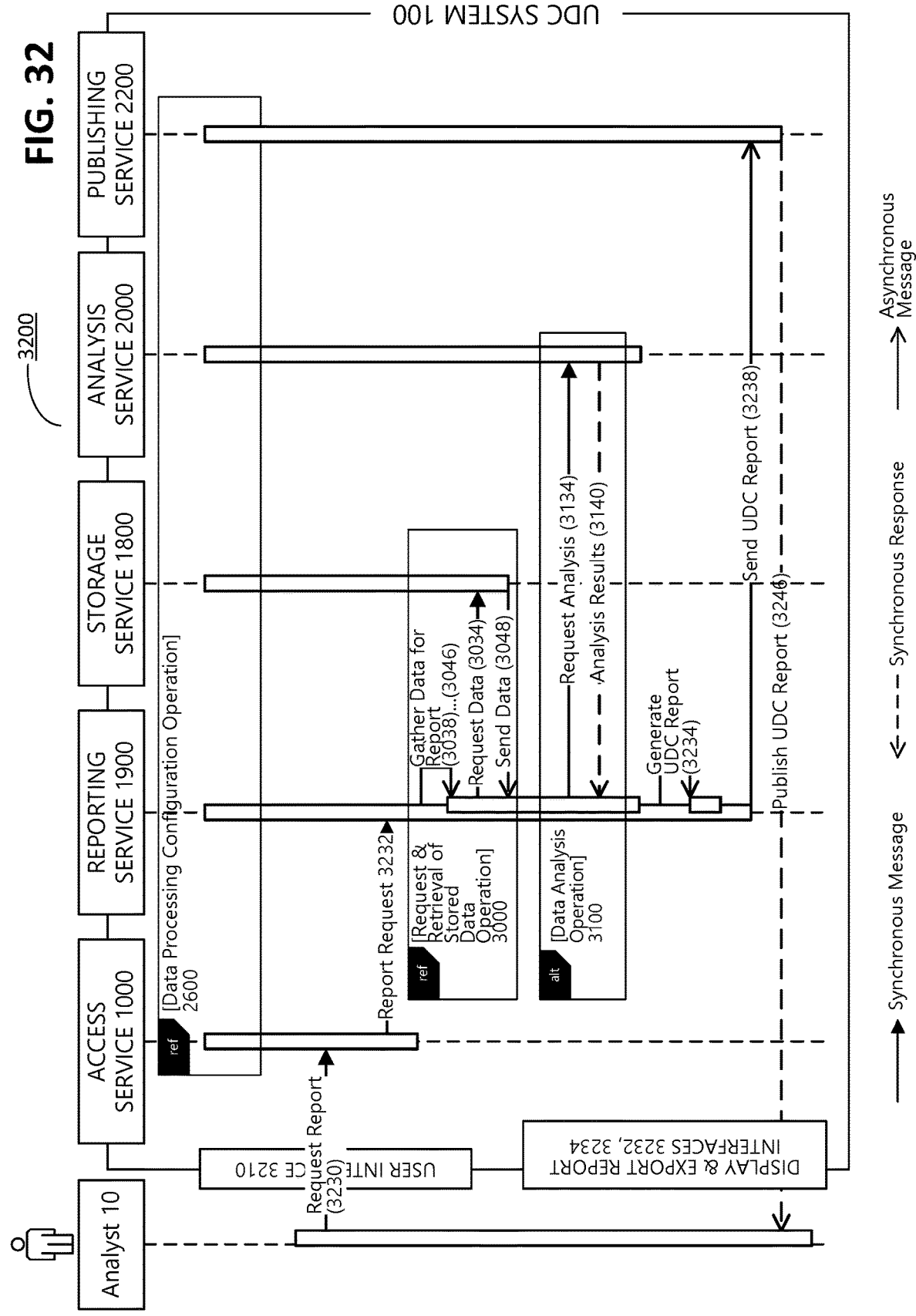
FIG. 32 is a sequence diagram illustrating an exemplary embodiment of a data reporting operating state of the UDC System in accordance with various aspects of the present disclosure.

The UDC Data Reporting Operating State 3200 includes those UDC Service-level interactions associated with providing a report of retrieved (and/or analyzed) data to the user. FIG. 32 shows a sequence diagram for an exemplary embodiment of this operating state.

An Analyst 10 or other user initiates this operation by accessing the UDC System 100 through a user interface 3210 to request a report (3230). The Access Service 1000 facilitates this action by dispatching a service request to the Reporting Service 1900 for report generation and publishing.

More specifically, in response to the user report request, the Access Service 1000 generates and dispatches a service request to the Reporting Service 1900 (3232). The Reporting Service 1900 receives the request and generates a report by aggregating, validating, and formatting retrieved UDC data (3234). (It will be appreciated that the UDC data to be analyzed has previously been requested and retrieved pursuant to system events occurring under the UDC Stored Data Request and Retrieval Operating State (e.g., the UDC Stored Data Request and Retrieval Operating State 3000 (FIG. 30) and optionally analyzed under the UDC Data Analysis Operating State (e.g., the UDC Data Analysis Operating State 3100 (FIG. 31)). Once the report is generated, the Reporting Service 1900 dispatches the UDC Report to the Publishing Service 2200 (3238).

The Publishing Service receives the UDC report from the Reporting Service 1900 and initiates its submission to user (3246). Once it receives the UDC Report, the Publishing Service 2200 produces that report to the Analyst 10 or other user by either visualizing or exporting the UDC Report via client interfaces 3242, 3244 (e.g., the UDC Report Visualizer 2242 and UDC Report Exporter 2244 Interfaces discussed above) (3246). The UDC Data Reporting Operating State 3200 is complete once the Analyst 10 or other user has received the UDC Report.

Exemplary UDC System Deployments

It will be appreciated from the foregoing that the UDC System 100 and its component UDC Device(s) 102, UDC Client(s) 104, and UDC Services 106 provide a highly flexible and adaptive platform for the collection, storage, and processing of data from UAS so that it is consistently formatted, evenly stored, and wholly reliable. This flexibility allows the UDC System 100 to be configured and deployed in mixed environments, amongst diverse groups, for diverse contexts of use and requirements, with total system scalability for consortiums ranging from small to large. The following set forth some exemplary environments and contexts of use in which UDC System 100 and its component UDC Device(s) 102, UDC Client(s) 104, and UDC Services 106 may be deployed. However, it will be understood that multitudes of other deployments and permutations may be envisioned, all of which are intended to be included in the scope of the concepts disclosed herein. Configuration and operation of the UDC System 100, UDC Device 102($s$), UDC Client(s) 104, and UDC Services 106 in each deployment is carried out in accordance with the features and aspects and various embodiments disclosed herein and equivalents thereof.

I. Flight Testing of UAS System

In a first exemplary deployment of UDC System 100 and its component UDC Device(s) 102, UDC Client(s) 104, and UDC Services 106, a private organization desires to test a UAS System. In this context of use, UDC System 100 and all users are associated with the private organization that is operating and testing the UAS.

Figure 33:
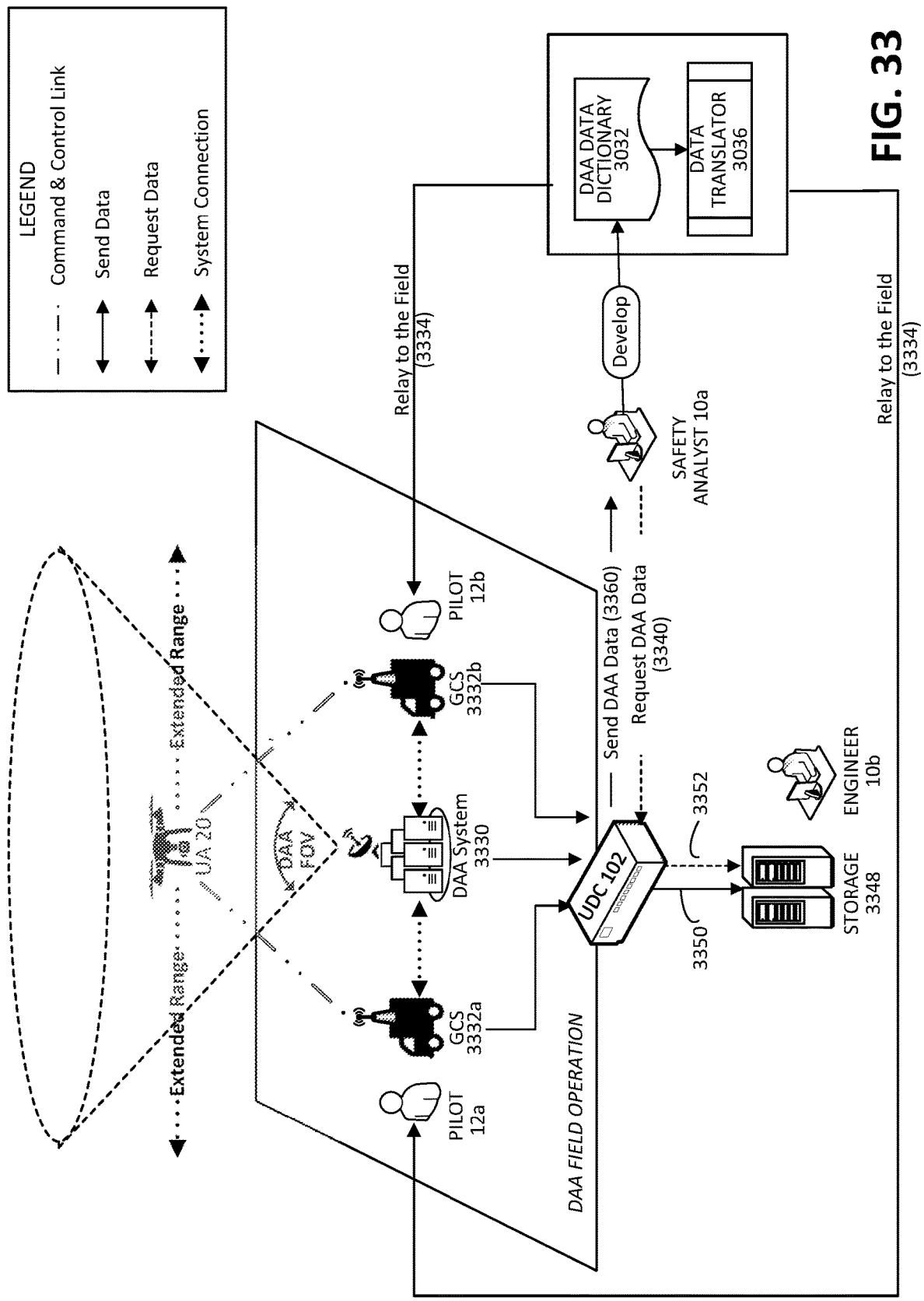
FIG. 33 is a diagram illustrating an exemplary environment in which the UDC System may be deployed in accordance with various aspects of the present disclosure.

For example, as seen in FIG. 33, the private organization desires to test a prototype Detect & Avoid (DAA) system 3330 designed to enable Beyond Visual Line of Sight (BVLOS) operations of a UA 20 at extended ranges in order to validate that the prototype DAA system 3330 mitigates the risk of a mid-air collision sufficiently enough to enable BLVOS flight. The organization believes that several hundred flight hours of data over a hundred or more distinct flight operations, each of five hour duration, is needed to complete that validation.

In this exemplary environment, a single UA 20 is flown over an extend range by "hand-off" from one Ground Control Station (GCS 3332*a*) to a secondary GCS (GCS 3332*b*), which is a common approach to extended range UAS operations. The DAA system 3330 has been implemented at the operational site to surveil the UA 20 and identify any proximate aircraft that pose a mid-air collision risk and is providing input to both GCS (3332*a*, 3332*b*). The UAS in this environment encompasses the UA 20 rotorcraft, two GCS 3332*a*, 3332*b*, and the single DAA system 3330.

As all UDC System activities and events occur within the bounds of one organization, a single UDC Device 102 and stand-alone UDC Client (e.g., UDC Client 404) may be used (although it will be appreciated that multiple UDC Devices 102 and/or a multi-client UDC (e.g., multi-client UDC 504) many be used instead). As discussed previously, the UDC System 100 and its component UDC Device 102(*s*), UDC Client(s) 104, and UDC Services 106 are first configured in accordance with the organization's needs and this context of use.

More specifically, the organization develops a DAA Data Dictionary 3032 that requires data that measures probability of detection, encounter rate, loss of separation and false reporting, a DAA Data Translator 3036 that collects and permutes data according to collection requirements within the DAA Data Dictionary 3032, and also builds a Logbook Module and a DAA Performance Analysis Module (not shown but similar in construct and operation to those embodiments disclosed herein as well their equivalents). A Safety Analyst 10*a* or other user (who may be remotely located from the field operations or co-located therewith) transmits the DAA Data Dictionary 3032, DAA Data Translator 3036, and Logbook Module to the UA Pilots (12*a*, 12*b*) or other testing participants in the field (3334). The UA Pilots (12*a*, 12*b*) or other participants install the DAA Data Dictionary 3032, DAA Data Translator 3036, and Logbook Module on the UDC 102 and configure and prepare the UDC Device 102 to collect data from all data sources (i.e., from all of the components of the UAS being tested, including UA 20 rotorcraft, GCS 3332*a*, 3332*b*, and single DAA system 3330). The Safety Analyst 10*a* or other user also configures the UDC Device 102 to process retrieved data per the aforementioned data processing requirements and installs the DAA Performance Analysis Module on the UDC 102. An Engineer 10*b* or other user of the organization (who may be remotely located from the field operations or co-located therewith) configures the UDC Device 102 to allow the import of collected data into, and the export of collected data from, storage 3348 (3350). The UDC System 100 is now configured for use.

With the UDC System 100 configured, flight operations may now proceed. The required several hundred flight hours of data will be collected over a series of a hundred flight operations within restricted airspace. For each flight operation, the UA Pilots (12*a*, 12*b*) or other participants input basic logbook data (e.g., date and location) into the UDC Device 102 and then connect GCS 3332*a* and 3332*b* as well as DAA system 3330 to the UDC Device 102. (As the DAA system 3330 is connected to both GCS 3332*a* and 3332*b*, data collection only occurs for whichever GCS has control of the UA 20).

The UA 20 takes off and Pilot 12*a* initiates the collection of data through the UDC Device 102. At about half way through the flight, a handoff occurs where control of the UAS is switched from Pilot 12*a* to Pilot 12*b* located at the GCS 3332*b*. The Pilot 12*b* then initiates/continues the collection of data from his/her/their respective flight systems. UA 20 transmits all pertinent data to the UDC Device 102, which collects, translates, labels and consolidates data in real-time from the UAS (i.e., UA 20 rotorcraft, two GCS 3332*a*, 3332*b*, and the single DAA system 3330).

After UA 20 lands and the flight operations are complete, Pilot 12*b* terminates the collection of data within the UDC Device 102. UDC Device 102 then performs a validation check on all collected data to confirm it has met the minimum requirements within the DAA Data Dictionary 3032. If the data for a flight operation is validated, UDC Device 102 transmits and deposits the validated data as collected data in storage 3348 (3352).

The foregoing steps of pilot-initiation of data collection through data validation and storage are conducted separately for each of the flight operations (e.g., for one hundred UA 20 flights, the process will be conducted one hundred times). Once all of the hours of data are collected, validated, and in storage, the data is ready for analysis and reporting.

The Safety Specialist 10*a* or other user initiates the processing of data including sending a data request to the UDC Device 102 (3340). The UDC Device 102 receives the request and generates a data query to access storage 3348 (3352), searches though the retained data, and identifies the requested flight-hours of data.

UDC Device 102 retrieves the requested flight-hours of data from storage 3348, packages it for transmission, and notifies the Safety Specialist 10*a* or other user that the requested flight-hours of data have been retrieved. The requested data is then transmitted (3360).

In addition to sending a data request to the UDC Device 102 (3340), the Safety Specialist 10*a* or other user may also send a request to analyze the results (not shown but similar in construct and operation to those embodiments disclosed herein as well their equivalents), preferably concomitant with sending a data request. The UDC Device 102 receives the analysis request, performs the performance analysis on the retrieved data, generates a set of results from the applied DAA performance analysis, relays the DAA performance analysis results for reporting, and notifies the Safety Specialist 10*a* or other user flight-hours of data have been analyzed.

If a report is desired, the Safety Specialist 10*a* or other user may also send a request to report the analyzed results (not shown but similar in construct and operation to those embodiments disclosed herein as well their equivalents). The UDC Device 102 receives the report request, generates a report from the analysis results, dispatches the report for publishing, and publishes the report to the Safety Specialist 10*a* or other user.

II. Waiver Safety-Case Development

In a second exemplary deployment of UDC System 100 and its component UDC Device(s) 102, UDC Client(s) 104, and UDC Services 106, a private organization desires to obtain a waiver for BVLOS operations. As discussed previously, in order to consider such a waiver request, the FAA currently requests that a comprehensive safety-case accompany the organization-operator's waiver application, which includes at least the following:

1). A petition for specific statutes to be waived. (In this context of use, the private operator is requesting that 14 CFR Part 107 (§ 107.31) and 14 CFR Part 107 (§ 107.33) be waived);
2). A Concept of Operations describing the proposed flight operation (e.g., systems, crew, procedures, etc.);
3). A clearly established set of hazards and/or risks to safely operating the UAS under the proposed Concept of Operations. Those hazards and risks should be quantified based on substantial and substantive data; and,
4). A set of safety mitigations, which have been validated to sufficiently mitigate the identified hazards and/or risks. That validation should be based on a safety risk management assessment using substantial and substantive data.

Thus, before granting an organization's request for BVLOS waiver, the FAA requests that the operator present a safety-case that validates that the organization's UAS can be safely operated in the requested airspace and that it sufficiently mitigates any hazards and/or risks. That is, the organization must demonstrate that its proposed UAS deployment has a low risk of a midair collision, and that demonstration must be based on substantial and substantive data.

An example of a mitigation plan includes "infrastructure-masking," which is a technique that exploits obstacle clearances by flying a UA within certain clearance thresholds to ensure a low risk of encountering another aircraft. The FAA may require, in this particular case, that the safety-case be based on at least a few hundred (e.g., 300) flight hours of substantive data in order to establish an average traffic density along the intended flight route and thus to be able assess the efficacy of the organization's infrastructure-masking mitigation plan. To build such a case and generate the needed data, the organization needs to perform a series of flight tests within restricted airspace. In addition to the live-flight testing, the company will also preferably need to separately collect traffic surveillance data from the intended area of operation. This separately collected traffic surveillance data may come from other surveillance systems and technologies (e.g., Primary Surveillance Radar (PSR) and Secondary Surveillance Radar (SSR) systems, or an Automatic Dependent Surveillance-Broadcast (ADS-B) transponder deployed in the area of operation and used to collect data over a designated period of time). The organization will then provide all of the data to the FAA for review that will, in turn, perform a safety analysis on the thus-generated data.

Figure 34:
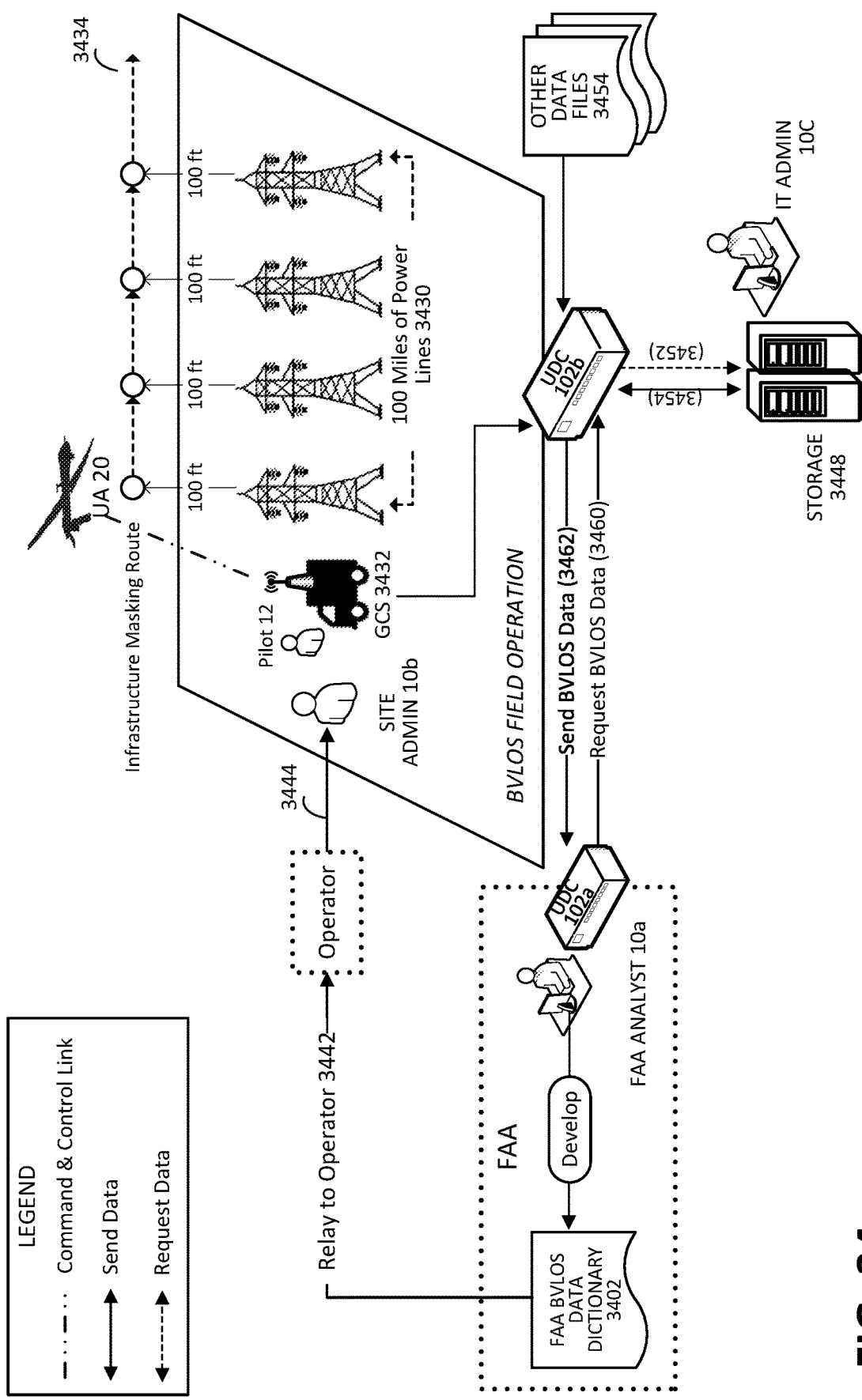
FIG. 34 is a diagram illustrating an additional exemplary environment in which the UDC System may be deployed in accordance with various aspects of the present disclosure.

Turning to FIG. 34, an energy company desires to conduct routine UAS flight operations in Class G Airspace in order to inspect 100 miles of its high-transmission power lines 3430. The company has chosen to implement "infrastructure-masking" to mitigate the risk of a mid-air collision. Thus, the company seeks to fly a single UA 20 directly along a fixed route 3434 directly above the 100-mile track of the power lines (i.e., BVLOS flight) for the purposes of infrastructure inspection. The UAS in this environment encompasses the fixed wing UA 20 and GCS 3342. All of the fielded systems (and subsystems), including GCS 3432 are connected to the organization's UDC Device 102*b*.

In this exemplary deployment, UDC System 100, its components, and its users are distributed between different parties (i.e., the energy company operating the UAS and seeking the waiver, and the FAA, which will be reviewing the waiver application). Thus, UDC System 100 preferably includes multiple UDC Devices 102 and a multi-client UDC implementation (e.g., multi-client UDC 504). The energy company's UDC Device 102*b* preferably includes at least one UDC client implementing UDC Data Collection and Data Retention Services (see, FIG. 7) and is configured to communicate with the FAA UDC Device's 102*a* including at least one UDC client (not shown but similar in construct and operation to those embodiments disclosed herein as well their equivalents) implementing UDC Data Processing Services (see, FIG. 7).

The UDC System 100 and its component UDC Device 102(*s*), UDC Client(s) 104, and UDC Services 106 are first configured in accordance with the FAA's needs and this context of use. On the FAA side, the FAA Analyst 10*a* or other user develops a BVLOS Data Dictionary 3402 that requires data that measures activities such as encounter rate, path-keeping, navigational integrity, and traffic density, and/or any other data that may be used to assess BVLOS flight operations, and then shares the BVLOS Data Dictionary 3402 with the energy organization (3442). The FAA Analyst 10*a* or other user also configures the FAA UDC 102*a* to process retrieved data per the aforementioned data processing requirements as well as installing an FAA-developed Safety-Case Analysis Module (not shown but similar in construct and operation to those embodiments disclosed herein as well their equivalents) on the FAA UDC Device 102*a*.

Upon receipt of the BVLOS Data Dictionary 3402 from the FAA, the energy company builds a Logbook Module and a Data Translator (not shown but similar in construct and operation to those embodiments disclosed herein as well their equivalents) that collect and permutes data according to the FAA's collection requirements established within the BVLOS Data Dictionary 3402. The energy company then relays the BVLOS Data Dictionary 3402, Logbook Module, and Data Translator to a Site Admin 10*b* or other user in the field (3444) who will install them on the energy company's UDC Device 102*b* and then configure and prepare the UDC Device 102*b* to collect data from all data sources (e.g., UA 20 and GCS 3432). An IT administrator 10*c* or other user associated with the energy company (who may be remote with the field locations or collocated therewith) configures the energy company's UDC 102*b* to allow the import of collected data to, and export from, storage 3448. (It will be appreciated that all of the foregoing configuration activities can occur concomitant with the day/time the flight operations are to be conducted or in advance thereof). The UDC System 100 is now configured for use.

With the UDC System 100 configured, flight operations may now proceed. The few hundred (e.g., 300) flight hours of data will be collected over a series (e.g., 50) flight operations within restricted airspace in order to obtain live flight testing data. The flight time of each operation will be a few (e.g., 6) hours.

For each separate flight operation, the energy company's Site Admin 10*b* or other user connects the GCS 3432 to the energy company's UDC Device 102*b* and inputs basic logbook data (e.g., date and location) into the UDC Device 102*b*. UA 20 takes-off and proceeds to fly the proposed infrastructure-masking route 3434 and the Site Admin 10*b* or other user initiates the collection of data through the energy company's UDC Device 102*b*, which collects, translates, labels, and consolidates data (real-time) from the UA 20. After each 6-hour flight time is complete, UA 20 lands and a flight operation is complete. The energy company's Site Admin 10*b* or other user terminates the collection of data within UDC Device 102*b*.

The energy company's UDC Device 102*b* performs a validation check on all collected data to confirm it has met the minimum requirements defined within the FAA BVLOS Data Dictionary 3402. If it does, UDC Device 102*b* transmits and deposits the validated data as collected data into the energy company's storage 3448 (3454).

The foregoing steps of data collection through data validation and storage are conducted separately for each of the flight operations (e.g., for fifty (50) UA 20 flights, the operating process will be conducted fifty times).

In addition to the live flight testing data, the operator separately collects several hundred (e.g., 300) hours of 'traffic' surveillance data from the intended area of operation and loads this into UDC Device 102*b*. More specifically, the energy company's Site Admin 10*b* or other user assembles and initiates the importing of the surveillance files into UDC Device 102*b*, which reads, translates, labels, and consolidates data therefrom. Once UDC Device 102*b* completes the importation of the surveillance files 3454, it notifies the Site Admin 10*b* that data importation is complete.

UDC Device 102*b* then performs a validation check on all surveillance data to confirm the data has met the minimum requirements within the FAA BVLOS Data Dictionary 3402. If the data is validated, energy company UDC Device 102*b* transmits and deposits the validated data as collected data in storage 3448 (3452). At this point, several hundred (e.g., 300) flight hours of pertinent data (both live & pre-recorded) exists within storage 3448 and is ready for analysis and reporting.

The FAA Analyst 10*a* or other user initiates the processing of data including sending a data request from the FAA UDC Device 102*a* to the energy company's UDC Device 102*b* (3460). The UDC Device 102*b* receives the request and generates a data query to access storage 3448, searches though the retained data, and identifies the requested flight-hours of data (3452).

UDC Device 102*b* retrieves the requested flight-hours of data from storage 3448 (3454), packages it for transmission, and notifies the FAA Analyst 10*a* or other user that the requested flight-hours of data have been retrieved. The requested data is then transmitted (3462).

In addition to sending a data request to the UDC Device 102*b* (3460), the FAA Analyst 10*a* or other user may also send a request to analyze the received results (not shown but similar in construct and operation to those embodiments disclosed herein as well their equivalents), preferably concomitant with sending a data request. The FAA UDC Device 102*a* receives the analysis request, performs a safety case analysis on the retrieved data, generates a set of results from the safety case analysis, relays the safety case analysis results for reporting, and notifies FAA Analyst 10*a* or other user flight-hours of data have been analyzed. The safety case analysis results are now ready for reporting If a report is desired, the FAA Analyst 10*a* or other user may also issue a request to report the analyzed results (not shown but similar in construct and operation to those embodiments disclosed herein as well their equivalents). The FAA UDC Device 102*a* receives the report request, generates a report from the analysis results, dispatches the report for publishing, and publishes the report to the FAA Analyst 10*a* or other user.

The aforementioned data, safety case analysis, and report may be used by the FAA to assess the energy company's infrastructure-masking mitigation plan. The data, safety case analysis, and report may validate that the company's infrastructure-masking plan sufficiently mitigates the risk of a midair collision and thus that the FAA issue a BVLOS waiver to the operator, or they may indicate that the infrastructure-masking plan is insufficient and thus that the BVLOS waiver request should be denied.

III. Compliance Risk Monitoring

In a third exemplary deployment of UDC System 100 and its component UDC Device(s) 102, UDC Client(s) 104, and UDC Services 106, after the Apr. 21, 2021 effective date authorizing Operations over People (OOvP), the FAA may still need to issue OOvP waivers to operators in the field, who are conducting flight operations over gatherings of people beyond what is permitted by regulation. A series of safety design requirements, maintenance standards, and safety procedures has been implemented for each to reduce the risk of a catastrophic collision with people on the ground and the FAA now desires to perform compliance risk monitoring in pursuit of assessing existing FAA governance in this area.

Compliance risk monitoring is an FAA assessment process that quantifies regulatory violations and their impact on safety and strategic initiatives and generally involves the following elements:

1). An appraisal of operator compliance with existing requirements, guidelines, and conditions issued within waivers and/or statutory regulations;

2). An appraisal of each compliant and non-compliant incident, including risk categorization for each incident and its effect on FAA business activities; and, 3). A safety assurance and SRM assessment for each risk category using quantitative data to establish likelihood and severity levels that indicate whether prescribed safety targets are achieved.

The outcome is either validation of operator compliance indicating a sufficient regulatory framework, or validation of operator non-compliance, indicating the need for stronger enforcement action or regulatory refinement.

In this exemplary embodiment, the FAA determines that in order to effectively implement OOvP compliance monitoring, it will require a few hundred hours (e.g., 250 hours) of data from every active OOvP operation over the past year so that the FAA can perform a compliance risk analysis on all of this data. Preferably those few hundred hours are obtained from at least one-hundred OOvP flight operations comprising at least one hour each.

As with the secondary embodiment, UDC System 100, its components, and its users are distributed between different parties (i.e., preferably all of the operators operating under OOvP waivers and the FAA, which will be performing the compliance risk monitoring). Thus, UDC System 100 preferably includes multiple UDC Devices 102 and a multi-client UDC implementation (e.g., multi-client UDC 504). Each of the OOvP Operators' Devices 102 preferably include at least one client implementing UDC Data Collection and Data Retention Services (see, FIG. 7) and is configured to communicate with FAA UDC Device 102 client preferably implementing UDC Data Processing Services (see, FIG. 7).

The UDC System 100 and its component UDC Device 102(*s*), UDC Client(s) 104, and UDC Services 106 are first configured in accordance with the FAA's needs and this context of use.

Figure 35:
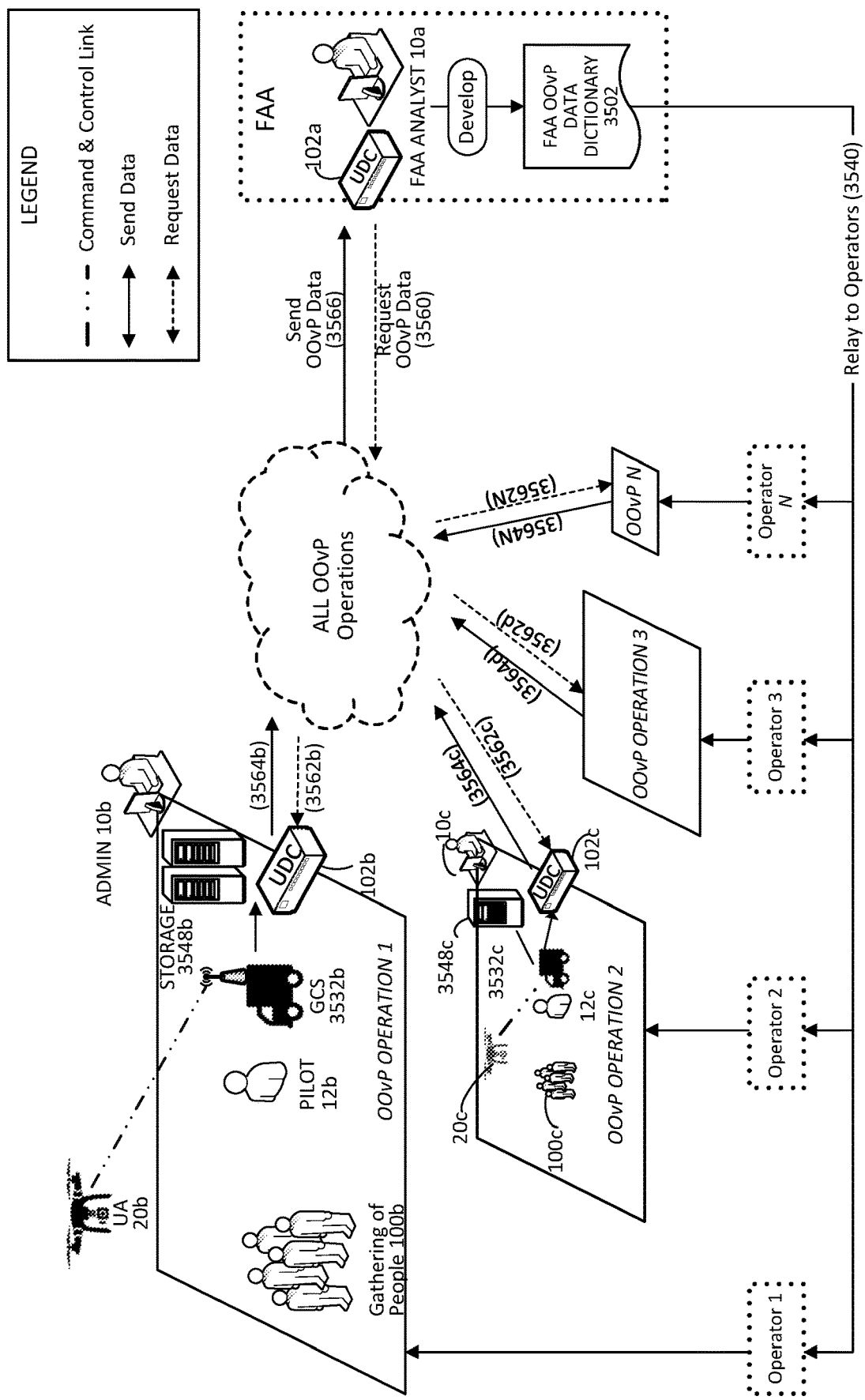
FIG. 35 is a diagram illustrating another exemplary environment in which the UDC System may be deployed in accordance with various aspects of the present disclosure; and, FIG. 36 is a diagram illustrating a further exemplary environment in which the UDC System may be deployed in accordance with various aspects of the present disclosure.

With reference to FIG. 35, on the FAA side, the FAA Analyst 10*a* or other user develops an OOvP Data Dictionary 3502 that requires data that measures compliance with design requirements, maintenance standards, and safety procedures, and/or any other data that may be used to assess compliance of OOvP flight operations, and then shares the OOvP Data Dictionary 3502 with all of the UAS operators (Operator 1 conducting OOvP Operation 1, Operator 2 conducting OOvP Operation 2, Operator 3 conducting OOvP Operation 3 . . . Operator N conducting OOvP Operation N) that have been granted an OOvP waiver (3540). The FAA Analyst 10*a* or other user also configures the FAA UDC 102*a* to process retrieved data per the aforementioned data processing requirements as well as installing an FAA-developed Risk Analysis Module (not shown but similar in construct and operation to those embodiments disclosed herein as well their equivalents) on the FAA UDC Device 102*a*.

Upon receipt of the OOvP Data Dictionary 3502 from the FAA, each of the OOvP UAS operators (Operator 1, Operator 2, Operator 3 . . . Operator N) builds a Logbook Module and a Data Translator (not shown but similar in construct and operation to those embodiments disclosed herein as well their equivalents) that collect and translates data according to the FAA's collection requirements established within the OOvP Data Dictionary 3502. Each UAS operator (Operator 1, Operator 2, Operator 3 . . . Operator N) relays the OOvP Data Dictionary, Data Translator, and Logbook Module to their respective UA Pilot (e.g., 12*b*, 12*c*) or other user in the field who will install them on the respective OOvP UAS operator's UDC Device 102 (i.e., UDC 102*b* for Operator 1, UDC Device 102*c* for Operator 2) and then configure and prepare its respective UDC Device 102 (e.g., 102*b*, 102*c*) to collect data from all data sources (e.g., UA 20*b* and GCS 3532*b* for Operator 1 and UA 20*c* and GCS 3532*c* for Operator 2). Site administrators (e.g., 10*b*, 10*c*) or other users for each UAS operator (Operator 1, Operator 2, Operator 3 . . . Operator N) (who may be remote with the field locations or collocated therewith) configure the respective UDC Device 102 (e.g., 102*b*, 102*c*) to allow the import of collected data to, and export from, storage (e.g., 3548*b*, 3548*c*). (It will be appreciated that all of the foregoing configuration activities can occur concomitant with the day/time the compliance monitoring is to be conducted or in advance thereof). The UDC System 100 is now configured for use.

With the UDC System 100 configured, flight operations may now proceed. For each separate flight operation, each OOvP UAS operator's Pilot (e.g., 12*b*, 12*c*) or other user connects the respective GCS (e.g., 3532*b*, 3532*c*) to the OOvP UAS operator's UDC Device (e.g., 102*b*, 102*c*) and inputs basic logbook data (e.g., date and location). The UA (e.g., 20*b*, 20*c*) takes off and proceeds and the Pilot (e.g., 12*b*, 12*c*) or other user initiates the collection of data through the OOvP UAS operator's UDC Device (e.g., 102*b*, 102*c*), which collects, translates, labels, and consolidates data (real-time) from the UA (e.g., 20*b*, 20*c*). After the flight time is complete, UA (e.g., 20*b*, 20*c*) lands and the flight operation is complete. The OOvP UAS operator's Pilot (e.g., 12*b*, 12*c*) or other user terminates the collection of data within the respective OOvP UAS operator's UDC Device (e.g., 102*b*, 102*c*).

The OOvP UAS operator's UDC Device (e.g., 102*b*, 102*c*) performs a validation check on all collected data to confirm it has met the minimum requirements defined within the FAA OOvP Data Dictionary 3502. If it does, the OOvP UAS operator's UDC Device (e.g., 102*b*, 102*c*) transmits and deposits the validated data as collected data in its respective storage (e.g., 3548*b*, 3548*c*)

The foregoing steps of data collection through data validation and storage are conducted separately for each of the flight operations (e.g., for one-hundred UA (e.g., 20*b*, 20*c*) flights, the operating process will be conducted one-hundred times). Once all of these hours of data are collected, validated, and in storage, the data is ready for analysis and reporting.

The FAA Analyst 10*a* or other user initiates the processing of data including sending a data request from the FAA UDC Device 102*a* to each of the OOvP UAS operator's UDC Device (e.g., 102*b*, 102*c*) (3560). Each UDC Device (e.g., 102*b*, 102*c*) receives its respective request (3562*b*, 3562*c*, 3562*d* . . . 3562*n*) and generates a data query to access storage (e.g., 3548*b*, 3548*c*), searches though the retained data, and identifies the requested flight-hours of data.

Each OOvP UAS operator's UDC Device (e.g., 102*b*, 102*c*) retrieves the requested flight-hours of data from storage (e.g., 3548*b*, 3548*c*), packages it for transmission, and notifies the FAA Analyst 10*a* or other user that the requested flight-hours of data have been retrieved. The requested data is then transmitted (3564*b*, 3564*c*, 3564*d* . . . 3564*n*).

In addition to sending a data request to the OOvP UAS operators' UDC Devices (e.g., 102*b*, 102*c*), the FAA Analyst 10*a* or other user may also send a request to analyze the received results (not shown), preferably concomitant with sending a data request. The FAA UDC Device 102*a* receives the analysis request, performs a compliance risk analysis on the retrieved data, generates a set of results from the compliance risk analysis, relays the compliance risk analysis results for reporting, and notifies FAA Analyst 10*a* or other user flight-hours of data have been analyzed. The compliance risk analysis results are now ready for reporting.

If a report is desired, the FAA Analyst 10*a* or other user may also send a request to report the analyzed results (not shown but similar in construct and operation to those embodiments disclosed herein as well their equivalents). The FAA UDC Device 102*a* receives the report request, generates a report from the compliance risk analysis results, dispatches the report for publishing, and publishes the report to the FAA Analyst 10*a* or other user.

The aforementioned data, compliance risk analysis, and report may be used by the FAA to assess each operator's compliance with existing requirements, guidelines, and conditions issued within waivers and/or statutory regulations but also a holistic view as to whether the current FAA regulatory framework is effective or whether stronger enforcement actions and/or further regulatory refinements are needed.

IV. Forecasting of UAS Operations

In a final exemplary deployment of UDC System 100 and its component UDC Device(s) 102, UDC Client(s) 104, and UDC Services 106, the FAA desires to assess the temporal demand and density of UAS operations over the next several (e.g. five) years. In particular, the FAA desires to determine that demand and density in the UAS Night Operations category as such night operations were permitted starting on Apr. 21, 2021. As a precursor to this assessment, the FAA may postulate that the peak operating hours for UAS Night Operations during these next several years will be during civil twilight (i.e., from pre-sunrise through to post-sunset)

In this exemplary embodiment, the FAA ascertains that this data may already exist (i.e., no live data is required) and thus it can conduct a forecast from data currently available from several hundred (e.g., 500) UAS operators. As with the second and third embodiments, UDC System 100, its components, and its users are distributed between different parties (i.e., all of the operators conducting night operations and the FAA, which will be performing the forecasting of operations). Thus, UDC System 100 preferably includes multiple UDC Devices 102 and a multi-client UDC implementation (e.g., multi-client UDC 504). Each of the UAS Operators' Devices 102 preferably include at least one client implementing UDC Data Retention Services (see, FIG. 7) and is configured to communicate with at least one FAA UDC Device 102 client preferably implementing UDC Data Processing and Data Retention Services (see, FIG. 7).

As with the previous embodiments, the UDC System 100 and its component UDC Device 102(*s*), UDC Client(s) 104, and UDC Services 106 are first configured in accordance with the FAA's needs and this context of use.

Figure 36:
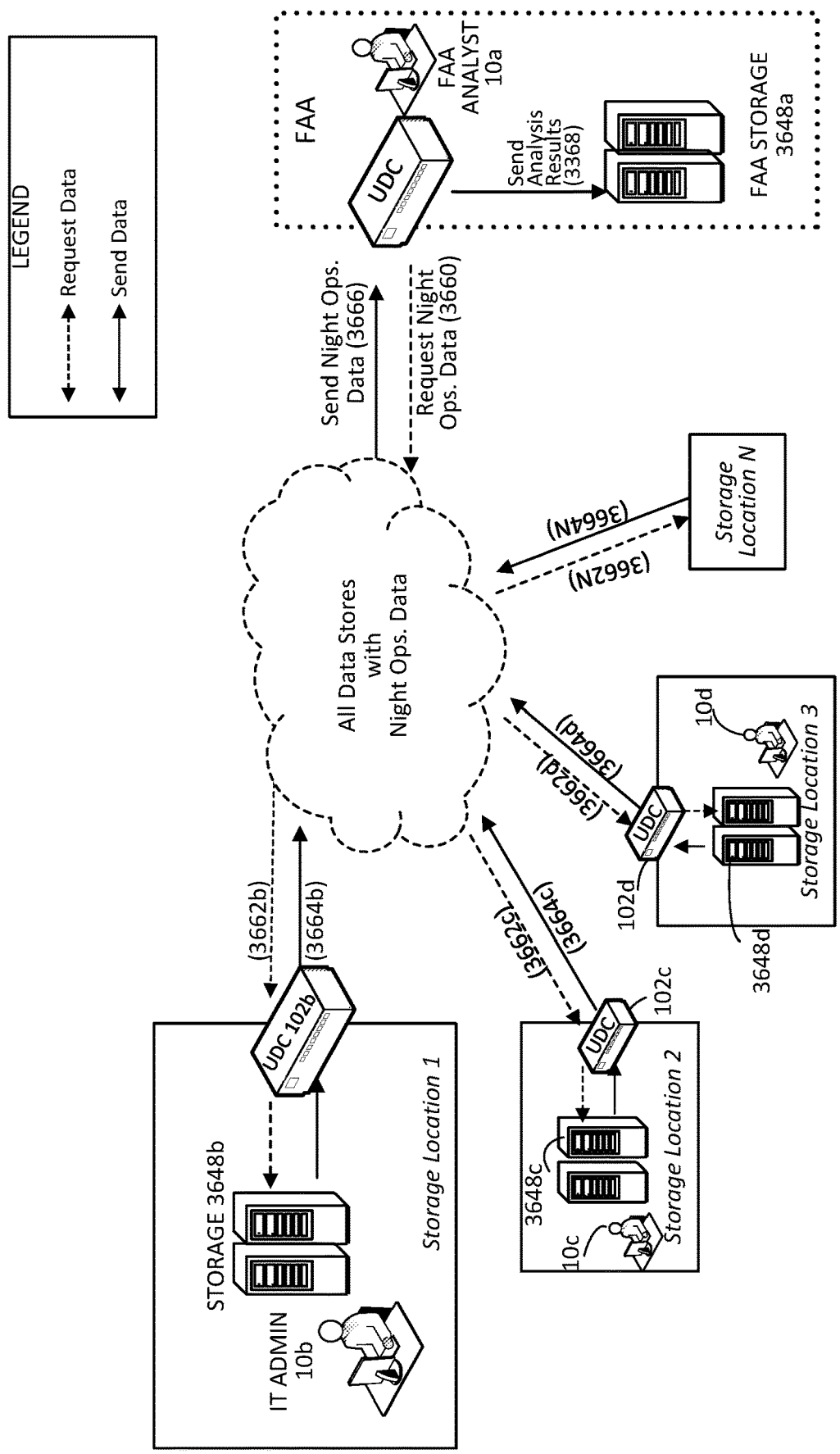

With reference to FIG. 36, on the FAA side, the FAA Analyst 10*a* or other user initiates the processing of data including sending a data request via FAA UDC Device 102*a* to each of the UAS Operator's UDC Device (e.g., 102*b*, 102*c*, 102*d*) (3660). Each UAS Operator's UDC Device (e.g., 102*b*, 102*c*, 102*d*) receives its respective request (e.g., 3662*b*, 3662*c*, 3662*d*) and generates a data query to access storage (e.g., 3648*b*, 3648*b*, 3648*d*), searches though the retained data, and identifies the requested flight-hours of data.

Each UAS Operator's UDC Device (e.g., 102*b*, 102*c*, 102*d*) retrieves the requested flight-hours of data from storage (e.g., 3648*b*, 3648*b*, 3648*d* . . . 3648*n*), packages it for transmission, and notifies the FAA Analyst 10*a* or other user that the requested flight-hours of data have been retrieved. The requested data is then transmitted (e.g., 3648*b*, 3648*b*, 3648*d* . . . 3648*n*).

In addition to sending a data request to the UAS Operators' UDC Devices (e.g., 102*b*, 102*c*, 102*d*), the FAA Analyst 10*a* or other user also sends a request to analyze the received data and generate a report therefrom (not shown but similar in construct and operation to those embodiments disclosed herein as well their equivalents), both preferably at the time the initial data request was sent.

The FAA UDC Device 102*a* receives the analysis request, performs a forecasting analysis on the data received from the UAS Operators' UDC Devices (e.g., 102*b*, 102*c*, 102*d*), and generates a set of results from the forecasting analysis. The FAA UDC Device 102*a* then preferably notifies the FAA Analyst 10*a* or other user that the forecasting analysis results have been analyzed and transfers the forecasting analysis results to FAA storage 3648*a* (3368) for subsequent reporting. As a report request was generated previously, the FAA UDC Device 102*a* generates a report from the forecasting analysis results, dispatches the report for publishing, and publishes the report to the FAA Analyst 10*a* or other user.

Figure 37:
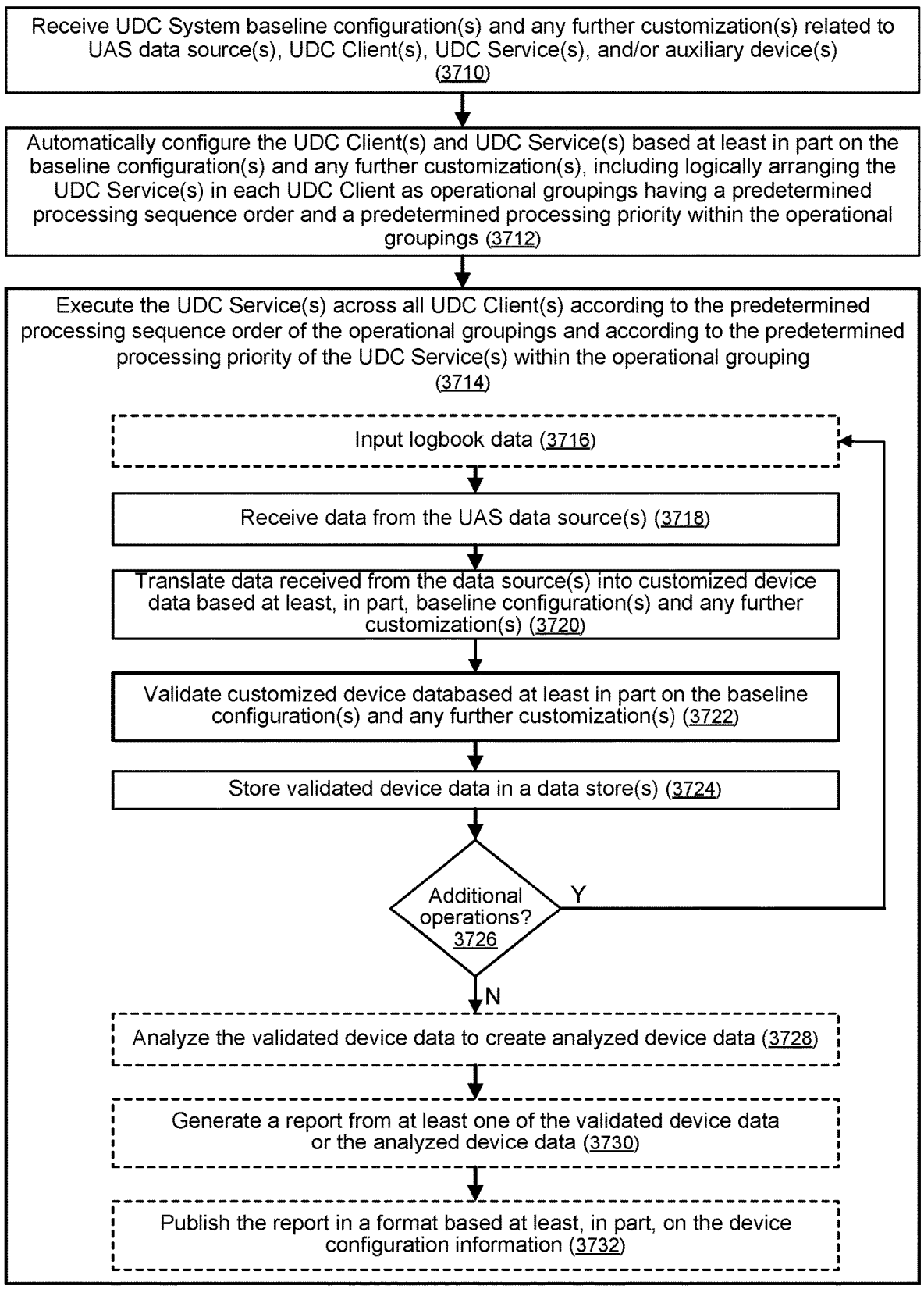
FIG. 37 is a flow chart illustrating an exemplary process for using the UDC System to collect and manage data related to unmanned aircraft systems (UAS) operations in accordance with various aspects of the present disclosure.

FIG. 37 is a flow chart of an exemplary process 3700 for using some implementations of the UDC System to collect and manage data related to unmanned aircraft systems (UAS) operations. While it may be read in conjunction with the foregoing exemplary UDC System deployments, it will be appreciated that it is not so limited. Process steps that are delineated by hash marks indicate that the step is optional The UDC System 100 and its component UDC Device(s) 102, UDC Client(s) 104, and UDC Service(s) 106 are first configured (3710). As discussed previously, this step includes an administrator or other user uploading baseline configuration file(s) and any further desired customization(s), including configuration action options and discrete setting(s), related to UAS data source(s), UDC Client(s), UDC Service(s), and/or any auxiliary device(s). Once these configuration files and customizations have been completed, the UDC Client(s) 104 auto-configure the remainder of the components of the system (i.e., UDC Services 106 and UDC Client Interfaces (User Interface(s), Data Source Interface(s), External Device Interface(s), Host UDC Service(s), and Data Dissemination Interface(s)) based upon these installed baseline configuration files and customizations. This auto-configuration includes logically arranging the UDC Service(s) in each UDC Client as operational groupings having a predetermined processing sequence order and a predetermined processing priority within the operational groupings and as discussed with respect to FIGS. 7 and 8 above (3712). The UDC System 100 and its component UDC Device(s) 102, UDC Client(s) 104, and UDC Service(s) 106 are now ready for use.

For each operation (e.g., for each UAS flight operation), if logbook data is desired and/or required for an operation, it is preferably input first (3716). Data from the UAS data source(s) is then received (3718) and translated into customized device data based at least, in part, on the baseline configuration(s) and any further customization(s) (3720). The customized device data is validated based at least in part on the baseline configuration(s) and any further customization(s) (3722) and then stored in a data store(s) (3724) within or external to UDC Device(s) 102.

If there are additional operations (3726), steps 3716 through 3724 are completed for each operation. If not, the validated device data is optionally analyzed to create analyzed device data (3728). A report may be generated from the validated device data and/or the analyzed device data (3730) and, further, published in a format based at least, in part, on the device configuration information (3732). Steps 3728 through 3732 may or may not be carried out depending on the needs of the user(s) and context(s) of use. As will be appreciated from the foregoing discussion of FIGS. 7 and 8, execution of each of the steps 3716 through 3732 will be carried out according to the predetermined sequence order and according to the predetermined priority of the client service within the operational grouping (3714). Thus, UDC Client Service(s) 106 that are member constituents of an operational grouping having a higher sequential order will be executed on all UDC Client(s) 104 having that operational grouping prior to execution of UDC Client Service(s) 106 that are member constituents of an operational grouping having a lower sequential order. For example, again referring back to FIGS. 7 and 8, UDC Client Service(s) 106 that are member constituents of UDC Collection Service 720 will be executed on all UDC Client(s) 104 having UDC Collection Service 720 prior to execution of UDC Client Service(s) 106 that are member constituents of UDC Retention Services 740 and UDC Data Processing Services 760. Similarly, UDC Client Service(s) 106 that are member constituents of UDC Retention Services 740 will be executed on all UDC Client(s) 104 having UDC Retention Services 740 prior to execution of UDC Client Service(s) 106 that are member constituents of UDC Data Processing Services 760.

It will be appreciated that the foregoing teaches a robust, data-agnostic platform and techniques for the automated collection, storage, and processing of data from disparate UAS systems so that the data is uniform and reliable. The highly flexible and adaptive UDC System is easily configurable to different operational missions and categories and may be readily deployed in mixed environments and amongst diverse groups and UAS platforms, thus providing for active collaboration amongst segregated users, while still providing complete control over what data is shared. The UDC System architecture allows for large, distributed networks to be constructed out of many individual clients, which is conducive to dispersed applications such as UAS field operations. UDC System modularity also provides the advantage of allowing the system to be readily adapted to different levels of operational complexity and to continue to evolve with the UAS community.

Although a few example implementations have been described in detail above, these should not be construed as limitations on the scope of what may be claimed, but rather as descriptions of features that may be specific to particular embodiments. Thus, other modifications and embodiments are possible and are within the scope of the appended claims and equivalents thereof. In addition the foregoing, it will also be understood that the logic flows and actions recited in the depicted figures and recited in the claims do not require the particular order shown, or in sequential order claimed, and may be performed in a different order and still achieve desirable results.

No language in the specification should be construed as indicating any non-claimed element as essential to the practice of the techniques of this disclosure. The terms "a" and "an" are used interchangeably above, and are equivalent to the phrase "one or more" as utilized in the present application. The terms "comprising," "having," "including," and "containing" are to be construed as open-ended terms (i.e., meaning "including, but not limited to,") unless otherwise noted above. The recitation of any ranges of values herein is merely intended to serve as a shorthand technique of referring individually to each separate value falling within the range, unless otherwise indicated herein, and each separate value is incorporated into the specification as if it were individually recited. The use of any and all examples, or example language (e.g., "such as"), provided herein is intended merely to better illuminate the disclosure and does not impose a limitation on the scope of the disclosure unless otherwise claimed. Use of the language "at least one of" will be understood to refer to any combination of the listed items, including only a single item. For example, "at least one of A or B" is intended to include only A, only B, or both A and B, as well as multiples of the same item (e.g., A-A-A, A-A-B, A-B-B, etc.) Finally, any papers and publications cited herein are hereby incorporated by reference in their entirety.

What is claimed is:

1. A device for collecting and managing data related to unmanned aircraft systems (UAS) operations, the device comprising:
   a memory; and,
   at least one processor operatively coupled to the memory, wherein the at least one processor and memory are configured to:
      cause the device to receive source data from at least one data source;
      implement on the device at least one client, the at least one client having a plurality of client interfaces, and to execute a plurality of services on the at least one client, wherein the source data and the plurality of client services are logically arranged in each of the at least one clients as a plurality of operational groupings having a predetermined sequence order, wherein each of the plurality of client services belongs to at least one operational grouping and is logically arranged within the at least one operational grouping according to a predetermined priority and wherein, when executed by the at least one processor, the plurality of client services [is executed, they] are executed according to the predetermined sequence order of the operational groupings and the predetermined priority within the operational grouping;
      receive through a user interface of the device configuration information, wherein the configuration information is related to at least one of the at least one data source, the at least one client, the at least one operational grouping, or at least one auxiliary device, the configuration information when executed by the at least one processor causing the plurality of client interfaces and client services to be automatically configured according to the configuration information;
      translate the source data of the at least one data source into customized device data based at least, in part, on the configuration information; and,
      store validated device data in non-transitory storage on the device after performing a validation of the customized device data, wherein the validation is based at least in part on the configuration information and includes checking the customized device data for compatibility with the non-transitory storage.

2. The device of claim 1, wherein the at least one processor and memory are further configured to:
   process the validated device data, wherein the processing is determined at least in part on an intended use for the validated device data.

3. The device of claim 2, wherein the processing comprises:
   analyzing the validated device data to create analyzed device data;
   generating a report from at least one of the validated device data or the analyzed device data; and,
   publishing the report in a format based at least, in part, on the device configuration information.

4. The device of claim 1, wherein the configuration information includes a data dictionary configuration file having a plurality of data fields, including structured requirements data fields for the device, and wherein translating the source data into customized device data comprises:
   correlating data fields of the source data with the structured requirements data fields;
   converting a format of the correlated data fields to a preferred format; and,
   certifying that the converted data is compliant by comparing the converted data fields with the structured requirements data fields for the device.

5. The device of claim 4, wherein the plurality of data fields of the data dictionary configuration file also include data fields relating to each of the plurality of operational groupings and fields including schema for cataloguing the customized device data.

6. The device of claim 3, wherein the device is used to analyze at least one UAS operation according to a context of use, and wherein analyzing the validated device data comprises:
   instantiating one or more data analyzers, wherein each data analyzer instance is based at least in part on the configuration information;
   correlating by each data analyzer each of a plurality of data fields of the validated device data to create correlated device data; and
   transforming the correlated device data into analyzed device data using discrete function calculators, the discrete function calculators including computational instructions related to the context of use.

7. The device of claim 3, wherein the device includes an interface and wherein the at least one processor and memory are configured to:

display on the interface a client control panel for inputting the configuration information, wherein the client control panel includes a first section for receiving baseline configuration information including connection address settings related at least of at least one data source, the plurality of clients, or at least one auxiliary device, and wherein the client control panel includes a second section for receiving additional customizations related to the plurality of client services, wherein the second section is arranged to display the plurality of client services and additional customizations according to the operational groupings on the plurality of clients.

8. The device of claim 7, wherein the second section is further arranged to display separate instances of the operational groupings according to the predetermined sequence order and predetermined priority of the services, wherein the additional customizations include discrete settings associated with at least one separate instance, and wherein selection of any of the discrete settings initializes the associated client service according to the predetermined sequence order and predetermined priority of the service.

9. The device of claim 1, wherein the at least one processor and memory are further configured to:
   instantiate one or more logbook data generators based at least in part on the configuration information, and wherein each logbook data generator instance includes a logbook module for receiving user inputted data, including data related to a specific UAS operation.

10. A system for collecting and managing data related to unmanned aircraft systems (UAS) operations, the system comprising:
   a plurality of devices, each device having a memory and one or more processors operatively coupled to the memory,
   wherein the plurality of devices include instructions that when executed on the one or more processors cause the one or more devices to:
      host a platform including a plurality of clients and a plurality of client services on the plurality of the clients, the plurality of clients including a plurality of client interfaces, and wherein the client services on each device client are logically arranged as a plurality of operational groupings having a predetermined sequence order, wherein each of the client services on each device client belongs to at least one of the plurality of operational groupings and is logically arranged within the at least one operational grouping according to a predetermined priority;
      execute the client services on each client according to the predetermined sequence order and according to the predetermined priority of the client service within the operational grouping, wherein when the client services are executed, the client services of an operational grouping having a higher sequential order in the predetermined sequence order will be executed on each of the clients having the higher sequential order operational grouping prior to execution of the client services of an operational grouping having a lower sequential order on the clients having the lower sequential order operational grouping;
      cause at least one of the plurality of devices to receive source data from at least one data source;
   and,
   wherein the plurality of devices are configured to:
      receive configuration information related to at least one of the at least one data source, the plurality of clients, the plurality of client services, or at least one auxiliary device, the configuration information, when executed by the one or more processors, causing the plurality of client interfaces and the plurality of client services to be automatically configured according to the configuration information;
      translate data from the at least one data source into customized device data based at least, in part, on the configuration information;
      store validated device data in at least one data store after performing a validation of the customized device data, wherein the validation is based at least in part on the configuration information and includes checking the customized device data for compatibility with the at least one data store;
      analyze the validated device data to create analyzed device data;
      generate a report from at least one of the validated device data or the analyzed device data; and,
      publish the report in a format based at least, in part, on the device configuration information.

11. The system of claim 10, wherein the configuration information includes a data dictionary configuration file having a plurality of data fields, including structured requirements data fields for the device, and wherein translating data from the at least one data source into customized device data comprises:
   correlating data fields of the at least one data source data with the structured requirements data fields;
   converting a format of the correlated data fields to a preferred format; and,
   certifying that the converted data is compliant by comparing the converted data fields with the structured requirements data fields for the device.

12. The system of claim 11, wherein the plurality of data fields of the data dictionary configuration file also include data fields relating to each of the plurality of operational groupings and fields including schema for cataloguing the customized device data.

13. The device of claim 10, wherein the system is used to analyze at least one UAS operation according to a context of use, and wherein analyzing the validated device data comprises:
   instantiating one or more data analyzers, wherein each data analyzer instance is based at least in part on the configuration information;
   correlating by each data analyzer each of a plurality of data fields of the validated device data to created correlated device data; and,
   transforming the correlated device data into analyzed device data using discrete function calculators, the discrete function calculators including computational instructions related to the context of use.

14. The system of claim 10, wherein the plurality of devices includes further instructions that when executed on the one or more processors cause the one or more devices to:
   receive the configuration information input through a client control panel; and,
   wherein the client control panel includes a first section for receiving baseline configuration information including connection address settings related at least of at least one data source, the plurality of clients, or at least one auxiliary device, wherein the client control panel includes a second section for receiving additional customizations related to the plurality of client services, and wherein the plurality of client services and additional customizations are arranged in the second section according to the operational groupings on the plurality of clients.

15. The system of claim 14, wherein separate instances of the operational groupings are arranged in the second section of the client control panel according to the predetermined sequence order and predetermined priority of the services, wherein the additional customizations include discrete settings associated with at least one separate instance, and wherein selection of any of the discrete settings initializes the associated client service according to the predetermined sequence order and predetermined priority of the service.

16. The device of claim 10, wherein the at least one processor and memory are further configured to:
   instantiate one or more logbook data generators based at least in part on the configuration information, and wherein each logbook data generator instance includes a logbook module for receiving user inputted data, including data related to a specific UAS operation.

17. A method for collecting and managing data related to unmanned aircraft systems (UAS) operations over a network that is performed by a distributed application that comprises a plurality of clients executing on a plurality of devices and a plurality of client services executing on the plurality of the clients, the method comprising:
   receiving configuration information in at least one of the plurality of devices, the configuration information related to at least one of at least one data source related to UAS operations, the plurality of clients, the plurality of client services, or at least one auxiliary device;
   automatically configuring the plurality of clients, and the plurality of client services based at least in part on the received configuration information, the automatic configuring including:
      logically arranging one or more of the plurality of client services in each device client as a plurality of operational groupings having a predetermined processing sequence order, each of the client services on each device client belonging to at least one of the plurality of operational groupings and having a predetermined processing priority within the at least one operational grouping,
      wherein, when the client services are executed, they are executed according to the predetermined processing sequence order and according to the predetermined processing priority of the client service within the operational grouping, the client services of an operational grouping having a higher sequential order in the predetermined processing sequence order executing on each of those clients having the higher sequential order operational grouping prior to execution of the client services of an operational grouping having a lower sequential order on those clients having the lower sequential order operational grouping;
   translating data received from the at least one data source into customized device data based at least, in part, on the configuration information; and,
   storing validated device data in at least one data store after performing a validation of the customized device data, wherein the validation is based at least in part on the configuration information and includes checking the customized device data for compatibility with the at least one data store.

18. The method of claim 17, further comprising the steps of:
   analyzing the validated device data to create analyzed device data;
   generating a report from at least one of the validated device data or the analyzed device data; and,
   publishing the report in a format based at least, in part, on the device configuration information.

19. The method of claim 17, wherein the configuration information includes a data dictionary configuration file having a plurality of data fields, including structured requirements data fields for the device, and wherein translating data from the at least one data source into customized device data comprises:
   correlating data fields of the at least one data source data with the structured requirements data fields;
   converting a format of the correlated data fields to a preferred format; and,
   certifying that the converted data is compliant by comparing the converted data fields with the structured requirements data fields for the device.

20. The method of claim 19, wherein the plurality of data fields of the data dictionary configuration file also include data fields relating to each of the plurality of operational groupings and fields including schema for cataloguing the customized device data.

21. The method of claim 17, wherein the distributed application is used to analyze at least one UAS operation according to a context of use, and wherein analyzing the validated device data comprises
   instantiating one or more data analyzers, wherein each data analyzer instance is based at least in part on the configuration information;
   correlating by each data analyzer each of a plurality of data fields of the validated device data to created correlated device data;
   transforming the correlated device data into analyzed device data using discrete function calculators, the discrete function calculators including computational instructions related to the context of use.

22. The method of claim 21, wherein the configuration information is received through a client control panel, wherein the client control panel includes a first section for receiving baseline configuration information including connection address settings related at least of at least one data source, the plurality of clients, or at least one auxiliary device, wherein the client control panel includes a second section for receiving additional customizations related to the plurality of client services, and wherein the plurality of client services and additional customizations are arranged in the second section according to the operational groupings on the plurality of clients.

23. The method of claim 22, wherein separate instances of the operational groupings are arranged in the second section client control panel according to the predetermined sequence order and predetermined priority of the services, wherein the additional customizations include discrete settings associated with at least one separate instance, and wherein selection of any of the discrete settings initializes the associated client service according to the predetermined sequence order and predetermined priority of the service.

24. The method of claim 17, further comprising the step of:
   instantiating one or more logbook data generators based at least in part on the configuration information, and wherein each logbook data generator instance includes a logbook module for receiving user inputted data, including data related to a specific UAS operation.

\* \* \* \* \*